(12) United States Patent  
Kuo

(10) Patent No.: US 11,885,937 B2  
(45) Date of Patent: Jan. 30, 2024

(54) OPTICAL PHOTOGRAPHING LENS ASSEMBLY COMPRISING NINE LENSES OF VARIOUS REFRACTIVE POWERS, IMAGE CAPTURING UNIT AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 148 days.

(21) Appl. No.: 17/376,048

(22) Filed: Jul. 14, 2021

(65) Prior Publication Data

US 2021/0341712 A1 Nov. 4, 2021

Related U.S. Application Data

(63) Continuation of application No. 16/525,411, filed on Jul. 29, 2019, now Pat. No. 11,106,014.

(30) Foreign Application Priority Data

Jun. 14, 2019 (TW) .................................. 108120724

(51) Int. Cl.  
*G02B 13/00* (2006.01)  
*G02B 9/64* (2006.01)

(52) U.S. Cl.  
CPC ........... *G02B 13/0045* (2013.01); *G02B 9/64* (2013.01)

(58) Field of Classification Search  
CPC .............................. G02B 13/0045; G02B 9/64  
See application file for complete search history.

(56) References Cited

U.S. PATENT DOCUMENTS

| | | | |
|---|---|---|---|
| 4,924,244 A | 5/1990 | Kataoka et al. |
| 5,200,814 A | 4/1993 | Hirata et al. |
| 5,272,540 A | 12/1993 | Hirata et al. |
| 5,455,713 A | 10/1995 | Kreitzer |
| 5,625,495 A | 4/1997 | Moskovich |
| 5,835,286 A | 11/1998 | Yamanashi |
| 5,946,142 A | 8/1999 | Hirata et al. |
| 6,025,959 A | 2/2000 | Moskovich |
| 2009/0225441 A1 | 9/2009 | Do |
| 2010/0118416 A1 | 5/2010 | Do |

(Continued)

FOREIGN PATENT DOCUMENTS

| | | |
|---|---|---|
| CN | 108254907 A | 7/2018 |
| JP | H03-131808 A | 6/1991 |

(Continued)

*Primary Examiner* — Wen Huang  
(74) *Attorney, Agent, or Firm* — Maschoff Brennan

(57) ABSTRACT

An optical photographing lens assembly includes nine lens elements which are, in order from an object side to an image side: a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side. At least one lens element of the optical photographing lens assembly has at least one aspheric lens surface having at least one inflection point.

10 Claims, 27 Drawing Sheets

(56) References Cited

U.S. PATENT DOCUMENTS

| | | |
|---|---|---|
| 2014/0184882 A1 | 7/2014 | Kuzuhara et al. |
| 2014/0184887 A1 | 7/2014 | Yonetani et al. |
| 2015/0268449 A1 | 9/2015 | Kurioka et al. |
| 2015/0312454 A1 | 10/2015 | Iyama et al. |
| 2016/0363743 A1 | 12/2016 | Yoo |
| 2017/0307862 A1 | 10/2017 | Lin et al. |
| 2018/0326909 A1 | 11/2018 | Iwashita |
| 2019/0049705 A1 | 2/2019 | Cook |
| 2019/0056572 A1 | 2/2019 | Takada |
| 2020/0033625 A1 | 1/2020 | Suzuki |
| 2020/0209593 A1 | 7/2020 | Hirano |
| 2020/0209594 A1 | 7/2020 | Hirano |
| 2020/0241243 A1 | 7/2020 | Hirano |
| 2020/0249437 A1 | 8/2020 | Hirano |
| 2020/0271898 A1 | 8/2020 | Hirano |
| 2020/0285028 A1 | 9/2020 | Hirano |
| 2021/0396955 A1* | 12/2021 | Okano ............... G02B 13/0045 |

FOREIGN PATENT DOCUMENTS

| | | |
|---|---|---|
| JP | H11-64730 A | 3/1999 |
| JP | 2002-341242 A | 11/2002 |
| JP | 2013-186458 A | 9/2013 |
| JP | 2014-089351 A | 5/2014 |
| WO | 2020017258 A | 1/2020 |
| WO | 2020080053 A | 4/2020 |

* cited by examiner

OPTICAL PHOTOGRAPHING LENS ASSEMBLY COMPRISING NINE LENSES OF VARIOUS REFRACTIVE POWERS, IMAGE CAPTURING UNIT AND ELECTRONIC DEVICE

RELATED APPLICATIONS

This application is a continuation patent application of U.S. application Ser. No. 16/525,411, filed on Jul. 29, 2019, which claims priority to Taiwan Application 108120724, filed on Jun. 14, 2019, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing lens assembly includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element.

Each of the nine lens elements has an object-side surface facing toward the object side and an image-side surface facing toward the image side, and at least one lens element of the optical photographing lens assembly has at least one aspheric lens surface having at least one inflection point. When an axial distance between the object-side surface of the first lens element and an image surface is TL, a focal length of the optical photographing lens assembly is f, an entrance pupil diameter of the optical photographing lens assembly is EPD, and a maximum image height of the optical photographing lens assembly is ImgH, the following conditions are satisfied:

$1.50[mm]<TL<20.0[mm]$;

$0.70<f/EPD<2.60$; and $0.60<TL/ImgH<3.20$.

According to another aspect of the present disclosure, an optical photographing lens assembly includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element.

Each of the nine lens elements has an object-side surface facing toward the object side and an image-side surface facing toward the image side, and at least one lens element of the optical photographing lens assembly has at least one aspheric lens surface having at least one inflection point. In addition, the optical photographing lens assembly further includes an aperture stop.

When an axial distance between the object-side surface of the first lens element and an image surface is TL, an axial distance between the aperture stop and the image-side surface of the ninth lens element is SD, an axial distance between the object-side surface of the first lens element and the image-side surface of the ninth lens element is TD, a sum of axial distances between each of all adjacent lens elements of the optical photographing lens assembly is ΣAT, and a sum of central thicknesses of all lens elements of the optical photographing lens assembly is ΣCT, the following conditions are satisfied:

$1.50[mm]<TL<20.0[mm]$;

$0.75<SD/TD<1.10$; and $0.15<ΣAT/ΣCT<0.90$;

and when an Abbe number of the i-th lens element is Vi, at least one lens element of the optical photographing lens assembly satisfies the following condition:

$Vi<40.0$, wherein $i=1,2,3,4,5,6,7,8$ or $9$.

According to another aspect of the present disclosure, an optical photographing lens assembly includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element.

Each of the nine lens elements has an object-side surface facing toward the object side and an image-side surface facing toward the image side, and each of at least three lens elements of the optical photographing lens assembly has at least one aspheric lens surface having at least one inflection point. In addition, the optical photographing lens assembly further includes an aperture stop.

When an axial distance between the aperture stop and the image-side surface of the ninth lens element is SD, an axial distance between the object-side surface of the first lens element and the image-side surface of the ninth lens element is TD, a focal length of the optical photographing lens assembly is f, and an entrance pupil diameter of the optical photographing lens assembly is EPD, the following conditions are satisfied:

$0.50<SD/TD<1.20$; and $0.50<f/EPD<5.00$;

and when an Abbe number of the i-th lens element is Vi, at least two lens elements of the optical photographing lens assembly satisfy the following condition:

$Vi<28.0$, wherein $i=1,2,3,4,5,6,7,8$ or $9$.

According to another aspect of the present disclosure, an image capturing unit includes one of the aforementioned optical photographing lens assemblies and an image sensor, wherein the image sensor is disposed on the image surface of the optical photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical photographing lens assembly includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

Figure 25:
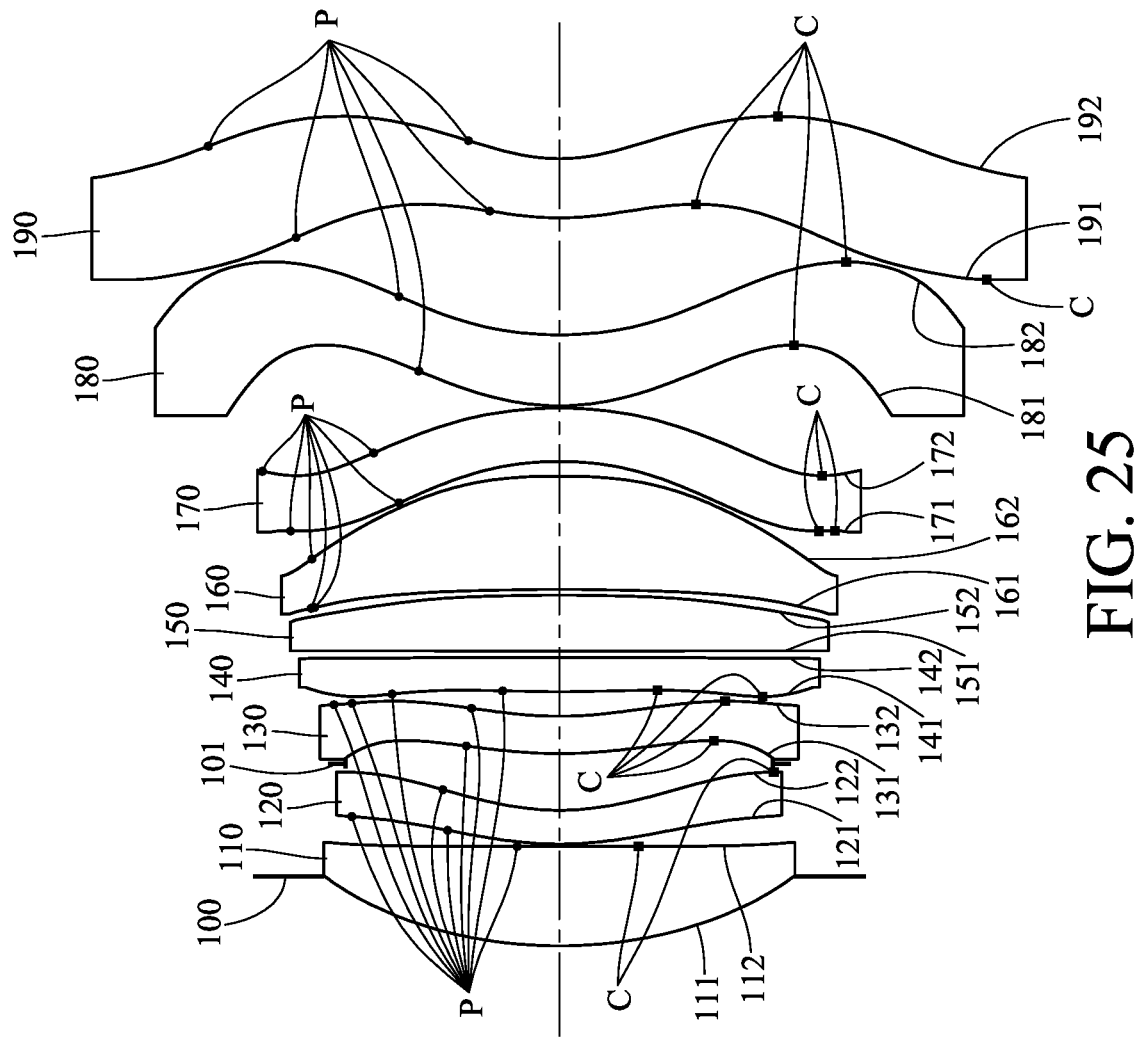
FIG. 25 shows a schematic view of inflection points and critical points of some of the nine lens elements according to the 1st embodiment of the present disclosure.
Figure 26:
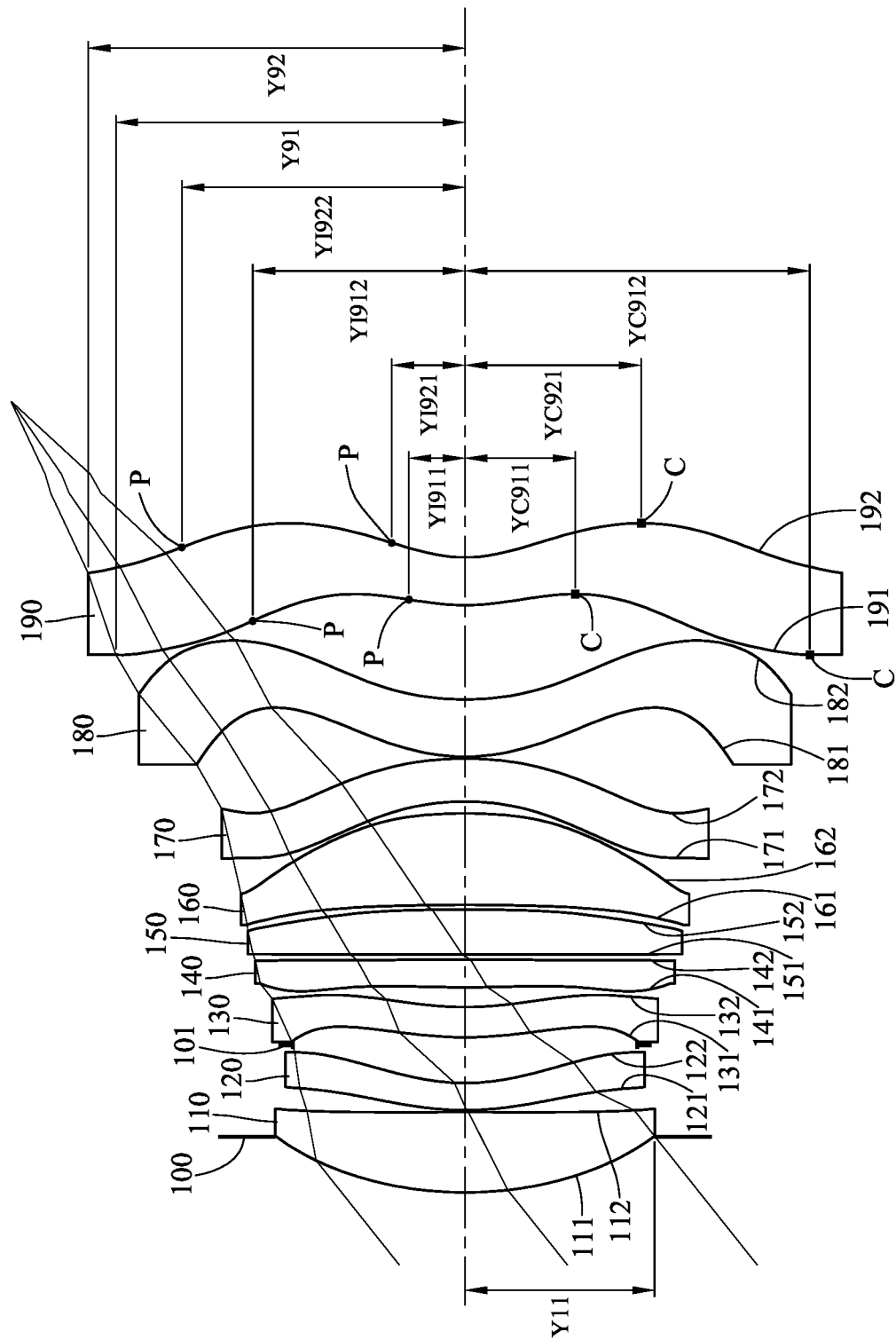
FIG. 26 shows a schematic view of Y11, Y91, Y92, YI911, YI912, YI921, YI922, YC911, YC912 and YC921 according to the 1st embodiment of the present disclosure.

According to the present disclosure, at least one lens element of the optical photographing lens assembly has at least one aspheric lens surface having at least one inflection point. Therefore, it is favorable for increasing the shape variation of lens element so as to miniaturize of the optical photographing lens assembly and improve image quality. Moreover, each of at least two lens elements of the optical photographing lens assembly can have at least one aspheric lens surface having at least one inflection point. Moreover, each of at least three lens elements of the optical photographing lens assembly can have at least one aspheric lens surface having at least one inflection point. Moreover, at least one lens element located between the fifth lens element and an image surface of the optical photographing lens assembly can have at least one aspheric lens surface having at least one inflection point. Therefore, the inflection point(s) on the image side of the optical photographing lens assembly is favorable for improving image quality on the peripheral region of the image surface. Moreover, each of at least two lens elements located between the fifth lens element and the image surface can have at least one aspheric lens surface having at least one inflection point. Moreover, each of at least three lens elements located between the fifth lens element and the image surface can have at least one aspheric lens surface having at least one inflection point. Moreover, any lens element of the optical photographing lens assembly can have at least one lens surface having at least two inflection points. Therefore, it is favorable for further increasing the shape variation of lens element so as to correct aberrations such as field curvature. Moreover, each of the object-side surface and the image-side surface of any lens element of the optical photographing lens assembly can have at least one inflection point. Therefore, it is favorable for adjusting the shape of lens element so as to further correct aberrations. Moreover, when a vertical distance between the inflection point on the object-side surface of the first lens element and an optical axis is YI11, a vertical distance between the inflection point on the image-side surface of the first lens element and the optical axis is YI12, a vertical distance between the inflection point on the object-side surface of the second lens element and the optical axis is YI21, a vertical distance between the inflection point on the image-side surface of the second lens element and the optical axis is YI22, a vertical distance between the inflection point on the object-side surface of the third lens element and the optical axis is YI31, a vertical distance between the inflection point on the image-side surface of the third lens element and the optical axis is YI32, a vertical distance between the inflection point on the object-side surface of the fourth lens element and the optical axis is YI41, a vertical distance between the inflection point on the image-side surface of the fourth lens element and the optical axis is YI42, a vertical distance between the inflection point on the object-side surface of the fifth lens element and the optical axis is YI51, a vertical distance between the inflection point on the image-side surface of the fifth lens element and the optical axis is YI52, a vertical distance between the inflection point on the object-side surface of the sixth lens element and the optical axis is YI61, a vertical distance between the inflection point on the image-side surface of the sixth lens element and the optical axis is YI62, a vertical distance between the inflection point on the object-side surface of the seventh lens element and the optical axis is YI71, a vertical distance between the inflection point on the image-side surface of the seventh lens element and the optical axis is YI72, a vertical distance between the inflection point on the object-side surface of the eighth lens element and the optical axis is YI81, a vertical distance between the inflection point on the image-side surface of the eighth lens element and the optical axis is YI82, a vertical distance between the inflection point on the object-side surface of the ninth lens element and the optical axis is YI91, a vertical distance between the inflection point on the image-side surface of the ninth lens element and the optical axis is YI92, a vertical distance between the inflection point on the object-side surface of the i-th lens element and the optical axis is YIi1, a vertical distance between the inflection point on the image-side surface of the i-th lens element and the optical axis is YIi2, a maximum effective radius of the object-side surface of the first lens element is Y11, a maximum effective radius of the image-side surface of the first lens element is Y12, a maximum effective radius of the object-side surface of the second lens element is Y21, a maximum effective radius of the image-side surface of the second lens element is Y22, a maximum effective radius of the object-side surface of the third lens element is Y31, a maximum effective radius of the image-side surface of the third lens element is Y32, a maximum effective radius of the object-side surface of the fourth lens element is Y41, a maximum effective radius of the image-side surface of the fourth lens element is Y42, a maximum effective radius of the object-side surface of the fifth lens element is Y51, a maximum effective radius of the image-side surface of the fifth lens element is Y52, a maximum effective radius of the object-side surface of the sixth lens element is Y61, a maximum effective radius of the image-side surface of the sixth lens element is Y62, a maximum effective radius of the object-side surface of the seventh lens element is Y71, a maximum effective radius of the image-side surface of the seventh lens element is Y72, a maximum effective radius of the object-side surface of the eighth lens element is Y81, a maximum effective radius of the image-side surface of the eighth lens element is Y82, a maximum effective radius of the object-side surface of the ninth lens element is Y91, a maximum effective radius of the image-side surface of the ninth lens element is Y92, a maximum effective radius of the object-side surface of the i-th lens element is Yi1, and a maximum effective radius of the image-side surface of the i-th lens element is Yi2, any lens surface of the optical photographing lens assembly can have one or more inflection points satisfying the following condition: $0.10 < YIij/Yij < 0.90$, wherein $i=1, 2, 3, 4, 5, 6, 7, 8$ or $9$; and $j=1$ or $2$. Therefore, it is favorable for adjusting the position of inflection points so as to further correct aberrations, and also favorable for reducing difficulty in manufacturing lens elements. Moreover, the one or more inflection points on the any lens surface of the optical photographing lens assembly can also satisfy the following condition: $0.20 < YIij/Yij < 0.80$, wherein $i=1, 2, 3, 4, 5, 6, 7, 8$ or $9$; and $j=1$ or $2$. Furthermore, a vertical distance between the k-th inflection point on the object-side surface of the i-th lens element in order from a paraxial region thereof to an off-axis region thereof and the optical axis is YIi1k, and a vertical distance between the k-th inflection point on the image-side surface of the i-th lens element in order from a paraxial region thereof to an off-axis region thereof and the optical axis is YIi2k, wherein $i=1, 2, 3, 4, 5, 6, 7, 8$ or $9$; and k is a positive integer. Please refer to FIG. 25 and FIG. 26. FIG. 25 shows a schematic view of inflection points P of the first lens element 110, the second lens element 120, the third lens element 130, the fourth lens element 140, the sixth lens element 160, the seventh lens element 170, the eighth lens element 180 and the ninth lens element 190 according to the 1st embodiment of the present disclosure, and FIG. 26 shows a schematic view of Y11, Y91, Y92, YI911, YI912, YI921 and YI922 according to the 1st embodiment of the present disclosure.

According to the present disclosure, at least one lens element of the optical photographing lens assembly can have at least one lens surface having at least one critical point in an off-axis region thereof. Therefore, it is favorable for further increasing the shape variation of lens element so as to miniaturize of the optical photographing lens assembly and improve image quality on the peripheral region of the image surface. Moreover, each of at least two lens elements of the optical photographing lens assembly can have at least one lens surface having at least one critical point in an off-axis region thereof. Moreover, each of at least three lens elements of the optical photographing lens assembly can have at least one lens surface having at least one critical point in an off-axis region thereof. Moreover, at least one lens element located between the fifth lens element and the image surface can have at least one lens surface having at least one critical point in an off-axis region thereof. Therefore, the critical point(s) on the image side of the optical photographing lens assembly is favorable for correcting off-axis aberrations and increasing illuminance on the peripheral region of the image surface. Moreover, each of at least two lens elements located between the fifth lens element and the image surface can have at least one lens surface having at least one critical point in an off-axis region thereof. Moreover, each of at least three lens elements located between the fifth lens element and the image surface can have at least one lens surface having at least one critical point in an off-axis region thereof. Moreover, each of the object-side surface and the image-side surface of any lens element of the optical photographing lens assembly can have at least one critical point in an off-axis region thereof. Therefore, it is favorable for adjusting the shape of lens element so as to reduce the outer diameter thereof. Moreover, when a vertical distance between the non-axial critical point on the object-side surface of the first lens element and the optical axis is YC11, a vertical distance between the non-axial critical point on the image-side surface of the first lens element and the optical axis is YC12, a vertical distance between the non-axial critical point on the object-side surface of the second lens element and the optical axis is YC21, a vertical distance between the non-axial critical point on the image-side surface of the second lens element and the optical axis is YC22, a vertical distance between the non-axial critical point on the object-side surface of the third lens element and the optical axis is YC31, a vertical distance between the non-axial critical point on the image-side surface of the third lens element and the optical axis is YC32, a vertical distance between the non-axial critical point on the object-side surface of the fourth lens element and the optical axis is YC41, a vertical distance between the non-axial critical point on the image-side surface of the fourth lens element and the optical axis is YC42, a vertical distance between the non-axial critical point on the object-side surface of the fifth lens element and the optical axis is YC51, a vertical distance between the non-axial critical point on the image-side surface of the fifth lens element and the optical axis is YC52, a vertical distance between the non-axial critical point on the object-side surface of the sixth lens element and the optical axis is YC61, a vertical distance between the non-axial critical point on the image-side surface of the sixth lens element and the optical axis is YC62, a vertical distance between the non-axial critical point on the object-side surface of the seventh lens element and the optical axis is YC71, a vertical distance between the non-axial critical point on the image-side surface of the seventh lens element and the optical axis is YC72, a vertical distance between the non-axial critical point on the object-side surface of the eighth lens element and the optical axis is YC81, a vertical distance between the non-axial critical point on the image-side surface of the eighth lens element and the optical axis is YC82, a vertical distance between the non-axial critical point on the object-side surface of the ninth lens element and the optical axis is YC91, a vertical distance between the non-axial critical point on the image-side surface of the ninth lens element and the optical axis is YC92, a vertical distance between the non-axial critical point on the object-side surface of the i-th lens element and the optical axis is YCi1, a vertical distance between the non-axial critical point on the image-side surface of the i-th lens element and the optical axis is YCi2, the maximum effective radius of the object-side surface of the first lens element is Y11, the maximum effective radius of the image-side surface of the first lens element is Y12, the maximum effective radius of the object-side surface of the second lens element is Y21, the maximum effective radius of the image-side surface of the second lens element is Y22, the maximum effective radius of the object-side surface of the third lens element is Y31, the maximum effective radius of the image-side surface of the third lens element is Y32, the maximum effective radius of the object-side surface of the fourth lens element is Y41, the maximum effective radius of the image-side surface of the fourth lens element is Y42, the maximum effective radius of the object-side surface of the fifth lens element is Y51, the maximum effective radius of the image-side surface of the fifth lens element is Y52, the maximum effective radius of the object-side surface of the sixth lens element is Y61, the maximum effective radius of the image-side surface of the sixth lens element is Y62, the maximum effective radius of the object-side surface of the seventh lens element is Y71, the maximum effective radius of the image-side surface of the seventh lens element is Y72, the maximum effective radius of the object-side surface of the eighth lens element is Y81, the maximum effective radius of the image-side surface of the eighth lens element is Y82, the maximum effective radius of the object-side surface of the ninth lens element is Y91, the maximum effective radius of the image-side surface of the ninth lens element is Y92, the maximum effective radius of the object-side surface of the i-th lens element is Yi1, and the maximum effective radius of the image-side surface of the i-th lens element is Yi2, any lens surface of the optical photographing lens assembly can have one or more non-axial critical points satisfying the following condition: $0.10<YCij/Yij<0.90$, wherein i=1, 2, 3, 4, 5, 6, 7, 8 or 9; and j=1 or 2. Therefore, it is favorable for adjusting the position of critical point(s) so as to further correct aberrations and miniaturize the optical photographing lens assembly, and also favorable for reducing difficulty in manufacturing lens elements. Moreover, the one or more non-axial critical points on the any lens surface of the optical photographing lens assembly can also satisfy the following condition: $0.20<YCij/Yij<0.80$, wherein i=1, 2, 3, 4, 5, 6, 7, 8 or 9; and j=1 or 2. Furthermore, a vertical distance between the k-th non-axial critical point on the object-side surface of the i-th lens element in order from the paraxial region thereof to the off-axis region thereof and the optical axis is YCi1k, and a vertical distance between the k-th non-axial critical point on the image-side surface of the i-th lens element in order from the paraxial region thereof to the off-axis region thereof and the optical axis is YCi2k, wherein i=1, 2, 3, 4, 5, 6, 7, 8 or 9; and k is a positive integer. Please refer to FIG. 25 and FIG. 26. FIG. 25 shows a schematic view of critical points C of the first lens element 110, the second lens element 120, the third lens element 130, the fourth lens element 140, the seventh lens element 170, the eighth lens element 180 and the ninth lens element 190 according to the 1st embodiment of the present disclosure, and FIG. 26 shows a schematic view of Y11, Y91, Y92, YC911, YC912 and YC921.

According to the present disclosure, at least three lens elements of the optical photographing lens assembly can be made of plastic material. Therefore, it is favorable for increasing the shape variation of lens element so as to reduce the size and weight of the optical photographing lens assembly and correct aberrations, thus increasing mass production and reducing manufacturing costs. Moreover, when the number of lens elements being made of plastic material is LNP, the following condition can be satisfied: $6 \leq LNP$. Therefore, increasing the proportion of plastic lens elements is favorable for providing a miniaturized optical system featuring high image quality. Moreover, the following condition can also be satisfied: $7 \leq LNP$. Moreover, the following condition can also be satisfied: $8 \leq LNP$. Moreover, the following condition can also be satisfied: $9 \leq LNP$.

When an axial distance between the object-side surface of the first lens element and the image surface is TL, the following condition can be satisfied: $1.50 \text{ [mm]} < TL < 20.0 \text{ [mm]}$. Therefore, it is favorable for the optical photographing lens assembly to have a desirable total track length for various applications. Moreover, the following condition can also be satisfied: $2.70 \text{ [mm]} < TL < 13.0 \text{ [mm]}$. Moreover, the following condition can also be satisfied: $4.00 \text{ [mm]} < TL < 10.0 \text{ [mm]}$.

When a focal length of the optical photographing lens assembly is f, and an entrance pupil diameter of the optical photographing lens assembly is EPD, the following condition can be satisfied: $0.50 < f/EPD < 5.00$. Therefore, it is favorable for obtaining a balance between the aperture size and field of view. Moreover, the following condition can also be satisfied: $0.60 < f/EPD < 3.50$. Moreover, the following condition can also be satisfied: 0.70<f/EPD<2.60. Moreover, the following condition can also be satisfied: 0.80<f/EPD<2.40.

When the axial distance between the object-side surface of the first lens element and the image surface is TL, and a maximum image height of the optical photographing lens assembly (half of a diagonal length of an effective photo-sensitive area of an image sensor) is ImgH, the following condition can be satisfied: 0.40<TL/ImgH<5.00. Therefore, it is favorable for obtaining a balance between reducing the total track length and increasing the image surface. Moreover, the following condition can also be satisfied: 0.50<TL/ImgH<4.00. Moreover, the following condition can also be satisfied: 0.60<TL/ImgH<3.20. Moreover, the following condition can also be satisfied: 0.70<TL/ImgH<2.80. Moreover, the following condition can also be satisfied: 0.80<TL/ImgH<2.35. Moreover, the following condition can also be satisfied: 0.90<TL/ImgH<1.60.

According to the present disclosure, the optical photographing lens assembly further includes an aperture stop. When an axial distance between the aperture stop and the image-side surface of the ninth lens element is SD, and an axial distance between the object-side surface of the first lens element and the image-side surface of the ninth lens element is TD, the following condition can be satisfied: 0.50<SD/TD<1.20. Therefore, it is favorable for adjusting the position of the aperture stop so as to adjust the aperture size, field of view and size distribution of the optical photographing lens assembly. Moreover, the following condition can also be satisfied: 0.65<SD/TD<1.15. Moreover, the following condition can also be satisfied: 0.75<SD/TD<1.10.

When a sum of axial distances between each of all adjacent lens elements of the optical photographing lens assembly is ΣAT, and a sum of central thicknesses of all lens elements of the optical photographing lens assembly is ΣCT, the following condition can be satisfied: 0.10<ΣAT/ΣCT<1.00. Therefore, it is favorable for adjusting the distribution of the lens elements so as to reduce the size of the optical photographing lens assembly. Moreover, the following condition can also be satisfied: 0.15<ΣAT/ΣCT<0.90.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, and an Abbe number of the i-th lens element is Vi, at least one lens element of the optical photographing lens assembly can satisfy the following condition: Vi<40.0, wherein i=1, 2, 3, 4, 5, 6, 7, 8 or 9. Therefore, it is favorable for selecting proper materials for manufacturing the lens elements in the optical photographing lens assembly so as to correct aberrations. Moreover, at least two lens elements of the optical photographing lens assembly can also satisfy the following condition: Vi<40.0, wherein i=1, 2, 3, 4, 5, 6, 7, 8 or 9. Moreover, at least three lens elements of the optical photographing lens assembly can also satisfy the following condition: Vi<40.0, wherein i=1, 2, 3, 4, 5, 6, 7, 8 or 9. Moreover, at least one lens element of the optical photographing lens assembly can also satisfy the following condition: Vi<28.0, wherein i=1, 2, 3, 4, 5, 6, 7, 8 or 9. Therefore, it is favorable for selecting proper materials for manufacturing the lens elements so as to correct aberrations such as chromatic aberration. Moreover, at least two lens elements of the optical photographing lens assembly can also satisfy the following condition: Vi<28.0, wherein i=1, 2, 3, 4, 5, 6, 7, 8 or 9. Moreover, at least one lens element of the optical photographing lens assembly can also satisfy the following condition: Vi≤26.0, wherein i=1, 2, 3, 4, 5, 6, 7, 8 or 9. Moreover, at least two lens elements of the optical photographing lens assembly can also satisfy the following condition: Vi≤26.0, wherein i=1, 2, 3, 4, 5, 6, 7, 8 or 9.

When the axial distance between the object-side surface of the first lens element and the image surface is TL, and the entrance pupil diameter of the optical photographing lens assembly is EPD, the following condition can be satisfied: 0.50<TL/EPD<7.00. Therefore, it is favorable for obtaining a balance between the total track length and size of the aperture stop. Moreover, the following condition can also be satisfied: 0.65<TL/EPD<5.50. Moreover, the following condition can also be satisfied: 0.80<TL/EPD<4.50. Moreover, the following condition can also be satisfied: 0.90<TL/EPD<2.50.

Figure 27:
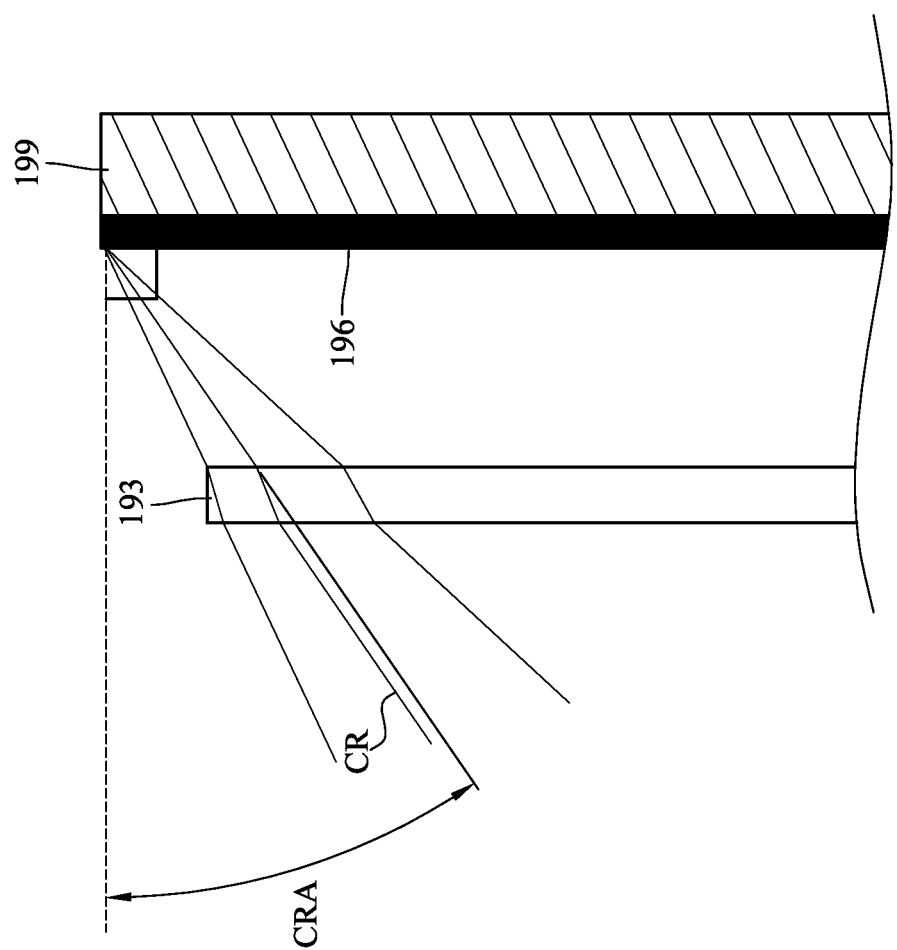
FIG. 27 shows a schematic view of CRA according to the 1st embodiment of the present disclosure.

When a chief ray angle at the maximum image height of the optical photographing lens assembly is CRA, the following condition can be satisfied: 30.0 [deg.]<CRA<70.0 [deg.]. Therefore, it is favorable for adjusting the incident angle of light on the image surface of the optical photographing lens assembly so as to collaborate with the image sensor and increase image surface area. Moreover, the following condition can also be satisfied: 33.0 [deg.]<CRA<50.0 [deg.]. Please refer to FIG. 27, which shows a schematic view of CRA according to the 1st embodiment of the present disclosure, wherein a chief ray CR is projected on the image surface 196 at the maximum image height, and the angle between a normal line of the image surface 196 and the chief ray CR is CRA.

When a central thickness of the first lens element is CT1, and an axial distance between the first lens element and the second lens element is T12, the following condition can be satisfied: 1.0<CT1/T12<60.0. Therefore, it is favorable for the first and second lens elements to collaborate with each other so as to adjust the travelling direction of light. Moreover, the following condition can also be satisfied: 1.5<CT1/T12<48.0.

When an axial distance between the image-side surface of the ninth lens element and the image surface is BL, and the maximum image height of the optical photographing lens assembly is ImgH, the following condition can be satisfied: 2.0<ImgH/BL<20.0. Therefore, it is favorable for obtaining a balance between the image surface area and back focal length, and also favorable for adjusting the incident angle of light on the image surface. Moreover, the following condition can also be satisfied: 2.2<ImgH/BL<12.0.

When the focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of the ninth lens element is f9, and a focal length of the i-th lens element is fi, the following condition can be satisfied: 1.5<Σ|f/fi|<10.0, wherein i=1, 2, 3, 4, 5, 6, 7, 8 and 9. Therefore, it is favorable for adjusting the refractive power distribution of the lens elements so as to correct aberrations and adjust the field of view. Moreover, the following condition can also be satisfied: 2.5<Σ|f/fi|<8.5, wherein i=1, 2, 3, 4, 5, 6, 7, 8 and 9.

When a maximum value among maximum effective radii of all lens surfaces of the optical photographing lens assembly is Ymax, and a minimum value among maximum effective radii of all lens surfaces of the optical photographing lens assembly is Ymin, the following condition can be satisfied: 1.5<Ymax/Ymin<6.0. Therefore, it is favorable for adjusting the ratio between the outer diameters of the lens elements so as to obtain a proper size distribution of the optical photographing lens assembly. Moreover, the following condition can also be satisfied: 2.0<Ymax/Ymin<5.0.

When the axial distance between the object-side surface of the first lens element and the image surface is TL, and the focal length of the optical photographing lens assembly is f, the following condition can be satisfied: 0.40<TL/f<9.0. Therefore, it is favorable for obtaining a balance between the total track length and field of view. Moreover, the following condition can also be satisfied: 0.50<TL/f<5.0. Moreover, the following condition can also be satisfied: 0.60<TL/f<3.0. Moreover, the following condition can also be satisfied: 0.70<TL/f<2.0.

When the axial distance between the object-side surface of the first lens element and the image-side surface of the ninth lens element is TD, and the axial distance between the image-side surface of the ninth lens element and the image surface is BL, the following condition can be satisfied: 2.10<TD/BL. Therefore, it is favorable for adjusting the position of lens elements and back focal length so as to miniaturize the optical photographing lens assembly, and it is also favorable for adjusting the field of view. Moreover, the following condition can also be satisfied: 3.00<TD/BL.

When a maximum value among all axial distances between each of all adjacent lens elements of the optical photographing lens assembly is ATmax, and a minimum value among central thicknesses of all lens elements of the optical photographing lens assembly is CTmin, the following condition can be satisfied: 0<ATmax/CTmin<15.0. Therefore, it is favorable for adjusting the lens element distribution so as to reduce the size of the optical photographing lens assembly. Moreover, the following condition can also be satisfied: 0.4<ATmax/CTmin<10.0. Moreover, the following condition can also be satisfied: 0.8<ATmax/CTmin<6.0. Moreover, the following condition can also be satisfied: 1.2<ATmax/CTmin<4.5.

When the focal length of the optical photographing lens assembly is f, and a composite focal length of the first lens element and the second lens element is f12, the following condition can be satisfied: 0.40<f12/f. Therefore, it is favorable for the first and second lens elements to collaborate with each other so as to reduce the total track length. Moreover, the following condition can also be satisfied: 0.50<f12/f<4.0. When the maximum image height of the optical photographing lens assembly is ImgH, and the maximum effective radius of the object-side surface of the first lens element is Y11, the following condition can be satisfied: 1.0<ImgH/Y11<10.0. Therefore, it is favorable for adjusting the travelling direction of light so as to obtain a balance between the field of view and image quality. Moreover, the following condition can also be satisfied: 1.5<ImgH/Y11<6.0.

When a maximum value among refractive indices of all plastic lens elements of the optical photographing lens assembly is Npmax, the following condition can be satisfied: 1.66 Npmax<1.80. Therefore, selecting plastic material having high refractive index is favorable for further correcting aberrations and miniaturizing the optical photographing lens assembly.

When a minimum value among Abbe numbers of all plastic lens elements of the optical photographing lens assembly is Vpmin, the following condition can be satisfied: 10.0<Vpmin 20.4. Therefore, selecting plastic material having small Abbe number is favorable for further correcting aberrations such as chromatic aberration.

When a curvature radius of the image-side surface of the ninth lens element is R18, and the focal length of the optical photographing lens assembly is f, the following condition can be satisfied: 0<|R18|/f<1.0. Therefore, it is favorable for adjusting the refractive power of the ninth lens element so as to ensure a proper back focal length. Moreover, the following condition can also be satisfied: 0<|R18|/f<0.50.

When the maximum effective radius of the object-side surface of the first lens element is Y11, and the maximum effective radius of the image-side surface of the ninth lens element is Y92, the following condition can be satisfied: 1.0<Y92/Y11<6.0. Therefore, it is favorable for arranging the outer diameters of lens elements on the object side and the image side of the optical photographing lens assembly so as to reduce size and adjust the field of view. Moreover, the following condition can also be satisfied: 1.3<Y92/Y11<4.5. Please refer to FIG. 26, which shows a schematic view of Y11 and Y92 according to the 1st embodiment of the present disclosure.

When half of a maximum field of view of the optical photographing lens assembly is HFOV, the following condition can be satisfied: 5.0 [deg.]<HFOV<120.0 [deg.]. Therefore, it is favorable for adjusting the field of view for various applications. Moreover, the following condition can also be satisfied: 15.0 [deg.]<HFOV<80.0 [deg.]. Therefore, it is favorable for reducing aberrations caused by adjusting the field of view, and also favorable for reducing the size of the optical photographing lens assembly. Moreover, the following condition can also be satisfied: 35.0 [deg.] <HFOV<45.0 [deg.]. Moreover, the following condition can also be satisfied: 5.0 [deg.]<HFOV<35.0 [deg.]. Therefore, it is favorable for obtaining a telephoto configuration. Moreover, the following condition can also be satisfied: 45.0 [deg.]<HFOV<80.0 [deg.]. Therefore, it is favorable for obtaining a wide angle configuration.

When the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, the Abbe number of the seventh lens element is V7, the Abbe number of the eighth lens element is V8, the Abbe number of the ninth lens element is V9, the Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, and a refractive index of the i-th lens element is Ni, at least one lens element of the optical photographing lens assembly can satisfy the following condition: 5.0<Vi/Ni<11.5, wherein i=1, 2, 3, 4, 5, 6, 7, 8 or 9. Therefore, it is favorable for arranging the lens material distribution so as to further correct aberrations.

When the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the eighth lens element is f8, and the focal length of the ninth lens element is f9, at least one of the following conditions can be satisfied: $-1.5<f/f1<3.5$; $-2.5<f/f2<2.5$; $-2.5<f/f3<2.5$; $-2.5<f/f4<2.5$; $-2.5<f/f5<2.5$; $-2.5<f/f6<2.5$; $-2.5<f/f7<2.5$; $-3.0<f/f8<3.0$; and $-3.5<f/f9<3.5$. Therefore, it is favorable for adjusting the refractive power of the lens elements so as to correct aberrations, reduce the total track length and adjust field of view. Moreover, at least one of the following conditions can also be satisfied: $-0.50<f/f1<2.5$; $-1.2<f/f2<1.4$; $-1.0<f/f3<1.4$; $-1.4<f/f4<1.5$; $-1.4<f/f5<1.2$; $-1.0<f/f6<1.8$; $-2.0<f/f7<2.0$; $-2.2<f/f8<2.2$; and $-2.5<f/f9<2.5$. Moreover, the following condition can also be satisfied: $-0.20<f/f1<2.0$.

According to the present disclosure, the aperture stop can be disposed between an imaged object and the fifth lens element. Therefore, it is favorable for reducing the size and adjusting the field of view of the optical photographing lens assembly. Moreover, the aperture stop can also be disposed between the imaged object and the fourth lens element. Moreover, the aperture stop can also be disposed between the imaged object and the third lens element.

According to the present disclosure, the aforementioned features and conditions can be utilized in numerous combinations so as to achieve corresponding effects.

According to the present disclosure, the lens elements of the optical photographing lens assembly can be made of either glass or plastic material. When the lens elements are made of glass material, the refractive power distribution of the optical photographing lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical photographing lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens assembly and the image surface to produce a telocentric effect, and thereby improves the image-sensing efficiency of an image sensor (for example, CCD or CMOS). A middle stop disposed between the first lens element and the image surface is favorable for enlarging the viewing angle of the optical photographing lens assembly and thereby provides a wider field of view for the same.

According to the present disclosure, the optical photographing lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
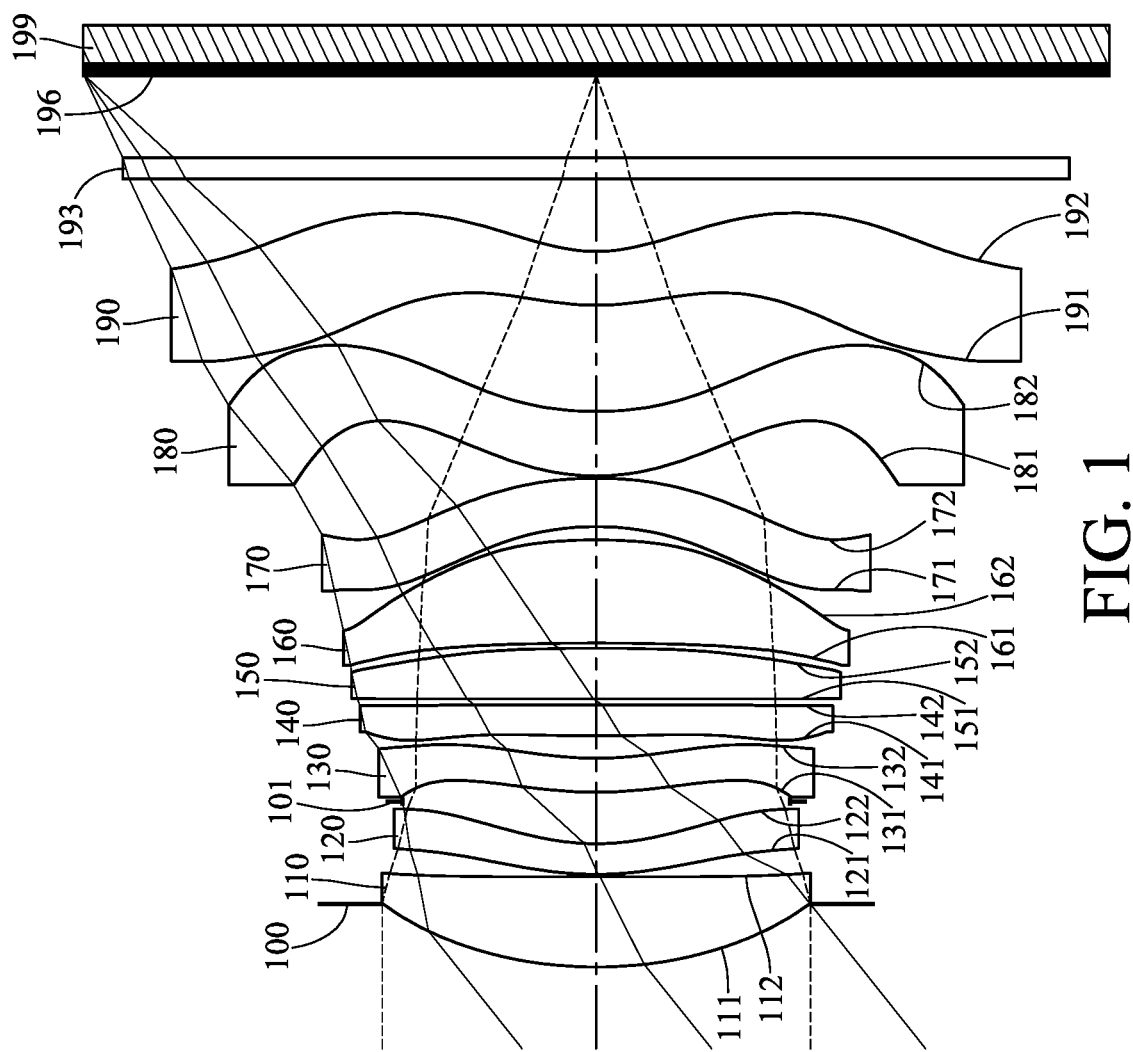
FIG. 1 is a schematic view of an image capturing unit according to the 1st embodiment of the present disclosure.
Figure 2:
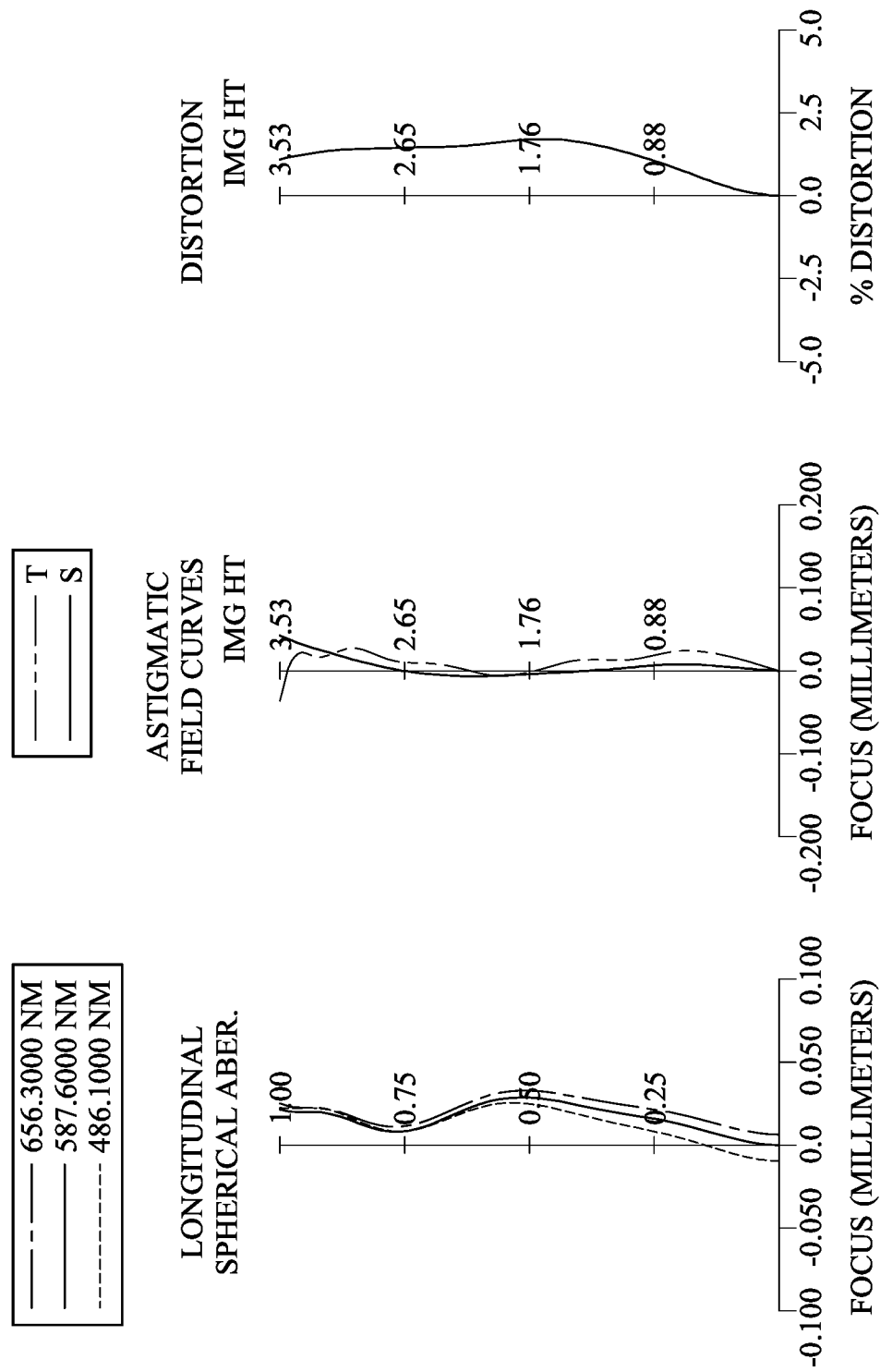
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical photographing lens assembly (its reference numeral is omitted) of the present disclosure and an image sensor 199. The optical photographing lens assembly includes, in order from an object side to an image side, an aperture stop 100, a first lens element 110, a second lens element 120, a stop 101, a third lens element 130, a fourth lens element 140, a fifth lens element 150, a sixth lens element 160, a seventh lens element 170, an eighth lens element 180, a ninth lens element 190, a filter 193 and an image surface 196. The optical photographing lens assembly includes nine lens elements (110, 120, 130, 140, 150, 160, 170, 180 and 190) with no additional lens element disposed between each of the adjacent nine lens elements.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The image-side surface 112 of the first lens element 110 has one inflection point. The image-side surface 112 of the first lens element 110 has one critical point in an off-axis region thereof.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has two inflection points. The image-side surface 122 of the second lens element 120 has one inflection point. The image-side surface 122 of the second lens element 120 has one critical point in an off-axis region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has three inflection points. The object-side surface 131 of the third lens element 130 has one critical point in an off-axis region thereof. The image-side surface 132 of the third lens element 130 has one critical point in an off-axis region thereof.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 being aspheric and the image-side surface 142 being spherical. The object-side surface 141 of the fourth lens element 140 has two inflection points. The object-side surface 141 of the fourth lens element 140 has two critical points in an off-axis region thereof.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 being spherical and the image-side surface 152 being aspheric.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has two inflection points. The image-side surface 162 of the sixth lens element 160 has one inflection point.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric. The object-side surface 171 of the seventh lens element 170 has two inflection points. The image-side surface 172 of the seventh lens element 170 has two inflection points. The object-side surface 171 of the seventh lens element 170 has two critical points in an off-axis region thereof. The image-side surface 172 of the seventh lens element 170 has one critical point in an off-axis region thereof.

The eighth lens element 180 with positive refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has one inflection point. The image-side surface 182 of the eighth lens element 180 has one inflection point. The object-side surface 181 of the eighth lens element 180 has one critical point in an off-axis region thereof. The image-side surface 182 of the eighth lens element 180 has one critical point in an off-axis region thereof.

The ninth lens element 190 with negative refractive power has an object-side surface 191 being convex in a paraxial region thereof and an image-side surface 192 being concave in a paraxial region thereof. The ninth lens element 190 is made of plastic material and has the object-side surface 191 and the image-side surface 192 being both aspheric. The object-side surface 191 of the ninth lens element 190 has two inflection points. The image-side surface 192 of the ninth lens element 190 has two inflection points. The object-side surface 191 of the ninth lens element 190 has two critical points in an off-axis region thereof. The image-side surface 192 of the ninth lens element 190 has one critical point in an off-axis region thereof.

The filter 193 is made of glass material and located between the ninth lens element 190 and the image surface 196, and will not affect the focal length of the optical photographing lens assembly. The image sensor 199 is disposed on or near the image surface 196 of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
- X is the relative distance between a point on the aspheric surface spaced at a distance Y from an optical axis and the tangential plane at the aspheric surface vertex on the optical axis;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14, 16, 18 and 20.

In the optical photographing lens assembly of the image capturing unit according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=4.37 millimeters (mm), Fno=1.48, HFOV=38.5 degrees (deg.).

When a maximum value among refractive indices of all plastic lens elements of the optical photographing lens assembly is Npmax, the following condition is satisfied: Npmax=1.701. In this embodiment, the first lens element 110, the second lens element 120, the third lens element 130, the fourth lens element 140, the fifth lens element 150, the sixth lens element 160, the seventh lens element 170, the eighth lens element 180 and the ninth lens element 190 are all made of plastic material, and among the first lens element 110, the second lens element 120, the third lens element 130, the fourth lens element 140, the fifth lens element 150, the sixth lens element 160, the seventh lens element 170, the eighth lens element 180 and the ninth lens element 190, the refractive index of the second lens element 120 is equal to the refractive index of the third lens element 130 and larger than the refractive indices of the other lens elements. Therefore, Npmax is equal to the refractive indices of the second lens element 120 and the third lens element 130.

When an Abbe number of the first lens element 110 is V1, and a refractive index of the first lens element 110 is N1, the following condition is satisfied: V1/N1=29.68.

When an Abbe number of the second lens element 120 is V2, and a refractive index of the second lens element 120 is N2, the following condition is satisfied: V2/N2=9.29.

When an Abbe number of the third lens element 130 is V3, and the refractive index of the third lens element 130 is N3, the following condition is satisfied: V3/N3=9.29.

When an Abbe number of the fourth lens element 140 is V4, and a refractive index of the fourth lens element 140 is N4, the following condition is satisfied: V4/N4=16.09.

When an Abbe number of the fifth lens element 150 is V5, and a refractive index of the fifth lens element 150 is N5, the following condition is satisfied: V5/N5=37.57.

When an Abbe number of the sixth lens element 160 is V6, and a refractive index of the sixth lens element 160 is N6, the following condition is satisfied: V6/N6=40.99.

When an Abbe number of the seventh lens element 170 is V7, and a refractive index of the seventh lens element 170 is N7, the following condition is satisfied: V7/N7=16.09.

When an Abbe number of the eighth lens element 180 is V8, and a refractive index of the eighth lens element 180 is N8, the following condition is satisfied: V8/N8=31.66.

When an Abbe number of the ninth lens element 190 is V9, and a refractive index of the ninth lens element 190 is N9, the following condition is satisfied: V9/N9=31.66.

When a minimum value among the Abbe numbers of all plastic lens elements of the optical photographing lens assembly is Vpmin, the following condition is satisfied: Vpmin=15.8. In this embodiment, among the first lens element 110, the second lens element 120, the third lens element 130, the fourth lens element 140, the fifth lens element 150, the sixth lens element 160, the seventh lens element 170, the eighth lens element 180 and the ninth lens element 190, the Abbe number of the second lens element 120 is equal to the Abbe number of the third lens element 130 and smaller than the Abbe numbers of the other lens elements. Therefore, Vpmin is equal to the Abbe numbers of the second lens element 120 and the third lens element 130.

When a sum of axial distances between each of all adjacent lens elements of the optical photographing lens assembly is ΣAT, and a sum of central thicknesses of all lens elements of the optical photographing lens assembly is ΣCT, the following condition is satisfied: ΣAT/ΣCT=0.41. In this embodiment, an axial distance between two adjacent lens elements is an air gap in a paraxial region between the two adjacent lens elements. In addition, in this embodiment, ΣAT is a sum of the axial distance between the first lens element 110 and the second lens element 120, the axial distance between the second lens element 120 and the third lens element 130, the axial distance between the third lens element 130 and the fourth lens element 140, the axial distance between the fourth lens element 140 and the fifth lens element 150, the axial distance between the fifth lens element 150 and the sixth lens element 160, the axial distance between the sixth lens element 160 and the seventh lens element 170, the axial distance between the seventh lens element 170 and the eighth lens element 180, and the axial distance between the eighth lens element 180 and the ninth lens element 190; ΣCT is a sum of the central thicknesses of the first lens element 110, the second lens element 120, the third lens element 130, the fourth lens element 140, the fifth lens element 150, the sixth lens element 160, the seventh lens element 170, the eighth lens element 180 and the ninth lens element 190.

When a maximum value among all axial distances between each of all adjacent lens elements of the optical photographing lens assembly is ATmax, and a minimum value among central thicknesses of all lens elements of the optical photographing lens assembly is CTmin, the following condition is satisfied: ATmax/CTmin=3.46. In this embodiment, the axial distance between the eighth lens element 180 and the ninth lens element 190 is larger than the axial distances between all the other two adjacent lens elements of the optical photographing lens assembly, and ATmax is equal to the axial distance between the eighth lens element 180 and the ninth lens element 190; the central thickness of the second lens element 120 is smaller than the central thicknesses of the other lens elements of the optical photographing lens assembly, and CTmin is equal to the central thickness of the second lens element 120.

When the central thickness of the first lens element 110 is CT1, and the axial distance between the first lens element 110 and the second lens element 120 is T12, the following condition is satisfied: CT1/T12=41.67.

When an axial distance between the aperture stop 100 and the image-side surface 192 of the ninth lens element 190 is SD, and an axial distance between the object-side surface 111 of the first lens element 110 and the image-side surface 192 of the ninth lens element 190 is TD, the following condition is satisfied: SD/TD=0.91.

When the axial distance between the object-side surface 111 of the first lens element 110 and the image-side surface 192 of the ninth lens element 190 is TD, and an axial distance between the image-side surface 192 of the ninth lens element 190 and the image surface 196 is BL, the following condition is satisfied: TD/BL=4.08. When an axial distance between the object-side surface 111 of the first lens element 110 and the image surface 196 is TL, the following condition is satisfied: TL=6.16 [mm].

When the axial distance between the object-side surface 111 of the first lens element 110 and the image surface 196 is TL, and an entrance pupil diameter of the optical photographing lens assembly is EPD, the following condition is satisfied: TL/EPD=2.08.

When the axial distance between the object-side surface 111 of the first lens element 110 and the image surface 196 is TL, and the focal length of the optical photographing lens assembly is f, the following condition is satisfied: TL/f=1.41. When the axial distance between the object-side surface 111 of the first lens element 110 and the image surface 196 is TL, and a maximum image height of the optical photographing lens assembly is ImgH, the following condition is satisfied: TL/ImgH=1.75.

When a curvature radius of the image-side surface 192 of the ninth lens element 190 is R18, and the focal length of the optical photographing lens assembly is f, the following condition is satisfied: |R18/f|=0.26.

When the focal length of the optical photographing lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, a focal length of the ninth lens element 190 is f9, and a focal length of the i-th lens element is fi, the following condition is satisfied: Σ|f/fi|=3.56, wherein i=1, 2, 3, 4, 5, 6, 7, 8 and 9.

When the focal length of the optical photographing lens assembly is f, and the entrance pupil diameter of the optical photographing lens assembly is EPD, the following condition is satisfied: f/EPD=1.48.

When the focal length of the optical photographing lens assembly is f, and the focal length of the first lens element 110 is f1, the following condition is satisfied: f/f1=0.81.

When the focal length of the optical photographing lens assembly is f, and the focal length of the second lens element 120 is f2, the following condition is satisfied: f/f2=−0.45.

When the focal length of the optical photographing lens assembly is f, and the focal length of the third lens element 130 is f3, the following condition is satisfied: f/f3=−0.14.

When the focal length of the optical photographing lens assembly is f, and the focal length of the fourth lens element 140 is f4, the following condition is satisfied: f/f4=0.27.

When the focal length of the optical photographing lens assembly is f, and the focal length of the fifth lens element 150 is f5, the following condition is satisfied: f/f5=0.17.

When the focal length of the optical photographing lens assembly is f, and the focal length of the sixth lens element 160 is f6, the following condition is satisfied: f/f6=0.32.

When the focal length of the optical photographing lens assembly is f, and the focal length of the seventh lens element 170 is f7, the following condition is satisfied: f/f7=−0.23.

When the focal length of the optical photographing lens assembly is f, and the focal length of the eighth lens element 180 is f8, the following condition is satisfied: f/f8=0.57.

When the focal length of the optical photographing lens assembly is f, and the focal length of the ninth lens element 190 is f9, the following condition is satisfied: f/f9=−0.60.

When the focal length of the optical photographing lens assembly is f, and a composite focal length of the first lens element 110 and the second lens element 120 is f12, the following condition is satisfied: f12/f=2.27.

When a chief ray angle at the maximum image height of the optical photographing lens assembly is CRA, the following condition is satisfied: CRA=34.51 [deg.].

When the maximum image height of the optical photographing lens assembly is ImgH, and the axial distance between the image-side surface 192 of the ninth lens element 190 and the image surface 196 is BL, the following condition is satisfied: ImgH/BL=2.91.

When the maximum image height of the optical photographing lens assembly is ImgH, a maximum effective radius of the object-side surface 111 of the first lens element 110 is Y11, the following condition is satisfied: ImgH/Y11=2.39.

When the number of lens elements being made of plastic material is LNP the following condition is satisfied: LNP=9.

When the maximum effective radius of the object-side surface 111 of the first lens element 110 is Y11, and a maximum effective radius of the image-side surface 192 of the ninth lens element 190 is Y92, the following condition is satisfied: Y92/Y11=1.98.

When a maximum value among maximum effective radii of all lens surfaces of the optical photographing lens assembly is Ymax, and a minimum value among maximum effective radii of all lens surfaces of the optical photographing lens assembly is Ymin, the following condition is satisfied: Ymax/Ymin=2.18. In this embodiment, among the first lens element 110, the second lens element 120, the third lens element 130, the fourth lens element 140, the fifth lens element 150, the sixth lens element 160, the seventh lens element 170, the eighth lens element 180 and the ninth lens element 190, the maximum effective radius of the image-side surface 192 of the ninth lens element 190 is larger than the maximum effective radii of the other lens surfaces, and Ymax is equal to the maximum effective radius of the image-side surface 192 of the ninth lens element 190; the maximum effective radius of the object-side surface 131 of the third lens element 130 is smaller than the maximum effective radii of the other lens surfaces, and Ymin is equal to the maximum effective radius of the object-side surface 131 of the third lens element 130.

When a vertical distance between a first inflection point on the image-side surface 112 of the first lens element 110 in order from the paraxial region thereof to the off-axis region thereof and the optical axis is YI121, and a maximum effective radius of the image-side surface 112 of the first lens element 110 is Y12, the following condition is satisfied: YI121/Y12=0.18.

When a vertical distance between a first non-axial critical point on the image-side surface 112 of the first lens element 110 in order from the paraxial region thereof to the off-axis region thereof and the optical axis is YC121, and the maximum effective radius of the image-side surface 112 of the first lens element 110 is Y12, the following condition is satisfied: YC121/Y12=0.35.

When a vertical distance between a first inflection point on the object-side surface 121 of the second lens element 120 in order from the paraxial region thereof to an off-axis region thereof and the optical axis is YI211, and a maximum effective radius of the object-side surface 121 of the second lens element 120 is Y21, the following condition is satisfied: YI211/Y21=0.50.

When a vertical distance between a second inflection point on the object-side surface 121 of the second lens element 120 in order from the paraxial region thereof to the off-axis region thereof and the optical axis is YI212, and the maximum effective radius of the object-side surface 121 of the second lens element 120 is Y21, the following condition is satisfied: YI212/Y21=0.93.

When a vertical distance between a first inflection point on the image-side surface 122 of the second lens element 120 in order from the paraxial region thereof to the off-axis region thereof and the optical axis is YI221, and a maximum effective radius of the image-side surface 122 of the second lens element 120 is Y22, the following condition is satisfied: YI221/Y22=0.54.

When a vertical distance between a first non-axial critical point on the image-side surface 122 of the second lens element 120 in order from the paraxial region thereof to the off-axis region thereof and the optical axis is YC221, and the maximum effective radius of the image-side surface 122 of the second lens element 120 is Y22, the following condition is satisfied: YC221/Y22=0.99.

When a vertical distance between a first inflection point on the object-side surface 131 of the third lens element 130 in order from the paraxial region thereof to the off-axis region thereof and the optical axis is YI311, and the maximum effective radius of the object-side surface 131 of the third lens element 130 is Y31, the following condition is satisfied: YI311/Y31=0.43.

When a vertical distance between a first inflection point the image-side surface 132 of the third lens element 130 in order from the paraxial region thereof to the off-axis region thereof and the optical axis is YI321, and a maximum effective radius of the image-side surface 132 of the third lens element 130 is Y32, the following condition is satisfied: YI321/Y32=0.37.

When a vertical distance between a second inflection point on the image-side surface 132 of the third lens element 130 in order from the paraxial region thereof to the off-axis region thereof and the optical axis is YI322, and the maximum effective radius of the image-side surface 132 of the third lens element 130 is Y32, the following condition is satisfied: YI322/Y32=0.87.

When a vertical distance between a third inflection point on the image-side surface 132 of the third lens element 130 in order from the paraxial region thereof to the off-axis region thereof and the optical axis is YI323, and the maximum effective radius of the image-side surface 132 of the third lens element 130 is Y32, the following condition is satisfied: YI323/Y32=0.94.

When a vertical distance between a first non-axial critical point on the object-side surface 131 of the third lens element 130 in order from the paraxial region thereof to the off-axis region thereof and the optical axis is YC311, and the maximum effective radius of the object-side surface 131 of the third lens element 130 is Y31, the following condition is satisfied: YC311/Y31=0.72.

When a vertical distance between a first non-axial critical point on the image-side surface 132 of the third lens element 130 in order from the paraxial region thereof to the off-axis region thereof and the optical axis is YC321, and the maximum effective radius of the image-side surface 132 of the third lens element 130 is Y32, the following condition is satisfied: YC321/Y32=0.69.

When a vertical distance between a first inflection point on the object-side surface 141 of the fourth lens element 140 in order from the paraxial region thereof to the off-axis region thereof and the optical axis is YI411, and a maximum effective radius of the object-side surface 141 of the fourth lens element 140 is Y41, the following condition is satisfied: YI411/Y41=0.22.

When a vertical distance between a second inflection point on the object-side surface 141 of the fourth lens element 140 in order from the paraxial region thereof to the off-axis region thereof and the optical axis is YI412, and the maximum effective radius of the object-side surface 141 of the fourth lens element 140 is Y41, the following condition is satisfied: YI412/Y41=0.66.

When a vertical distance between a first non-axial critical point on the object-side surface 141 of the fourth lens element 140 in order from the paraxial region thereof to the off-axis region thereof and the optical axis is YC411, and the maximum effective radius of the object-side surface 141 of the fourth lens element 140 is Y41, the following condition is satisfied: YC411/Y41=0.39.

When a vertical distance between a second non-axial critical point on the object-side surface 141 of the fourth lens element 140 in order from the paraxial region thereof to the off-axis region thereof and the optical axis is YC412, and the maximum effective radius of the object-side surface 141 of the fourth lens element 140 is Y41, the following condition is satisfied: YC412/Y41=0.80.

When a vertical distance between a first inflection point on the object-side surface 161 of the sixth lens element 160 in order from the paraxial region thereof to an off-axis region thereof and the optical axis is YI611, and a maximum effective radius of the object-side surface 161 of the sixth lens element 160 is Y61, the following condition is satisfied: YI611/Y61=0.91.

When a vertical distance between a second inflection point on the object-side surface 161 of the sixth lens element 160 in order from the paraxial region thereof to the off-axis region thereof and the optical axis is YI612, and the maximum effective radius of the object-side surface 161 of the sixth lens element 160 is Y61, the following condition is satisfied: YI612/Y61=0.92.

When a vertical distance between a first inflection point on the image-side surface 162 of the sixth lens element 160 in order from the paraxial region thereof to an off-axis region thereof and the optical axis is YI621, and a maximum effective radius of the image-side surface 162 of the sixth lens element 160 is Y62, the following condition is satisfied: YI621/Y62=0.89.

When a vertical distance between a first inflection point on the object-side surface 171 of the seventh lens element 170 in order from the paraxial region thereof to the off-axis region thereof and the optical axis is YI711, and a maximum effective radius of the object-side surface 171 of the seventh lens element 170 is Y71, the following condition is satisfied: YI711/Y71=0.56.

When a vertical distance between a second inflection point on the object-side surface 171 of the seventh lens element 170 in order from the paraxial region thereof to the off-axis region thereof and the optical axis is YI712, and the maximum effective radius of the object-side surface 171 of the seventh lens element 170 is Y71, the following condition is satisfied: YI712/Y71=0.93.

When a vertical distance between a first inflection point on the image-side surface 172 of the seventh lens element 170 in order from the paraxial region thereof to the off-axis region thereof and the optical axis is YI721, and a maximum effective radius of the image-side surface 172 of the seventh lens element 170 is Y72, the following condition is satisfied: YI721/Y72=0.62.

When a vertical distance between a second inflection point on the image-side surface 172 of the seventh lens element 170 in order from the paraxial region thereof to the off-axis region thereof and the optical axis is YI722, and the maximum effective radius of the image-side surface 172 of the seventh lens element 170 is Y72, the following condition is satisfied: YI722/Y72=0.98.

When a vertical distance between a first non-axial critical point on the object-side surface 171 of the seventh lens element 170 in order from the paraxial region thereof to the off-axis region thereof and the optical axis is YC711, and the maximum effective radius of the object-side surface 171 of the seventh lens element 170 is Y71, the following condition is satisfied: YC711/Y71=0.90.

When a vertical distance between a second non-axial critical point on the object-side surface 171 of the seventh lens element 170 in order from the paraxial region thereof to the off-axis region thereof and the optical axis is YC712, and the maximum effective radius of the object-side surface 171 of the seventh lens element 170 is Y71, the following condition is satisfied: YC712/Y71=0.96.

When a vertical distance between a first non-axial critical point on the image-side surface 172 of the seventh lens element 170 in order from the paraxial region thereof to the off-axis region thereof and the optical axis is YC721, and the maximum effective radius of the image-side surface 172 of the seventh lens element 170 is Y72, the following condition is satisfied: YC721/Y72=0.87.

When a vertical distance between a first inflection point on the object-side surface 181 of the eighth lens element 180 in order from the paraxial region thereof to the off-axis region thereof and the optical axis is YI811, and a maximum effective radius of the object-side surface 181 of the eighth lens element 180 is Y81, the following condition is satisfied: YI811/Y81=0.42.

When a vertical distance between a first inflection point on the image-side surface 182 of the eighth lens element 180 in order from the paraxial region thereof to the off-axis region thereof and the optical axis is YI821, and a maximum effective radius of the image-side surface 182 of the eighth lens element 180 is Y82, the following condition is satisfied: YI821/Y82=0.40.

When a vertical distance between a first non-axial critical point on the object-side surface 181 of the eighth lens element 180 in order from the paraxial region thereof to the off-axis region thereof and the optical axis is YC811, and the maximum effective radius of the object-side surface 181 of the eighth lens element 180 is Y81, the following condition is satisfied: YC811/Y81=0.70.

When a vertical distance between a first non-axial critical point on the image-side surface 182 of the eighth lens element 180 in order from the paraxial region thereof to the off-axis region thereof and the optical axis is YC821, and the maximum effective radius of the image-side surface 182 of the eighth lens element 180 is Y82, the following condition is satisfied: YC821/Y82=0.71.

When a vertical distance between a first inflection point on the object-side surface 191 of the ninth lens element 190 in order from the paraxial region thereof to the off-axis region thereof and the optical axis is YI911, and a maximum effective radius of the object-side surface 191 of the ninth lens element 190 is Y91, the following condition is satisfied: YI911/Y91=0.16.

When a vertical distance between a second inflection point on the object-side surface 191 of the ninth lens element 190 in order from the paraxial region thereof to the off-axis region thereof and the optical axis is YI912, and the maximum effective radius of the object-side surface 191 of the ninth lens element 190 is Y91, the following condition is satisfied: YI912/Y91=0.61.

When a vertical distance between a first inflection point on the image-side surface 192 of the ninth lens element 190 in order from the paraxial region thereof to the off-axis region thereof and the optical axis is YI921, and the maximum effective radius of the image-side surface 192 of the ninth lens element 190 is Y92, the following condition is satisfied: YI921/Y92=0.20.

When a vertical distance between a second inflection point on the image-side surface 192 of the ninth lens element 190 in order from the paraxial region thereof to the off-axis region thereof and the optical axis is YI922, and the maximum effective radius of the image-side surface 192 of the ninth lens element 190 is Y92, the following condition is satisfied: YI922/Y92=0.75.

When a vertical distance between a first non-axial critical point on the object-side surface 191 of the ninth lens element 190 in order from the paraxial region thereof to the off-axis region thereof and the optical axis is YC911, and the maximum effective radius of the object-side surface 191 of the ninth lens element 190 is Y91, the following condition is satisfied: YC911/Y91=0.32.

When a vertical distance between a second non-axial critical point on the object-side surface 191 of the ninth lens element 190 in order from the paraxial region thereof to the off-axis region thereof and the optical axis is YC912, and the maximum effective radius of the object-side surface 191 of the ninth lens element 190 is Y91, the following condition is satisfied: YC912/Y91=0.99.

When a vertical distance between a first non-axial critical point on the image-side surface 192 of the ninth lens element 190 in order from the paraxial region thereof to the off-axis region thereof and the optical axis is YC921, and the maximum effective radius of the image-side surface 192 of the ninth lens element 190 is Y92, the following condition is satisfied: YC921/Y92=0.47.

The detailed optical data of the 1st embodiment are shown in Table 1 and the aspheric surface data are shown in Table 2 below.

TABLE 1

1st Embodiment
f = 4.37 mm, Fno = 1.48, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.435 | | | | |
| 2 | Lens 1 | 2.977 | (ASP) | 0.625 | Plastic | 1.529 | 45.4 | 5.38 |
| 3 | | −60.625 | (ASP) | 0.015 | | | | |
| 4 | Lens 2 | 2.325 | (ASP) | 0.212 | Plastic | 1.701 | 15.8 | −9.76 |
| 5 | | 1.670 | (ASP) | 0.292 | | | | |
| 6 | Stop | Plano | | 0.064 | | | | |

TABLE 1-continued

1st Embodiment
f = 4.37 mm, Fno = 1.48, HFOV = 38.5 deg.

| Surface # | | Curvature Radius | | Thickness | Material | Index | Abbe # | Focal Length |
|---|---|---|---|---|---|---|---|---|
| 7 | Lens 3 | 2.907 | (ASP) | 0.235 | Plastic | 1.701 | 15.8 | −30.86 |
| 8 | | 2.477 | (ASP) | 0.154 | | | | |
| 9 | Lens 4 | 10.397 | (ASP) | 0.214 | Plastic | 1.614 | 26.0 | 16.16 |
| 10 | | −215.007 | (SPH) | 0.041 | | | | |
| 11 | Lens 5 | 577.696 | (SPH) | 0.351 | Plastic | 1.511 | 56.8 | 25.45 |
| 12 | | −13.297 | (ASP) | 0.036 | | | | |
| 13 | Lens 6 | −13.576 | (ASP) | 0.712 | Plastic | 1.493 | 61.2 | 13.87 |
| 14 | | −4.625 | (ASP) | 0.092 | | | | |
| 15 | Lens 7 | −2.082 | (ASP) | 0.335 | Plastic | 1.614 | 26.0 | −18.84 |
| 16 | | −2.695 | (ASP) | 0.015 | | | | |
| 17 | Lens 8 | 1.577 | (ASP) | 0.446 | Plastic | 1.516 | 48.0 | 7.65 |
| 18 | | 2.372 | (ASP) | 0.734 | | | | |
| 19 | Lens 9 | 1.774 | (ASP) | 0.372 | Plastic | 1.516 | 48.0 | −7.28 |
| 20 | | 1.119 | (ASP) | 0.500 | | | | |
| 21 | Filter | Plano | | 0.145 | Glass | 1.517 | 64.2 | — |
| 22 | | Plano | | 0.567 | | | | |
| 23 | Image | Plano | | — | | | | |

Note:
Reference wavelength is 587.6 nm (d-line).
An effective radius of the stop 101 (Surface 6) is 1.340 mm.

TABLE 2

Aspheric Coefficients

| Surface # | 2 | 3 | 4 | 5 | 7 |
|---|---|---|---|---|---|
| k= | 2.0612E+00 | −9.0000E+01 | −1.3319E+01 | −4.4188E+00 | −4.4406E−01 |
| A4= | −2.7002E−03 | 2.2434E−02 | 2.3519E−02 | −4.1772E−02 | −1.1289E−01 |
| A6= | −3.0946E−03 | −1.7519E−02 | −6.1898E−02 | 3.1773E−02 | 4.5550E−02 |
| A8= | 9.9028E−04 | 5.0204E−03 | 2.5986E−02 | −6.7094E−02 | −1.5520E−02 |
| A10= | −8.9450E−04 | 3.6604E−03 | 2.8854E−03 | 5.3709E−02 | −2.1486E−02 |
| A12= | 3.7105E−04 | −2.8381E−03 | −5.3608E−03 | −2.0893E−02 | 1.3536E−02 |
| A14= | −9.3489E−05 | 5.6275E−04 | 1.2717E−03 | 3.3168E−03 | −2.3139E−03 |

| Surface # | 8 | 9 | 12 | 13 | 14 |
|---|---|---|---|---|---|
| k= | −2.8300E+00 | 1.7597E+01 | 5.0154E+01 | 5.2032E+01 | 5.3332E−01 |
| A4= | −1.3273E−01 | −6.3898E−02 | 5.9091E−02 | 7.9540E−02 | −1.9563E−01 |
| A6= | 6.8582E−02 | −3.5503E−03 | −1.8770E−01 | −1.8898E−01 | 1.8283E−01 |
| A8= | −4.7204E−02 | −8.6764E−03 | 2.0355E−01 | 2.0010E−01 | −1.1077E−01 |
| A10= | 1.7938E−02 | 2.4778E−02 | −1.0737E−01 | −1.0834E−01 | 4.8098E−02 |
| A12= | −6.9968E−04 | −1.0297E−02 | 2.8068E−02 | 2.8649E−02 | −1.4105E−02 |
| A14= | −5.9872E−04 | 1.2694E−03 | −2.9037E−03 | −2.8743E−03 | 2.2294E−03 |
| A16= | — | — | — | −1.6039E−05 | −1.1688E−04 |

| Surface # | 15 | 16 | 17 | 18 | 19 |
|---|---|---|---|---|---|
| k= | −3.0083E+00 | 3.3293E−01 | −4.0311E+00 | −1.0296E+00 | −4.6924E+00 |
| A4= | −1.6101E−01 | −7.0267E−02 | 6.7284E−02 | 1.1337E−01 | −2.2770E−01 |
| A6= | 2.4602E−01 | 9.7102E−02 | −8.1389E−02 | −1.2990E−01 | 1.0965E−01 |
| A8= | −2.1299E−01 | −6.2434E−02 | 3.4291E−02 | 5.7212E−02 | −3.9766E−02 |
| A10= | 1.2125E−01 | 2.4087E−02 | −1.1688E−02 | −1.5173E−02 | 1.0855E−02 |
| A12= | −4.0710E−02 | −3.9697E−03 | 3.1160E−03 | 2.5000E−03 | −1.8976E−03 |
| A14= | 7.3291E−03 | 8.2330E−05 | −4.8557E−04 | −2.4420E−04 | 1.8923E−04 |
| A16= | −5.5269E−04 | 2.6684E−05 | 6.3351E−06 | 1.2638E−05 | −8.9594E−06 |
| A18= | — | — | 8.2931E−06 | −3.3268E−07 | 6.1674E−08 |
| A20= | — | — | −7.1273E−07 | 9.3260E−09 | 6.3391E−09 |

| Surface # | 20 |
|---|---|
| k= | −3.3977E+00 |
| A4= | −1.6317E−01 |
| A6= | 9.0748E−02 |
| A8= | −3.9504E−02 |
| A10= | 1.2314E−02 |
| A12= | −2.6493E−03 |
| A14= | 3.8174E−04 |
| A16= | −3.4766E−05 |
| A18= | 1.7914E−06 |
| A20= | −3.9542E−08 |

In Table 1, the curvature radius, the thickness and the focal length are shown in millimeters (mm). Surface numbers 0-23 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
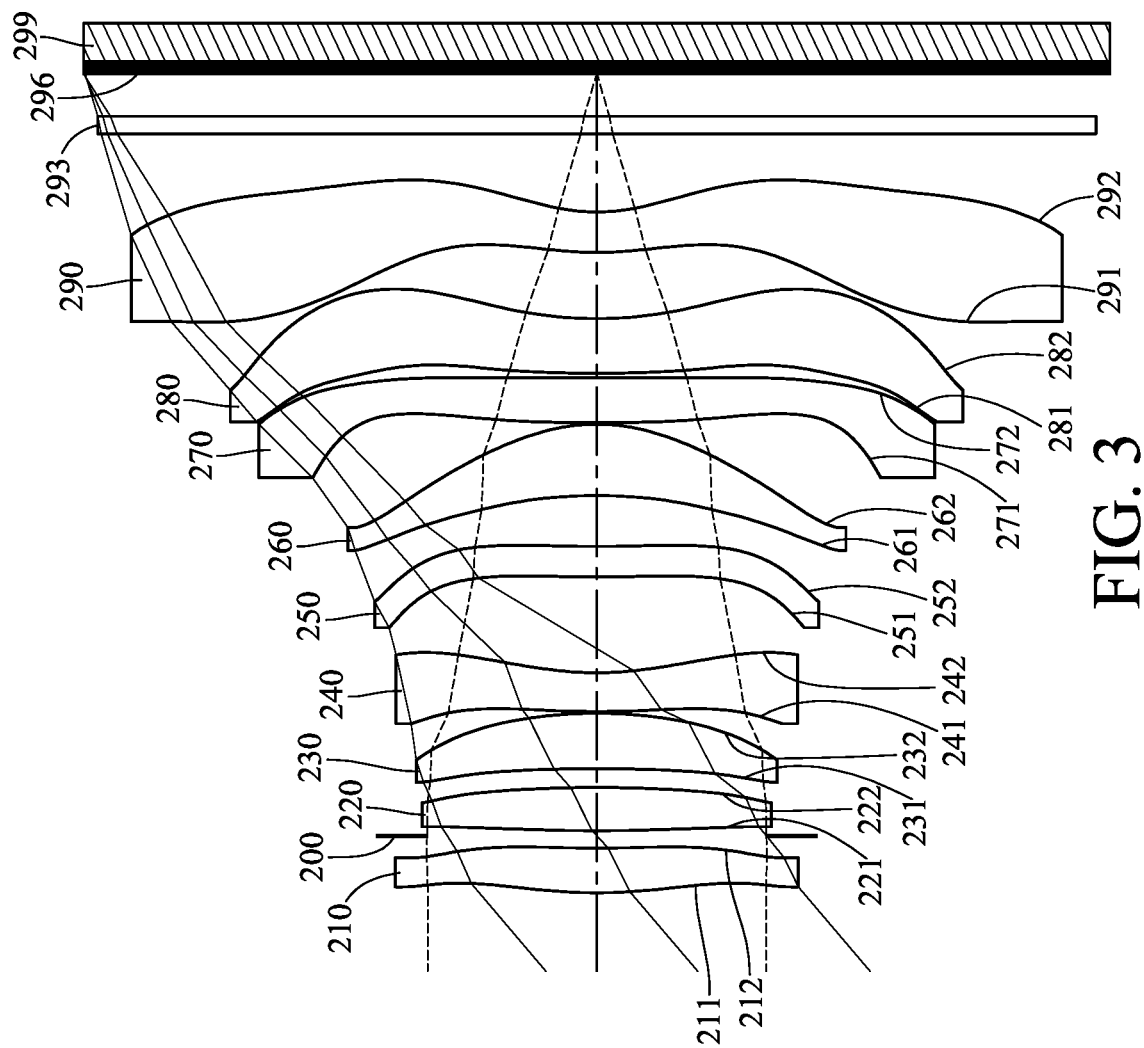
FIG. 3 is a schematic view of an image capturing unit according to the 2nd embodiment of the present disclosure.
Figure 4:
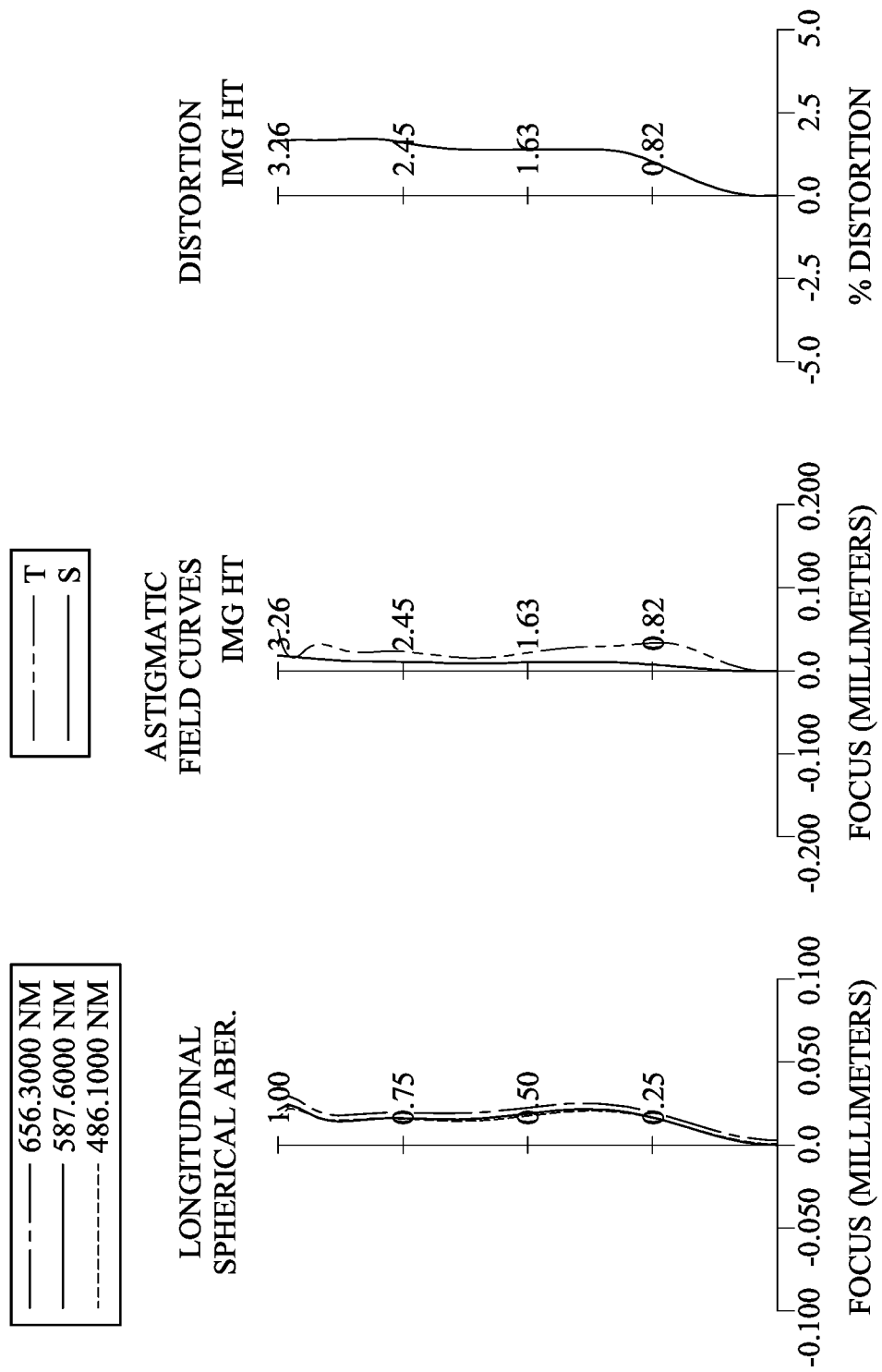
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical photographing lens assembly (its reference numeral is omitted) of the present disclosure and an image sensor 299. The optical photographing lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, an eighth lens element 280, a ninth lens element 290, a filter 293 and an image surface 296. The optical photographing lens assembly includes nine lens elements (210, 220, 230, 240, 250, 260, 270, 280 and 290) with no additional lens element disposed between each of the adjacent nine lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has two inflection points. The image-side surface 212 of the first lens element 210 has two inflection points. The object-side surface 211 of the first lens element 210 has two critical points in an off-axis region thereof. The image-side surface 212 of the first lens element 210 has two critical points in an off-axis region thereof.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has three inflection points. The image-side surface 222 of the second lens element 220 has one inflection point. The object-side surface 221 of the second lens element 220 has one critical point in an off-axis region thereof.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has one inflection point.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has two inflection points. The image-side surface 242 of the fourth lens element 240 has one inflection point. The object-side surface 241 of the fourth lens element 240 has one critical point in an off-axis region thereof. The image-side surface 242 of the fourth lens element 240 has one critical point in an off-axis region thereof.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has two inflection points. The image-side surface 252 of the fifth lens element 250 has two inflection points. The object-side surface 251 of the fifth lens element 250 has one critical point in an off-axis region thereof. The image-side surface 252 of the fifth lens element 250 has one critical point in an off-axis region thereof.

The sixth lens element 260 with positive refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has one inflection point. The image-side surface 262 of the sixth lens element 260 has one inflection point. The image-side surface 262 of the sixth lens element 260 has one critical point in an off-axis region thereof.

The seventh lens element 270 with positive refractive power has an object-side surface 271 being convex in a paraxial region thereof and an image-side surface 272 being convex in a paraxial region thereof. The seventh lens element 270 is made of plastic material and has the object-side surface 271 and the image-side surface 272 being both aspheric. The object-side surface 271 of the seventh lens element 270 has one inflection point. The image-side surface 272 of the seventh lens element 270 has two inflection points. The object-side surface 271 of the seventh lens element 270 has one critical point in an off-axis region thereof. The image-side surface 272 of the seventh lens element 270 has two critical points in an off-axis region thereof.

The eighth lens element 280 with negative refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has two inflection points. The image-side surface 282 of the eighth lens element 280 has two inflection points. The object-side surface 281 of the eighth lens element 280 has one critical point in an off-axis region thereof. The image-side surface 282 of the eighth lens element 280 has one critical point in an off-axis region thereof.

The ninth lens element 290 with negative refractive power has an object-side surface 291 being convex in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has three inflection points. The image-side surface 292 of the ninth lens element 290 has three inflection points. The object-side surface 291 of the ninth lens element 290 has three critical points in an off-axis region thereof. The image-side surface 292 of the ninth lens element 290 has one critical point in an off-axis region thereof.

The filter 293 is made of glass material and located between the ninth lens element 290 and the image surface 296, and will not affect the focal length of the optical photographing lens assembly. The image sensor 299 is disposed on or near the image surface 296 of the optical photographing lens assembly.

The detailed optical data of the 2nd embodiment are shown in Table 3 and the aspheric surface data are shown in Table 4 below.

TABLE 3

2nd Embodiment
f = 3.77 mm, Fno = 1.75, HFOV = 40.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.242 (ASP) | 0.285 | Plastic | 1.532 | 57.1 | 10.54 |
| 2 | | 7.445 (ASP) | 0.078 | | | | |
| 3 | Ape. Stop | Plano | 0.032 | | | | |
| 4 | Lens 2 | 8.204 (ASP) | 0.276 | Plastic | 1.532 | 57.1 | 8.10 |
| 5 | | −8.969 (ASP) | 0.121 | | | | |
| 6 | Lens 3 | −9.386 (ASP) | 0.353 | Plastic | 1.532 | 57.1 | 7.51 |
| 7 | | −2.838 (ASP) | 0.010 | | | | |
| 8 | Lens 4 | 5.085 (ASP) | 0.248 | Plastic | 1.642 | 22.5 | −5.62 |
| 9 | | 2.071 (ASP) | 0.611 | | | | |
| 10 | Lens 5 | 8.843 (ASP) | 0.194 | Plastic | 1.686 | 18.4 | −60.78 |
| 11 | | 7.231 (ASP) | 0.324 | | | | |
| 12 | Lens 6 | −3.736 (ASP) | 0.456 | Plastic | 1.532 | 57.1 | 3.01 |
| 13 | | −1.169 (ASP) | 0.010 | | | | |
| 14 | Lens 7 | 25.243 (ASP) | 0.286 | Plastic | 1.582 | 30.2 | 34.52 |
| 15 | | −98.351 (ASP) | 0.029 | | | | |
| 16 | Lens 8 | 13.422 (ASP) | 0.348 | Plastic | 1.566 | 37.4 | −6.09 |
| 17 | | 2.718 (ASP) | 0.422 | | | | |
| 18 | Lens 9 | 2.259 (ASP) | 0.257 | Plastic | 1.562 | 44.6 | −4.44 |
| 19 | | 1.136 (ASP) | 0.500 | | | | |
| 20 | Filter | Plano | 0.110 | Glass | 1.517 | 64.2 | — |
| 21 | | Plano | 0.271 | | | | |
| 22 | Image | Plano | — | | | | |

Note:
Reference wavelength is 587.6 nm (d-line).
An effective radius of the image-side surface 232 (Surface 7) is 1.150 mm.

TABLE 4

Aspheric Coefficients

| Surface # | 1 | 2 | 4 | 5 | 6 |
|---|---|---|---|---|---|
| k= | −5.7139E−01 | 1.2246E+01 | 3.3193E+01 | 5.3579E+01 | 5.7437E+01 |
| A4= | −8.1648E−02 | −1.6130E−01 | −9.9241E−02 | −8.8595E−03 | 1.6006E−02 |
| A6= | −1.6653E−02 | 2.6571E−02 | 8.2021E−02 | 8.3954E−02 | 2.3483E−02 |
| A8= | −3.7456E−02 | 4.1303E−02 | 2.0706E−02 | −1.4630E−01 | −1.4233E−01 |
| A10= | 4.7251E−02 | −3.1717E−02 | −7.9155E−02 | 6.5515E−02 | 1.3117E−01 |
| A12= | −1.1160E−02 | 1.1829E−02 | 3.0756E−02 | 2.1891E−03 | −3.0672E−02 |

| Surface # | 7 | 8 | 9 | 10 | 11 |
|---|---|---|---|---|---|
| k= | −2.6976E+01 | 1.6840E+00 | 2.5612E−01 | 2.9219E+01 | 1.1820E+00 |
| A4= | −8.5272E−02 | −1.4034E−01 | −2.0986E−01 | −1.7208E−01 | −2.0231E−01 |
| A6= | −1.0867E−02 | 2.5843E−02 | 1.8259E−02 | 1.8288E−01 | 2.5255E−01 |
| A8= | 7.3429E−03 | −1.8428E−03 | −2.0047E−01 | −3.0834E−01 | −3.3674E−01 |
| A10= | −3.5119E−04 | −1.3941E−02 | 1.3345E−01 | 2.8042E−01 | 2.3805E−01 |
| A12= | −7.5949E−04 | 8.7614E−03 | −5.0916E−02 | −1.4122E−01 | −9.1168E−02 |
| A14= | — | — | 8.4877E−03 | 2.8694E−02 | 1.4837E−02 |

| Surface # | 12 | 13 | 14 | 15 | 16 |
|---|---|---|---|---|---|
| k= | 1.5306E+00 | −1.0607E+00 | −5.5358E+01 | 7.9432E+01 | −9.6680E+01 |
| A4= | −1.8937E−01 | 1.1838E−01 | 1.1045E−01 | −7.6997E−03 | 1.0687E−01 |
| A6= | 4.4734E−01 | −7.1910E−02 | −1.3826E−01 | 6.2112E−02 | −1.1623E−01 |
| A8= | −4.5443E−01 | 6.0233E−02 | 8.9071E−02 | −8.5837E−02 | 2.0280E−02 |
| A10= | 2.2045E−01 | −6.4281E−02 | −4.0925E−02 | 4.8806E−02 | 1.3576E−02 |
| A12= | −4.1067E−02 | 4.1390E−02 | 1.2111E−02 | −1.3989E−02 | −6.7297E−03 |

TABLE 4-continued

| Aspheric Coefficients | | | | |
|---|---|---|---|---|
| A14= | −2.6657E−03 | −1.2604E−02 | −2.2419E−03 | 1.9919E−03 | 1.0952E−03 |
| A16= | 1.3776E−03 | 1.4922E−03 | 1.9245E−04 | −1.1229E−04 | −6.1750E−05 |

| Surface # | 17 | 18 | 19 |
|---|---|---|---|
| k= | −1.3452E+00 | −6.1261E+00 | −4.0887E+00 |
| A4= | 6.4156E−02 | −2.3574E−01 | −1.6521E−01 |
| A6= | −1.5016E−01 | 7.8743E−02 | 6.1945E−02 |
| A8= | 8.8318E−02 | −9.7518E−03 | −1.2721E−02 |
| A10= | −2.9776E−02 | −1.6515E−04 | 1.7203E−03 |
| A12= | 5.9978E−03 | 1.7355E−04 | −1.6558E−04 |
| A14= | −6.7100E−04 | −1.7088E−05 | 1.0337E−05 |
| A16= | 3.2002E−05 | 5.4414E−07 | −2.9971E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.77 | YI211/Y21 | 0.44 |
| Fno | 1.75 | YI212/Y21 | 0.46 |
| HFOV [deg.] | 40.3 | YI213/Y21 | 0.74 |
| Npmax | 1.686 | YI221/Y22 | 0.92 |
| V1/N1 | 37.27 | YI311/Y31 | 0.86 |
| V2/N2 | 37.27 | YI411/Y41 | 0.30 |
| V3/N3 | 37.27 | YI412/Y41 | 0.97 |
| V4/N4 | 13.70 | YI421/Y42 | 0.48 |
| V5/N5 | 10.90 | YI511/Y51 | 0.20 |
| V6/N6 | 37.27 | YI512/Y51 | 0.98 |
| V7/N7 | 19.11 | YI521/Y52 | 0.19 |
| V8/N8 | 23.91 | YI522/Y52 | 0.95 |
| V9/N9 | 28.57 | YI611/Y61 | 0.84 |
| Vpmin | 18.4 | YI621/Y62 | 0.76 |
| ΣAT/ΣCT | 0.61 | YI711/Y71 | 0.45 |
| ATmax/CTmin | 3.15 | YI721/Y72 | 0.17 |
| CT1/T12 | 2.59 | YI722/Y72 | 0.37 |
| SD/TD | 0.92 | YI811/Y81 | 0.33 |
| TD/BL | 4.93 | YI812/Y81 | 0.95 |
| TL [mm] | 5.22 | YI821/Y82 | 0.32 |
| TL/EPD | 2.42 | YI822/Y82 | 0.95 |
| TL/f | 1.38 | YI911/Y91 | 0.14 |
| TL/ImgH | 1.60 | YI912/Y91 | 0.55 |
| |R18/f| | 0.30 | YI913/Y91 | 0.96 |
| Σ|f/fi| | 4.89 | YI921/Y92 | 0.18 |
| f/EPD | 1.75 | YI922/Y92 | 0.57 |
| f/f1 | 0.36 | YI923/Y92 | 0.68 |
| f/f2 | 0.47 | YC111/Y11 | 0.68 |
| f/f3 | 0.50 | YC112/Y11 | 0.98 |
| f/f4 | −0.67 | YC121/Y12 | 0.40 |
| f/f5 | −0.06 | YC122/Y12 | 0.98 |
| f/f6 | 1.25 | YC211/Y21 | 0.95 |
| f/f7 | 0.11 | YC411/Y41 | 0.53 |
| f/f8 | −0.62 | YC421/Y42 | 0.86 |
| f/f9 | −0.85 | YC511/Y51 | 0.35 |
| f12/f | 1.25 | YC521/Y52 | 0.35 |
| CRA [deg.] | 23.60 | YC621/Y62 | 0.99 |
| ImgH/BL | 3.71 | YC711/Y71 | 0.64 |
| ImgH/Y11 | 2.54 | YC721/Y72 | 0.26 |
| LNP | 9 | YC722/Y72 | 0.43 |
| Y92/Y11 | 2.31 | YC811/Y81 | 0.48 |
| Ymax/Ymin | 2.71 | YC821/Y82 | 0.55 |
| YI111/Y11 | 0.40 | YC911/Y91 | 0.26 |
| YI112/Y11 | 0.86 | YC912/Y91 | 0.91 |

-continued

| 2nd Embodiment | | | |
|---|---|---|---|
| YI121/Y12 | 0.23 | YC913/Y91 | 0.99 |
| YI122/Y12 | 0.83 | YC921/Y92 | 0.40 |

3rd Embodiment

Figure 5:
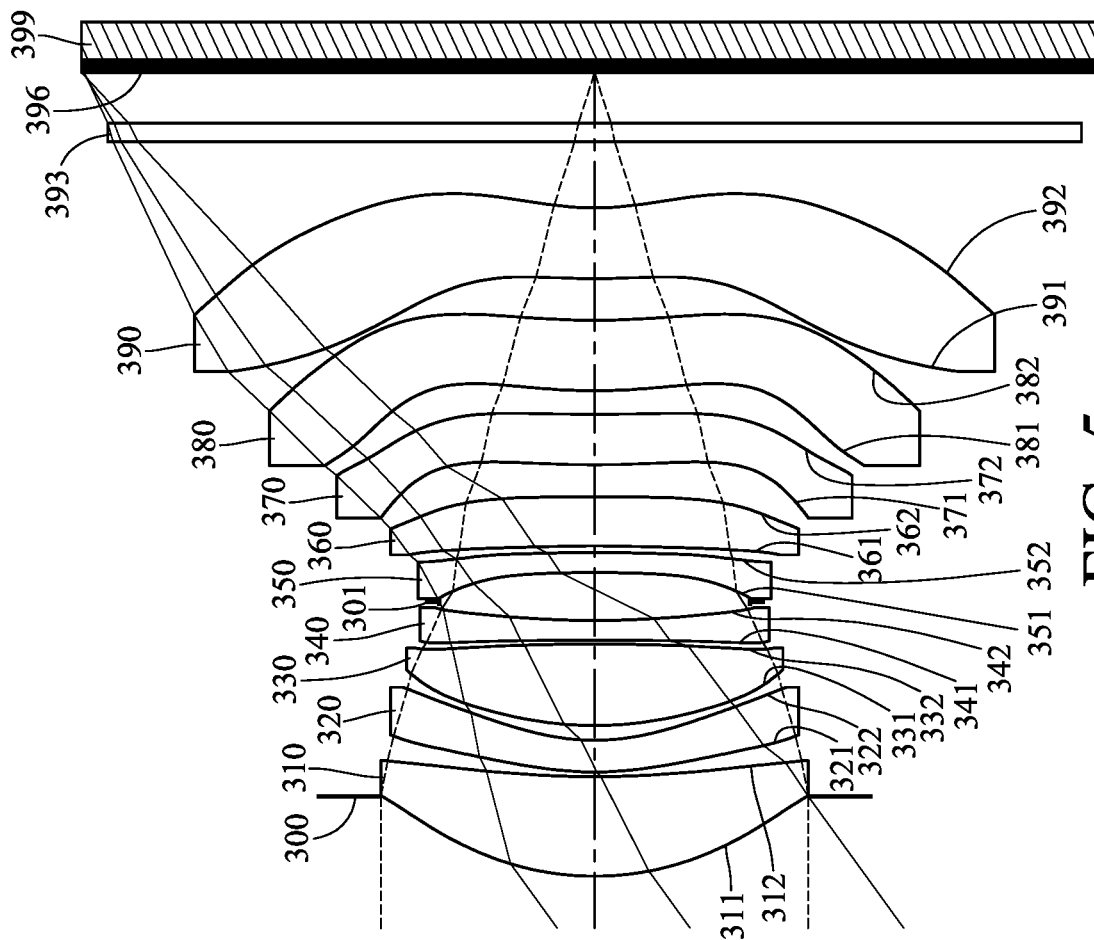
FIG. 5 is a schematic view of an image capturing unit according to the 3rd embodiment of the present disclosure.
Figure 6:
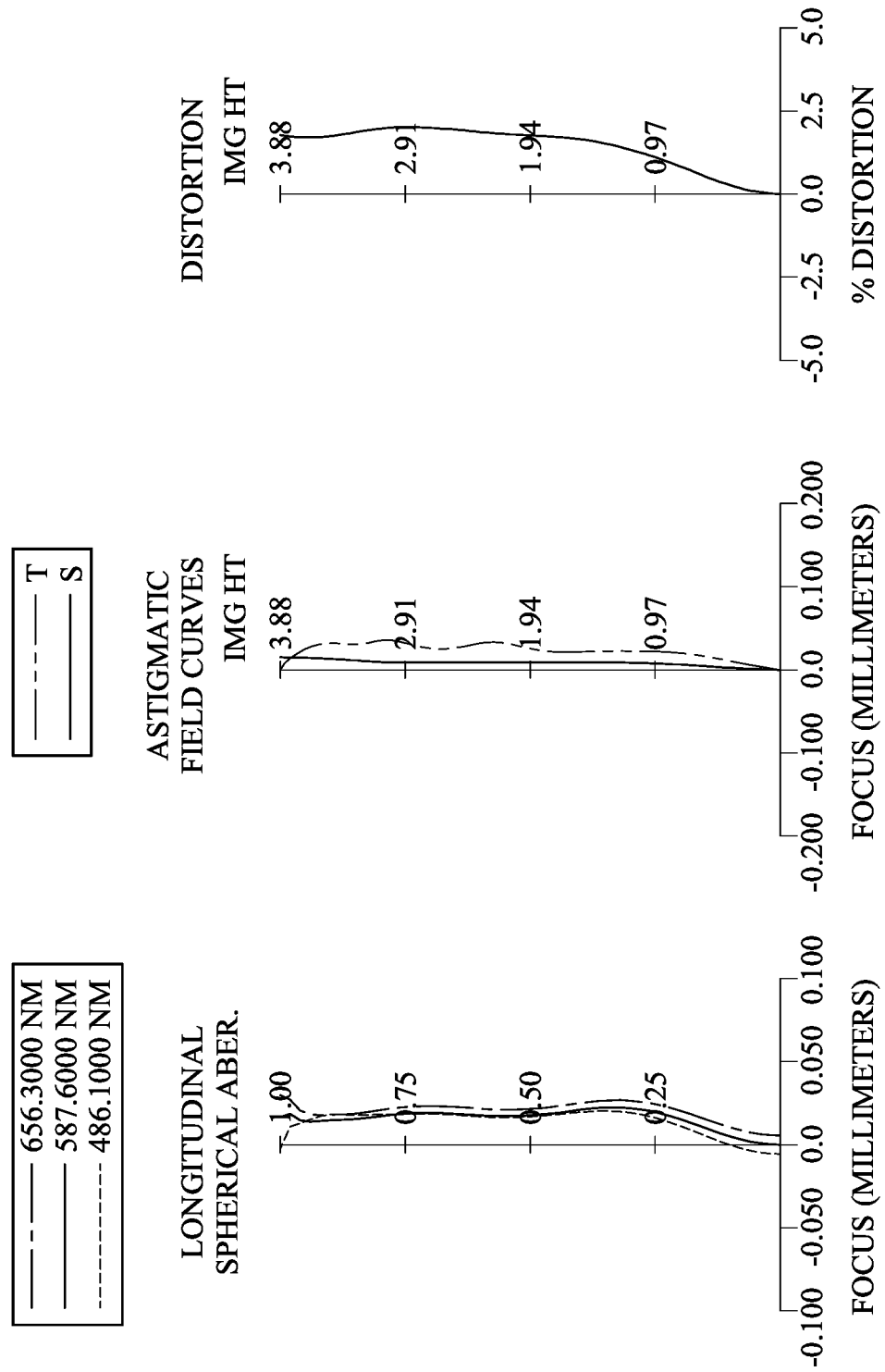
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical photographing lens assembly (its reference numeral is omitted) of the present disclosure and an image sensor 399. The optical photographing lens assembly includes, in order from an object side to an image side, an aperture stop 300, a first lens element 310, a second lens element 320, a third lens element 330, a fourth lens element 340, a stop 301, a fifth lens element 350, a sixth lens element 360, a seventh lens element 370, an eighth lens element 380, a ninth lens element 390, a filter 393 and an image surface 396. The optical photographing lens assembly includes nine lens elements (310, 320, 330, 340, 350, 360, 370, 380 and 390) with no additional lens element disposed between each of the adjacent nine lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has two inflection points.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The image-side surface 322 of the second lens element 320 has one inflection point.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The image-side surface 332 of the third lens element 330 has one inflection point. The image-side surface 332 of the third lens element 330 has one critical point in an off-axis region thereof.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The object-side surface 341 of the fourth lens element 340 has one critical point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has one inflection point.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has three inflection points. The image-side surface 362 of the sixth lens element 360 has one critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has one inflection point. The image-side surface 372 of the seventh lens element 370 has three inflection points. The object-side surface 371 of the seventh lens element 370 has one critical point in an off-axis region thereof. The image-side surface 372 of the seventh lens element 370 has one critical point in an off-axis region thereof.

The eighth lens element 380 with positive refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has three inflection points. The image-side surface 382 of the eighth lens element 380 has two inflection points. The object-side surface 381 of the eighth lens element 380 has one critical point in an off-axis region thereof. The image-side surface 382 of the eighth lens element 380 has one critical point in an off-axis region thereof.

The ninth lens element 390 with negative refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has two inflection points. The image-side surface 392 of the ninth lens element 390 has two inflection points. The object-side surface 391 of the ninth lens element 390 has one critical point in an off-axis region thereof. The image-side surface 392 of the ninth lens element 390 has one critical point in an off-axis region thereof.

The filter 393 is made of glass material and located between the ninth lens element 390 and the image surface 396, and will not affect the focal length of the optical photographing lens assembly. The image sensor 399 is disposed on or near the image surface 396 of the optical photographing lens assembly.

The detailed optical data of the 3rd embodiment are shown in Table 5 and the aspheric surface data are shown in Table 6 below.

TABLE 5

3rd Embodiment
f = 5.24 mm, Fno = 1.62, HFOV = 35.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.606 | | | | |
| 2 | Lens 1 | 2.189 (ASP) | 0.755 | Plastic | 1.532 | 57.1 | 5.60 |
| 3 | | 7.260 (ASP) | 0.035 | | | | |
| 4 | Lens 2 | 2.547 (ASP) | 0.240 | Plastic | 1.600 | 27.0 | −9.18 |
| 5 | | 1.680 (ASP) | 0.113 | | | | |
| 6 | Lens 3 | 2.801 (ASP) | 0.617 | Plastic | 1.532 | 57.1 | 4.62 |
| 7 | | −18.383 (ASP) | 0.030 | | | | |
| 8 | Lens 4 | −28.935 (ASP) | 0.150 | Plastic | 1.600 | 27.0 | −10.52 |
| 9 | | 8.088 (ASP) | 0.141 | | | | |
| 10 | Stop | Plano | 0.221 | | | | |
| 11 | Lens 5 | −14.663 (ASP) | 0.152 | Plastic | 1.642 | 22.5 | −188.55 |
| 12 | | −16.753 (ASP) | 0.050 | | | | |
| 13 | Lens 6 | −16.172 (ASP) | 0.370 | Plastic | 1.639 | 23.5 | −17.75 |
| 14 | | 38.207 (ASP) | 0.246 | | | | |
| 15 | Lens 7 | 8.056 (ASP) | 0.383 | Plastic | 1.582 | 30.2 | 22.53 |
| 16 | | 20.504 (ASP) | 0.179 | | | | |
| 17 | Lens 8 | 4.712 (ASP) | 0.534 | Plastic | 1.600 | 27.0 | 27.09 |
| 18 | | 6.353 (ASP) | 0.316 | | | | |
| 19 | Lens 9 | 5.508 (ASP) | 0.536 | Plastic | 1.532 | 57.1 | −6.98 |
| 20 | | 2.143 (ASP) | 0.500 | | | | |
| 21 | Filter | Plano | 0.145 | Glass | 1.517 | 64.2 | — |

TABLE 5-continued

3rd Embodiment
f = 5.24 mm, Fno = 1.62, HFOV = 35.9 deg.

| Surface # | | Curvature Radius | Thickness | Material | Index | Abbe # | Focal Length |
|---|---|---|---|---|---|---|---|
| 22 | | Plano | 0.382 | | | | |
| 23 | Image | Plano | — | | | | |

Note:
Reference wavelength is 587.6 nm (d-line).
An effective radius of the stop 301 (Surface 10) is 1.175 mm.

TABLE 6

Aspheric Coefficients

| Surface # | 2 | 3 | 4 | 5 | 6 |
|---|---|---|---|---|---|
| k= | 2.3814E−03 | 4.7485E+00 | 1.4094E−01 | −2.1718E−01 | 7.6335E−01 |
| A4= | −2.5295E−03 | −1.3643E−02 | −8.3258E−02 | −9.0802E−02 | −7.3171E−03 |
| A6= | 1.1854E−03 | 8.9009E−04 | 5.6947E−03 | −1.3705E−02 | −6.7085E−03 |
| A8= | −4.8937E−03 | 8.8627E−03 | 3.6469E−02 | 3.2111E−02 | −2.1165E−02 |
| A10= | 3.3144E−03 | −1.0141E−02 | −3.5605E−02 | −2.7622E−02 | 2.8645E−02 |
| A12= | −1.3256E−03 | 3.9811E−03 | 1.3903E−02 | 1.2911E−02 | −9.4900E−03 |
| A14= | 1.6742E−04 | −5.2637E−04 | −1.9251E−03 | −2.4126E−03 | 9.0183E−04 |

| Surface # | 7 | 8 | 9 | 11 | 12 |
|---|---|---|---|---|---|
| k= | 7.4025E+01 | 1.8574E+01 | 2.1404E+01 | 1.8341E+01 | 9.9000E+01 |
| A4= | −3.1555E−03 | 7.7652E−03 | 2.8570E−03 | −5.4315E−02 | −3.9261E−02 |
| A6= | 2.2529E−02 | 1.6731E−02 | −1.1345E−02 | 3.1291E−02 | 2.7427E−01 |
| A8= | −7.4960E−02 | −8.2201E−02 | −9.9437E−03 | −2.3112E−01 | −6.3117E−01 |
| A10= | 9.8081E−02 | 1.0778E−01 | 1.6153E−02 | 3.0368E−01 | 6.0459E−01 |
| A12= | −5.4640E−02 | −6.2246E−02 | −6.9295E−03 | −1.5173E−01 | −2.6047E−01 |
| A14= | 1.1300E−02 | 1.3951E−02 | 1.6913E−03 | 2.5682E−02 | 4.2177E−02 |

| Surface # | 13 | 14 | 15 | 16 | 17 |
|---|---|---|---|---|---|
| k= | −2.3739E+01 | 0.0000E+00 | −4.4227E+01 | −8.3205E+00 | −7.8008E+00 |
| A4= | −7.3045E−02 | −9.7676E−02 | −2.0363E−02 | 1.2537E−02 | 1.3091E−02 |
| A6= | 3.4538E−01 | 8.0042E−02 | −2.5596E−02 | −1.0896E−01 | −1.2204E−01 |
| A8= | −5.8209E−01 | −8.6460E−02 | −1.4572E−02 | 9.0560E−02 | 9.2648E−02 |
| A10= | 4.9270E−01 | 7.5273E−02 | 2.8256E−02 | −4.6995E−02 | −4.0470E−02 |
| A12= | −2.3056E−01 | −4.7996E−02 | −1.9088E−02 | 1.4487E−02 | 8.3465E−03 |
| A14= | 5.8580E−02 | 1.7262E−02 | 5.5715E−03 | −2.2626E−03 | −1.7412E−04 |
| A16= | −6.5571E−03 | −2.4437E−03 | −5.7330E−04 | 1.3485E−04 | −1.7214E−04 |
| A18= | — | — | — | — | 1.6753E−05 |

| Surface # | 18 | 19 | 20 |
|---|---|---|---|
| k= | 7.6647E−01 | 4.0859E−01 | −1.0000E+00 |
| A4= | 1.9670E−03 | −1.8136E−01 | −1.8271E−01 |
| A6= | −7.1670E−02 | 3.6500E−02 | 7.4817E−02 |
| A8= | 5.3546E−02 | 7.9020E−03 | −2.4558E−02 |
| A10= | −2.2849E−02 | −5.0800E−03 | 5.8107E−03 |
| A12= | 5.8198E−03 | 1.0654E−03 | −9.0056E−04 |
| A14= | −8.5746E−04 | −1.1706E−04 | 8.4749E−05 |
| A16= | 6.7061E−05 | 6.7688E−06 | −4.3656E−06 |
| A18= | −2.1463E−06 | −1.6291E−07 | 9.4349E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.24 | ImgH/Y11 | 2.39 |
| Fno | 1.62 | LNP | 9 |
| HFOV [deg.] | 35.9 | Y92/Y11 | 1.87 |
| Npmax | 1.642 | Ymax/Ymin | 2.55 |
| V1/N1 | 37.27 | YI111/Y11 | 0.88 |
| V2/N2 | 16.87 | YI121/Y12 | 0.69 |
| V3/N3 | 37.27 | YI122/Y12 | 0.88 |
| V4/N4 | 16.87 | YI221/Y22 | 0.93 |

-continued

| 3rd Embodiment | | | |
|---|---|---|---|
| V5/N5 | 13.70 | YI321/Y32 | 0.70 |
| V6/N6 | 14.34 | YI411/Y41 | 0.78 |
| V7/N7 | 19.11 | YI521/Y52 | 0.75 |
| V8/N8 | 16.87 | YI611/Y61 | 0.35 |
| V9/N9 | 37.27 | YI612/Y61 | 0.50 |
| Vpmin | 22.5 | YI621/Y62 | 0.10 |
| ΣAT/ΣCT | 0.36 | YI622/Y62 | 0.89 |
| ATmax/CTmin | 2.41 | YI623/Y62 | 0.95 |
| CT1/T12 | 21.57 | YI711/Y71 | 0.29 |
| SD/TD | 0.88 | YI721/Y72 | 0.21 |
| TD/BL | 4.93 | YI722/Y72 | 0.81 |
| TL [mm] | 6.10 | YI723/Y72 | 0.93 |
| TL/EPD | 1.88 | YI811/Y81 | 0.27 |
| TL/f | 1.16 | YI812/Y81 | 0.83 |
| TL/ImgH | 1.57 | YI813/Y81 | 0.97 |
| \|R18/f\| | 0.41 | YI821/Y82 | 0.24 |
| Σ\|f/fi\| | 4.64 | YI822/Y82 | 0.98 |
| f/EPD | 1.62 | YI911/Y91 | 0.11 |
| f/f1 | 0.94 | YI912/Y91 | 0.55 |
| f/f2 | −0.57 | YI921/Y92 | 0.17 |
| f/f3 | 1.14 | YI922/Y92 | 0.97 |
| f/f4 | −0.50 | YC321/Y32 | 0.93 |
| f/f5 | −0.03 | YC411/Y41 | 0.90 |
| f/f6 | −0.30 | YC621/Y62 | 0.17 |
| f/f7 | 0.23 | YC711/Y71 | 0.48 |
| f/f8 | 0.19 | YC721/Y72 | 0.32 |
| f/f9 | −0.75 | YC811/Y81 | 0.44 |
| f12/f | 2.05 | YC821/Y82 | 0.40 |
| CRA [deg.] | 31.65 | YC911/Y91 | 0.19 |
| ImgH/BL | 3.77 | YC921/Y92 | 0.36 |

4th Embodiment

Figure 7:
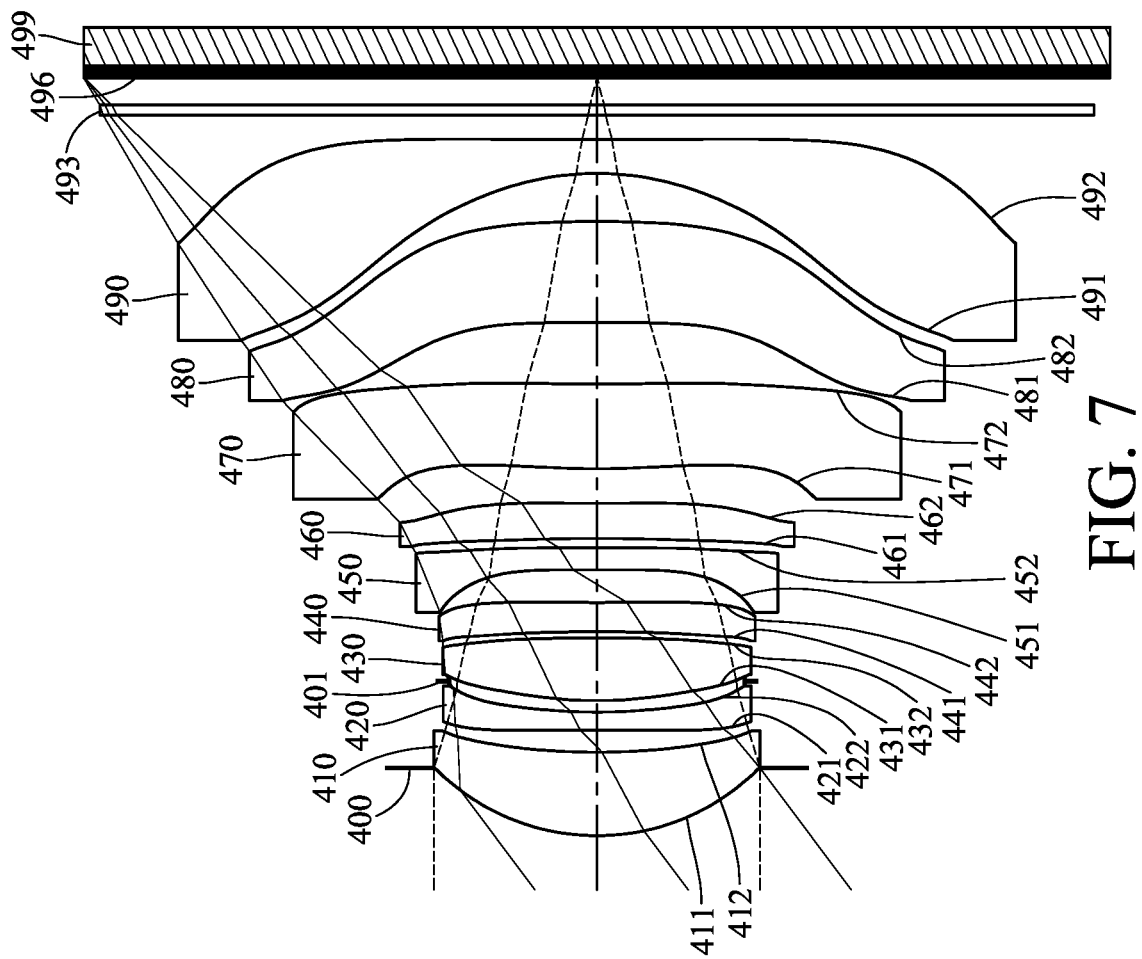
FIG. 7 is a schematic view of an image capturing unit according to the 4th embodiment of the present disclosure.
Figure 8:
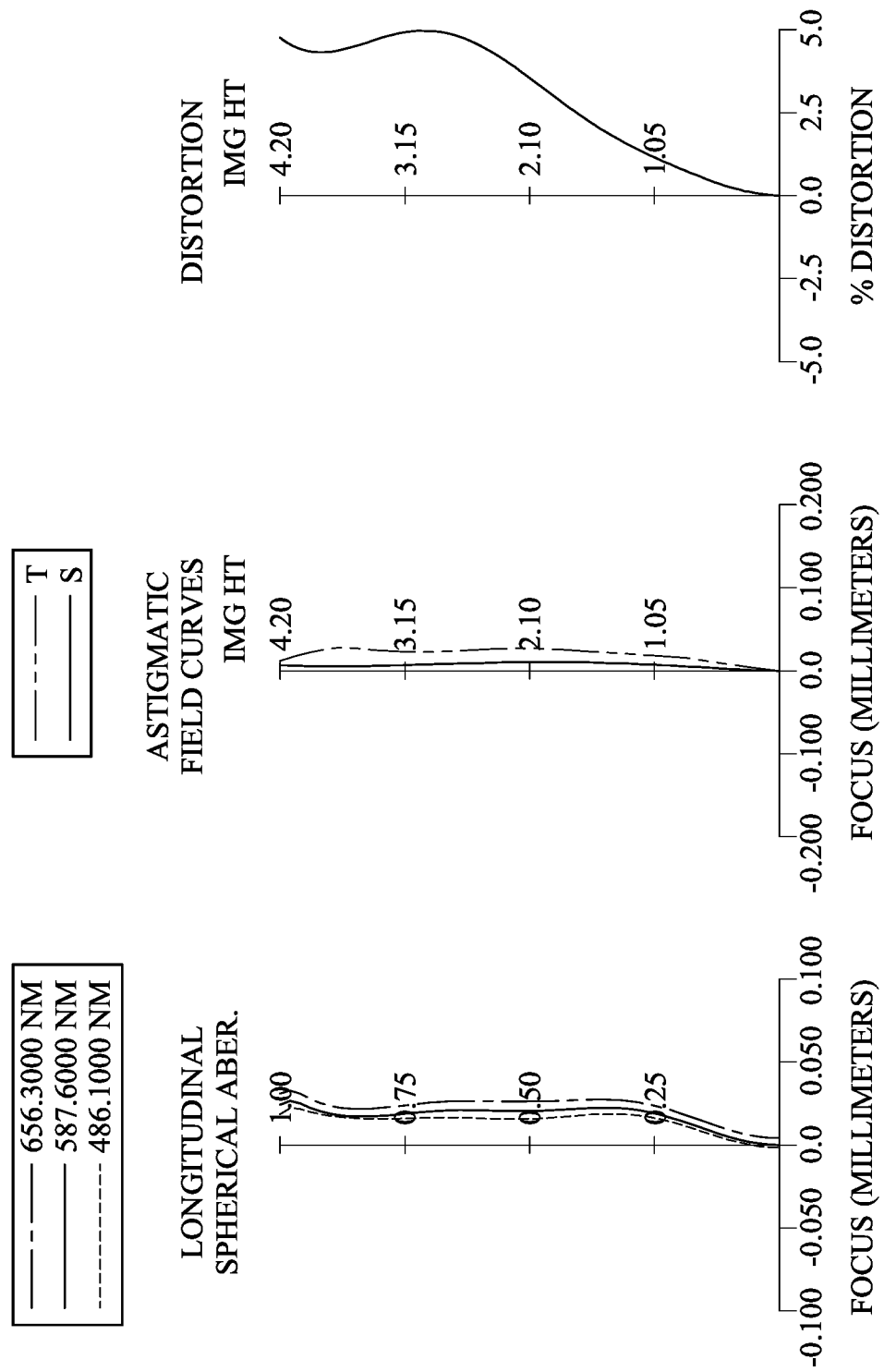
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical photographing lens assembly (its reference numeral is omitted) of the present disclosure and an image sensor 499. The optical photographing lens assembly includes, in order from an object side to an image side, an aperture stop 400, a first lens element 410, a second lens element 420, a stop 401, a third lens element 430, a fourth lens element 440, a fifth lens element 450, a sixth lens element 460, a seventh lens element 470, an eighth lens element 480, a ninth lens element 490, a filter 493 and an image surface 496. The optical photographing lens assembly includes nine lens elements (410, 420, 430, 440, 450, 460, 470, 480 and 490) with no additional lens element disposed between each of the adjacent nine lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has one inflection point. The object-side surface 421 of the second lens element 420 has one critical point in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has one inflection point. The image-side surface 442 of the fourth lens element 440 has one critical point in an off-axis region thereof.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has four inflection points.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has two inflection points. The image-side surface 462 of the sixth lens element 460 has one critical point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has one inflection point. The image-side surface 472 of the seventh lens element 470 has one inflection point. The object-side surface 471 of the seventh lens element 470 has one critical point in an off-axis region thereof. The image-side surface 472 of the seventh lens element 470 has one critical point in an off-axis region thereof.

The eighth lens element 480 with positive refractive power has an object-side surface 481 being concave in a paraxial region thereof and an image-side surface 482 being convex in a paraxial region thereof. The eighth lens element 480 is made of plastic material and has the object-side surface 481 and the image-side surface 482 being both aspheric. The object-side surface 481 of the eighth lens element 480 has two inflection points. The image-side surface 482 of the eighth lens element 480 has two inflection points.

The ninth lens element 490 with negative refractive power has an object-side surface 491 being concave in a paraxial region thereof and an image-side surface 492 being convex in a paraxial region thereof. The ninth lens element 490 is made of plastic material and has the object-side surface 491 and the image-side surface 492 being both aspheric. The object-side surface 491 of the ninth lens element 490 has two inflection points. The image-side surface 492 of the ninth lens element 490 has three inflection points. The image-side surface 492 of the ninth lens element 490 has two critical points in an off-axis region thereof.

The filter 493 is made of glass material and located between the ninth lens element 490 and the image surface 496, and will not affect the focal length of the optical photographing lens assembly. The image sensor 499 is disposed on or near the image surface 496 of the optical photographing lens assembly.

The detailed optical data of the 4th embodiment are shown in Table 7 and the aspheric surface data are shown in Table 8 below.

TABLE 7

4th Embodiment
f = 5.34 mm, Fno = 2.00, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.555 | | | | |
| 2 | Lens 1 | 1.878 (ASP) | 0.685 | Plastic | 1.513 | 65.2 | 5.08 |
| 3 | | 5.909 (ASP) | 0.179 | | | | |
| 4 | Lens 2 | −171.220 (ASP) | 0.150 | Plastic | 1.582 | 30.2 | −7.70 |
| 5 | | 4.605 (ASP) | 0.253 | | | | |
| 6 | Stop | Plano | −0.159 | | | | |
| 7 | Lens 3 | 3.375 (ASP) | 0.515 | Plastic | 1.564 | 58.5 | 4.93 |
| 8 | | −14.910 (ASP) | 0.050 | | | | |
| 9 | Lens 4 | −14.125 (ASP) | 0.240 | Plastic | 1.566 | 37.4 | −15.20 |
| 10 | | 22.134 (ASP) | 0.269 | | | | |
| 11 | Lens 5 | −128.225 (ASP) | 0.180 | Plastic | 1.614 | 26.0 | 70.42 |
| 12 | | −32.341 (ASP) | 0.076 | | | | |
| 13 | Lens 6 | −22.946 (ASP) | 0.288 | Plastic | 1.614 | 26.0 | −13.34 |
| 14 | | 12.790 (ASP) | 0.285 | | | | |
| 15 | Lens 7 | 6.411 (ASP) | 0.694 | Plastic | 1.564 | 58.5 | 17.15 |
| 16 | | 18.260 (ASP) | 0.505 | | | | |
| 17 | Lens 8 | −207.039 (ASP) | 0.829 | Plastic | 1.566 | 37.4 | 25.49 |
| 18 | | −13.507 (ASP) | 0.395 | | | | |
| 19 | Lens 9 | −2.373 (ASP) | 0.280 | Plastic | 1.513 | 65.2 | −4.68 |
| 20 | | −203.252 (ASP) | 0.200 | | | | |
| 21 | Filter | Plano | 0.080 | Glass | 1.517 | 64.2 | — |
| 22 | | Plano | 0.223 | | | | |
| 23 | Image | Plano | — | | | | |

Note:
Reference wavelength is 587.6 nm (d-line).
An effective radius of the stop 401 (Surface 6) is 1.210 mm.

TABLE 8

Aspheric Coefficients

| Surface # | 2 | 3 | 4 | 5 | 7 |
|---|---|---|---|---|---|
| k= | 2.6171E−01 | 7.2767E+00 | −9.0000E+01 | −3.1278E+01 | 3.2568E−01 |
| A4= | −5.3626E−03 | 4.9545E−03 | −1.5940E−04 | 1.1246E−02 | −3.0145E−02 |
| A6= | 7.0517E−03 | −3.5859E−03 | 2.5461E−02 | −1.3684E−02 | −2.2466E−02 |
| A8= | −1.6216E−02 | 8.7070E−03 | −3.1474E−02 | 4.2736E−02 | 2.7644E−02 |
| A10= | 1.8032E−02 | 3.0958E−02 | 3.0958E−02 | −3.1126E−02 | −1.1632E−02 |
| A12= | −1.2871E−02 | 1.9390E−02 | −8.6077E−03 | 3.2775E−02 | 1.2146E−02 |
| A14= | 4.8654E−03 | −4.9141E−03 | — | −1.5872E−02 | −5.0303E−03 |
| A16= | −7.9846E−04 | — | — | 1.8904E−03 | 4.2923E−04 |

| Surface # | 8 | 9 | 10 | 11 | 12 |
|---|---|---|---|---|---|
| k= | 9.0000E+01 | 5.0536E+00 | 0.0000E+00 | −9.0000E+01 | −9.0000E+01 |
| A4= | 6.2866E−02 | 5.3898E−02 | −2.3623E−02 | −2.0104E−02 | 6.9611E−02 |
| A6= | −2.2365E−01 | −2.4707E−01 | −9.8321E−02 | −2.3427E−01 | −2.2475E−01 |
| A8= | 3.4532E−01 | 4.5850E−01 | 2.3631E−01 | 2.9694E−01 | 3.0675E−01 |
| A10= | −3.3927E−01 | −4.6783E−01 | −2.7232E−01 | −1.8740E−01 | −2.4356E−01 |
| A12= | 2.2207E−01 | 2.8272E−01 | 1.6201E−01 | 3.1255E−02 | 1.1628E−01 |
| A14= | −8.2914E−02 | −9.1227E−02 | −4.7484E−02 | 2.0529E−02 | −3.0301E−02 |
| A16= | 1.2555E−02 | 1.0709E−02 | 4.6219E−03 | −8.2442E−03 | 3.2497E−03 |

| Surface # | 13 | 14 | 15 | 16 | 17 |
|---|---|---|---|---|---|
| k= | 3.9833E+01 | −1.0000E+00 | 4.9020E+00 | 2.8462E+01 | 9.0000E+01 |
| A4= | −3.6819E−02 | −1.3686E−01 | −7.2617E−02 | −2.5765E−02 | −5.0924E−02 |
| A6= | 1.1120E−01 | 1.6329E−01 | 3.4037E−02 | −6.0258E−05 | 7.3738E−03 |
| A8= | −1.4368E−01 | −1.6929E−01 | −1.4850E−02 | 4.5095E−03 | −1.1537E−03 |
| A10= | 1.0889E−01 | 1.1543E−01 | 2.0118E−03 | −1.7016E−03 | 7.9698E−03 |
| A12= | −5.2464E−02 | −5.0006E−02 | 7.1230E−04 | 2.6319E−04 | −2.4834E−03 |
| A14= | 1.4996E−02 | 1.2430E−02 | −4.2029E−04 | −1.6165E−05 | 4.5066E−04 |
| A16= | −1.9115E−03 | −1.3008E−03 | 6.0018E−05 | 1.1115E−07 | −5.1237E−05 |

TABLE 8-continued

| Aspheric Coefficients | | | | | |
|---|---|---|---|---|---|
| A18= | — | — | — | — | 3.4433E−06 |
| A20= | — | — | — | — | −1.0438E−07 |

| Surface # | 18 | 19 | 20 |
|---|---|---|---|
| k= | −1.0532E+01 | −1.1202E+00 | −9.0000E+01 |
| A4= | −4.5211E−02 | −1.8218E−02 | 5.6696E−03 |
| A6= | 1.6154E−02 | 2.5421E−02 | −3.8973E−03 |
| A8= | −1.0782E−02 | −1.6188E−02 | 1.3378E−03 |
| A10= | 3.3644E−03 | 4.4237E−03 | −3.8459E−04 |
| A12= | −3.9029E−04 | −4.4569E−04 | 7.2546E−05 |
| A14= | −9.8004E−06 | −2.3124E−05 | −8.6773E−06 |
| A16= | 6.4499E−06 | 9.1981E−06 | 6.3495E−07 |
| A18= | −5.5111E−07 | −7.6476E−07 | −2.6068E−08 |
| A20= | 1.5253E−08 | 2.1837E−08 | 4.6551E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.34 | f12/f | 2.08 |
| Fno | 2.00 | CRA [deg.] | 37.20 |
| HFOV [deg.] | 36.8 | ImgH/BL | 8.35 |
| Npmax | 1.614 | ImgH/Y11 | 3.14 |
| V1/N1 | 43.09 | LNP | 9 |
| V2/N2 | 19.11 | Y92/Y11 | 2.57 |
| V3/N3 | 37.40 | Ymax/Ymin | 2.85 |
| V4/N4 | 23.91 | YI211/Y21 | 0.25 |
| V5/N5 | 16.09 | YI411/Y41 | 0.69 |
| V6/N6 | 16.09 | YI412/Y41 | 0.80 |
| V7/N7 | 37.40 | YI421/Y42 | 0.24 |
| V8/N8 | 23.91 | YI521/Y52 | 0.18 |
| V9/N9 | 43.09 | YI522/Y52 | 0.22 |
| Vpmin | 26.0 | YI523/Y52 | 0.73 |
| ΣAT/ΣCT | 0.48 | YI524/Y52 | 0.89 |
| ATmax/CTmin | 3.37 | YI621/Y62 | 0.15 |
| CT1/T12 | 3.83 | YI622/Y62 | 0.85 |
| SD/TD | 0.90 | YI711/Y71 | 0.28 |
| TD/BL | 11.37 | YI721/Y72 | 0.17 |
| TL [mm] | 6.22 | YI811/Y81 | 0.65 |
| TL/EPD | 2.33 | YI812/Y81 | 0.93 |
| TL/f | 1.16 | YI821/Y82 | 0.68 |
| TL/ImgH | 1.48 | YI822/Y82 | 0.96 |
| \|R18/f\| | 38.05 | YI911/Y91 | 0.64 |
| Σ\|f/fi\| | 5.32 | YI912/Y91 | 0.94 |
| f/EPD | 2.00 | YI921/Y92 | 0.08 |
| f/f1 | 1.05 | YI922/Y92 | 0.27 |
| f/f2 | −0.69 | YI923/Y92 | 0.95 |
| f/f3 | 1.08 | YC211/Y21 | 0.38 |
| f/f4 | −0.35 | YC421/Y42 | 0.41 |
| f/f5 | 0.08 | YC621/Y62 | 0.27 |
| f/f6 | −0.40 | YC711/Y71 | 0.53 |
| f/f7 | 0.31 | YC721/Y72 | 0.31 |
| f/f8 | 0.21 | YC921/Y92 | 0.16 |
| f/f9 | −1.14 | YC922/Y92 | 0.34 |

5th Embodiment

Figure 9:
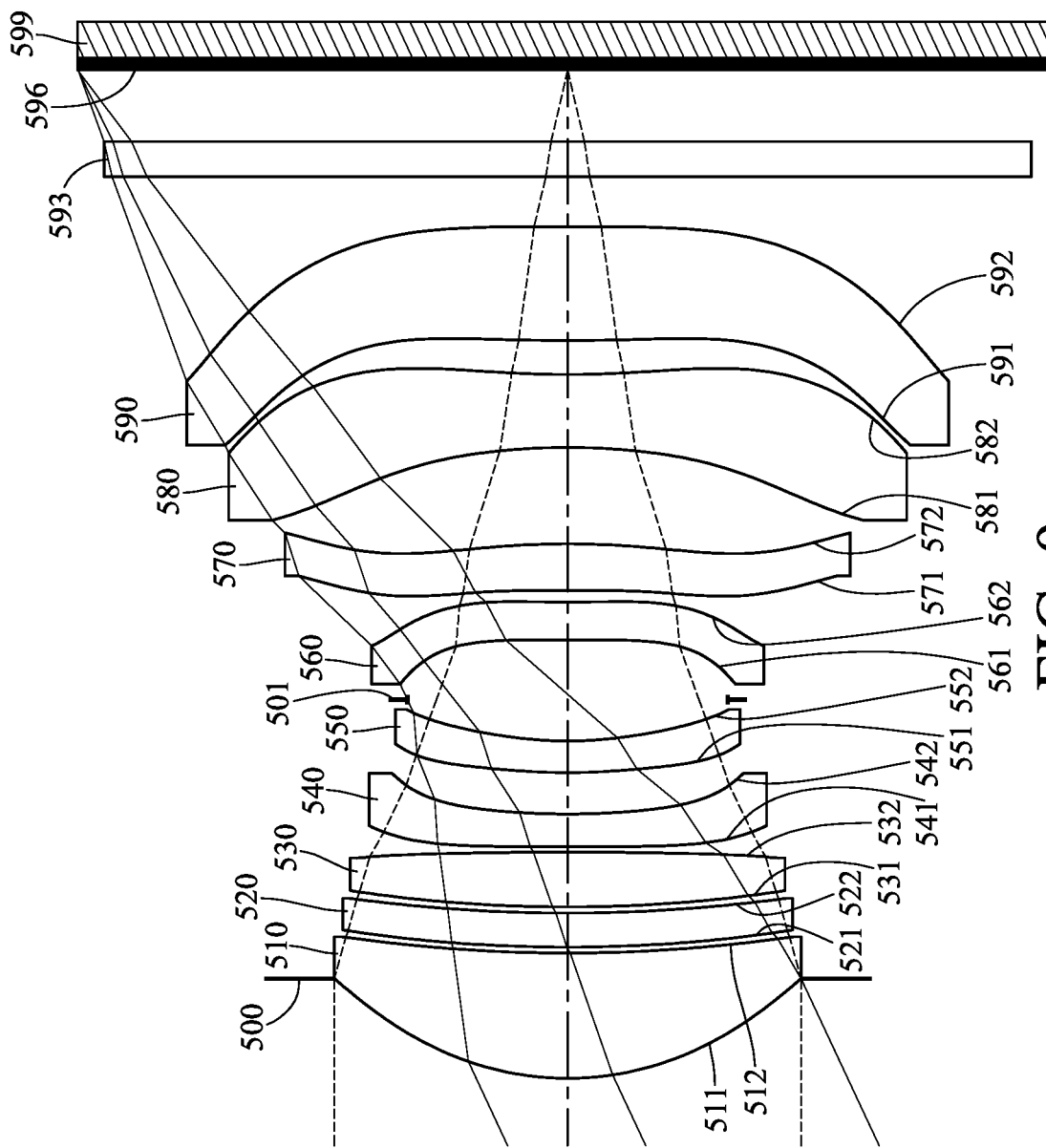
FIG. 9 is a schematic view of an image capturing unit according to the 5th embodiment of the present disclosure.
Figure 10:
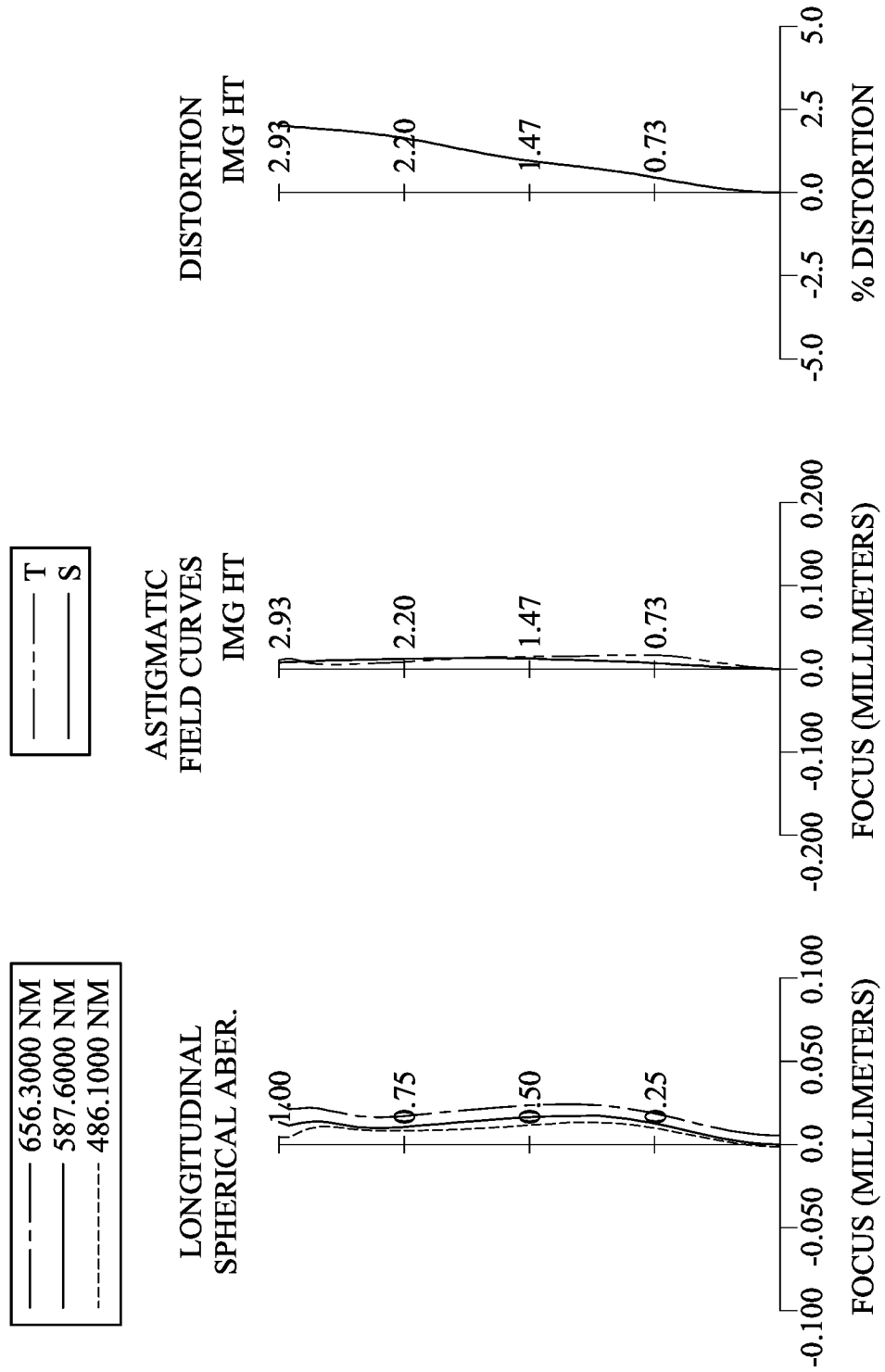
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical photographing lens assembly (its reference numeral is omitted) of the present disclosure and an image sensor 599. The optical photographing lens assembly includes, in order from an object side to an image side, an aperture stop 500, a first lens element 510, a second lens element 520, a third lens element 530, a fourth lens element 540, a fifth lens element 550, a stop 501, a sixth lens element 560, a seventh lens element 570, an eighth lens element 580, a ninth lens element 590, a filter 593 and an image surface 596. The optical photographing lens assembly includes nine lens elements (510, 520, 530, 540, 550, 560, 570, 580 and 590) with no additional lens element disposed between each of the adjacent nine lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has two inflection points. The object-side surface 561 of the sixth lens element 560 has one critical point in an off-axis region thereof. The image-side surface 562 of the sixth lens element 560 has one critical point in an off-axis region thereof.

The seventh lens element 570 with positive refractive power has an object-side surface 571 being convex in a paraxial region thereof and an image-side surface 572 being convex in a paraxial region thereof. The seventh lens element 570 is made of plastic material and has the object-side surface 571 and the image-side surface 572 being both aspheric. The object-side surface 571 of the seventh lens element 570 has three inflection points. The image-side surface 572 of the seventh lens element 570 has two inflection points. The object-side surface 571 of the seventh lens element 570 has two critical points in an off-axis region thereof. The image-side surface 572 of the seventh lens element 570 has one critical point in an off-axis region thereof.

The eighth lens element 580 with negative refractive power has an object-side surface 581 being concave in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has one inflection point. The image-side surface 582 of the eighth lens element 580 has one inflection point. The image-side surface 582 of the eighth lens element 580 has one critical point in an off-axis region thereof.

The ninth lens element 590 with positive refractive power has an object-side surface 591 being convex in a paraxial region thereof and an image-side surface 592 being convex in a paraxial region thereof. The ninth lens element 590 is made of plastic material and has the object-side surface 591 and the image-side surface 592 being both aspheric. The object-side surface 591 of the ninth lens element 590 has two inflection points. The image-side surface 592 of the ninth lens element 590 has one inflection point. The object-side surface 591 of the ninth lens element 590 has one critical point in an off-axis region thereof.

The filter 593 is made of glass material and located between the ninth lens element 590 and the image surface 596, and will not affect the focal length of the optical photographing lens assembly. The image sensor 599 is disposed on or near the image surface 596 of the optical photographing lens assembly.

The detailed optical data of the 5th embodiment are shown in Table 9 and the aspheric surface data are shown in Table 10 below.

TABLE 9

5th Embodiment
f = 6.15 mm, Fno = 2.20, HFOV = 25.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.597 | | | | |
| 2 | Lens 1 | 1.791 (ASP) | 0.751 | Plastic | 1.545 | 56.1 | 3.95 |
| 3 | | 9.127 (ASP) | 0.036 | | | | |
| 4 | Lens 2 | 9.240 (ASP) | 0.204 | Plastic | 1.679 | 18.4 | 365.42 |
| 5 | | 9.512 (ASP) | 0.037 | | | | |
| 6 | Lens 3 | 9.016 (ASP) | 0.329 | Plastic | 1.544 | 56.0 | 11.97 |
| 7 | | −23.145 (ASP) | 0.031 | | | | |
| 8 | Lens 4 | 34.863 (ASP) | 0.197 | Plastic | 1.679 | 18.4 | −7.54 |
| 9 | | 4.456 (ASP) | 0.248 | | | | |
| 10 | Lens 5 | 3.393 (ASP) | 0.190 | Plastic | 1.582 | 30.2 | −12.19 |
| 11 | | 2.249 (ASP) | 0.248 | | | | |
| 12 | Stop | Plano | 0.358 | | | | |
| 13 | Lens 6 | 33.766 (ASP) | 0.226 | Plastic | 1.679 | 18.4 | −11.23 |
| 14 | | 6.206 (ASP) | 0.070 | | | | |
| 15 | Lens 7 | 35.836 (ASP) | 0.280 | Plastic | 1.650 | 21.5 | 7.10 |
| 16 | | −5.282 (ASP) | 0.578 | | | | |
| 17 | Lens 8 | −4.117 (ASP) | 0.438 | Plastic | 1.566 | 37.4 | −4.19 |
| 18 | | 5.797 (ASP) | 0.203 | | | | |
| 19 | Lens 9 | 8.903 (ASP) | 0.684 | Plastic | 1.660 | 20.4 | 12.36 |
| 20 | | −94.201 (ASP) | 0.300 | | | | |
| 21 | Filter | Plano | 0.210 | Glass | 1.517 | 64.2 | — |
| 22 | | Plano | 0.428 | | | | |
| 23 | Image | Plano | — | | | | |

Note:
Reference wavelength is 587.6 nm (d-line).
An effective radius of the stop 501 (Surface 12) is 0.960 mm.

TABLE 10

| Aspheric Coefficients | | | | | |
|---|---|---|---|---|---|
| Surface # | 2 | 3 | 4 | 5 | 6 |
| k= | −2.4823E−01 | −4.8318E+00 | 3.7412E+00 | −5.2108E+00 | 5.9952E+00 |
| A4= | 2.3189E−04 | 1.2205E−04 | 6.0993E−04 | 6.2081E−05 | −2.7708E−05 |
| A6= | −2.6614E−04 | −4.2302E−04 | −2.4813E−04 | −2.5397E−04 | −1.8051E−04 |
| A8= | −2.2116E−03 | 9.1540E−04 | 1.0027E−03 | 5.0168E−04 | 6.1016E−04 |
| A10= | 1.5434E−03 | −1.0776E−03 | −1.3764E−03 | −5.0562E−04 | −6.7458E−04 |
| A12= | −9.6492E−04 | 6.0239E−04 | 8.2693E−04 | 2.3924E−04 | 3.2400E−04 |
| A14= | 1.1489E−04 | −1.2625E−04 | −1.8365E−04 | −3.5302E−05 | −5.7007E−05 |
| Surface # | 7 | 8 | 9 | 10 | 11 |
| k= | −1.4944E+01 | −9.8624E+01 | −5.3524E+01 | −3.8227E−01 | 2.8086E+00 |
| A4= | 9.6422E−03 | −1.4189E−02 | 1.9256E−02 | −1.9562E−01 | −1.9569E−01 |
| A6= | 6.7768E−03 | 1.2972E−01 | 1.3003E−01 | 3.2254E−01 | 2.2475E−01 |
| A8= | −3.2582E−02 | −1.6180E−01 | −8.2407E−02 | −2.2713E−01 | −1.6102E−01 |
| A10= | 3.2269E−02 | 1.4987E−01 | 5.3176E−02 | 1.2040E−01 | 2.5667E−02 |
| A12= | −1.5372E−02 | −7.7274E−02 | 1.6027E−02 | −1.5898E−02 | 2.8245E−02 |
| A14= | 2.9053E−03 | 1.6514E−02 | −1.6294E−02 | −2.3771E−03 | −9.8985E−03 |
| Surface # | 13 | 14 | 15 | 16 | 17 |
| k= | 8.6400E+01 | −1.3773E+01 | −9.8121E+01 | −2.4380E+01 | −3.2955E+01 |
| A4= | −2.6179E−01 | −4.6343E−01 | −2.8930E−01 | −3.1934E−02 | −4.7342E−02 |
| A6= | 2.8221E−01 | 6.4088E−01 | 4.7416E−01 | 8.8148E−02 | −2.2135E−02 |
| A8= | −8.1279E−01 | −9.6327E−01 | −3.4872E−01 | −4.4221E−02 | 2.3209E−02 |
| A10= | 1.1891E+00 | 1.0371E+00 | 1.5273E−01 | 1.1591E−02 | −6.3175E−03 |
| A12= | −1.2118E+00 | −7.6600E−01 | −4.1194E−02 | −2.0987E−03 | 6.6606E−04 |
| A14= | 7.0215E−01 | 3.4510E−01 | 6.3172E−03 | 2.7752E−04 | −7.1867E−06 |
| A16= | −1.6218E−01 | −6.5397E−02 | −4.2356E−04 | −2.0099E−05 | −1.9715E−06 |
| Surface # | 18 | 19 | 20 | | |
| k= | −7.2381E+01 | −9.0193E+01 | 4.6069E+01 | | |
| A4= | 4.3619E−03 | −5.1210E−02 | −4.5886E−02 | | |
| A6= | −5.6445E−02 | 2.1146E−02 | 7.4438E−03 | | |
| A8= | 3.3781E−02 | −3.4155E−02 | −6.6637E−03 | | |
| A10= | −1.0747E−02 | 2.3800E−02 | 3.8105E−03 | | |
| A12= | 1.8801E−03 | −8.2641E−03 | −1.0709E−03 | | |
| A14= | −1.7925E−04 | 1.4063E−03 | 1.4192E−04 | | |
| A16= | 8.0837E−06 | −9.2557E−05 | −6.9909E−06 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.15 | f/f6 | −0.55 |
| Fno | 2.20 | f/f7 | 0.87 |
| HFOV [deg.] | 25.0 | f/f8 | −1.47 |
| Npmax | 1.679 | f/f9 | 0.50 |
| V1/N1 | 36.30 | f12/f | 0.63 |
| V2/N2 | 10.98 | CRA [deg.] | 26.06 |
| V3/N3 | 36.26 | ImgH/BL | 3.13 |
| V4/N4 | 10.98 | ImgH/Y11 | 2.10 |
| V5/N5 | 19.11 | LNP | 9 |
| V6/N6 | 10.98 | Y92/Y11 | 1.63 |
| V7/N7 | 13.01 | Ymax/Ymin | 2.36 |
| V8/N8 | 23.91 | YI611/Y61 | 0.10 |
| V9/N9 | 12.29 | YI621/Y62 | 0.15 |
| Vpmin | 18.4 | YI622/Y62 | 0.90 |
| ΣAT/ΣCT | 0.55 | YI711/Y71 | 0.06 |
| ATmax/CTmin | 3.19 | YI712/Y71 | 0.40 |
| CT1/T12 | 20.86 | YI713/Y71 | 0.93 |
| SD/TD | 0.88 | YI721/Y72 | 0.37 |
| TD/BL | 5.44 | YI722/Y72 | 0.92 |
| TL [mm] | 6.05 | YI811/Y81 | 0.76 |
| TL/EPD | 2.16 | YI821/Y82 | 0.26 |
| TL/f | 0.98 | YI911/Y91 | 0.19 |
| TL/ImgH | 2.06 | YI912/Y91 | 0.92 |
| |R18/f| | 15.31 | YI921/Y92 | 0.95 |
| Σ|f/fi| | 6.79 | YC611/Y61 | 0.17 |
| f/EPD | 2.20 | YC621/Y62 | 0.27 |
| f/f1 | 1.56 | YC711/Y71 | 0.10 |
| f/f2 | 0.02 | YC712/Y71 | 0.58 |
| f/f3 | 0.51 | YC721/Y72 | 0.59 |
| f/f4 | −0.82 | YC821/Y82 | 0.44 |
| f/f5 | −0.50 | YC911/Y91 | 0.34 |

6th Embodiment

Figure 11:
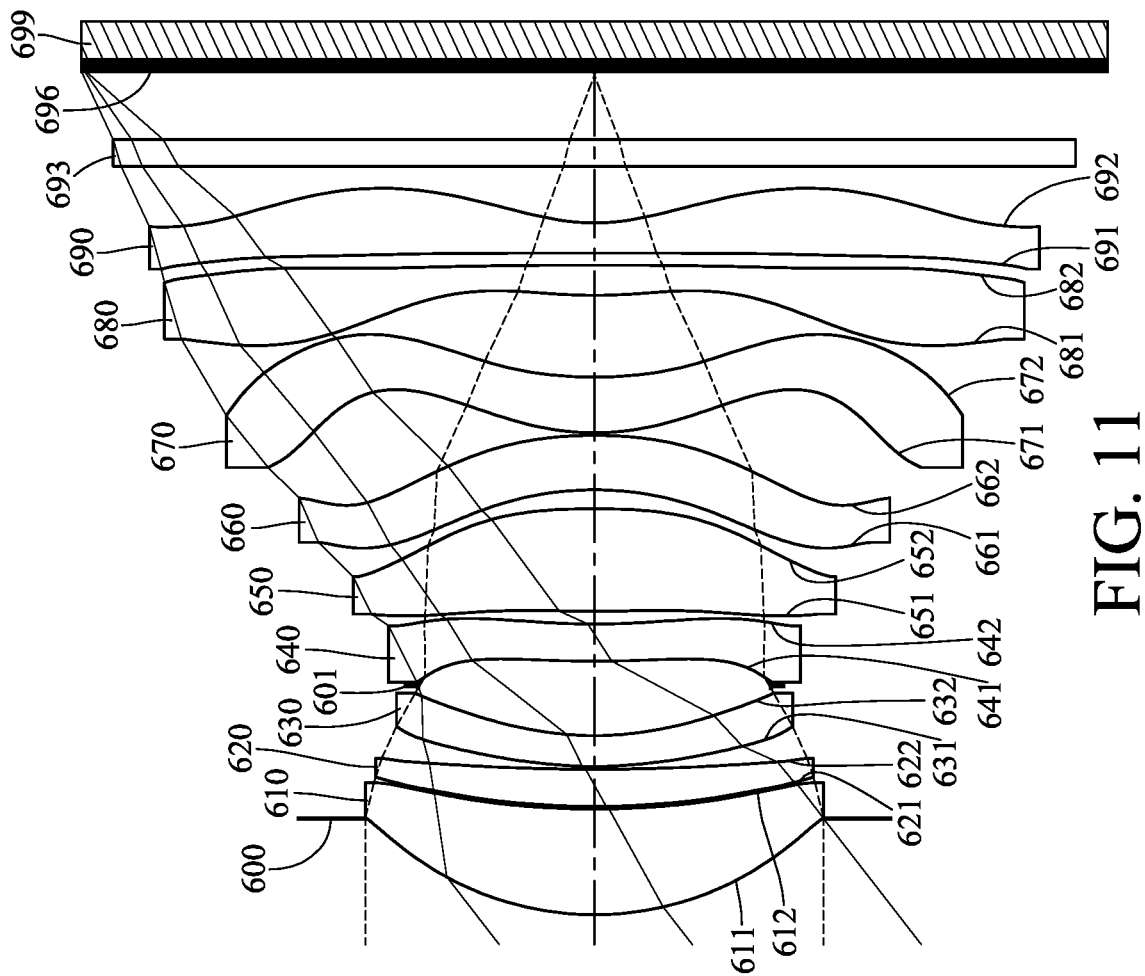
FIG. 11 is a schematic view of an image capturing unit according to the 6th embodiment of the present disclosure.
Figure 12:
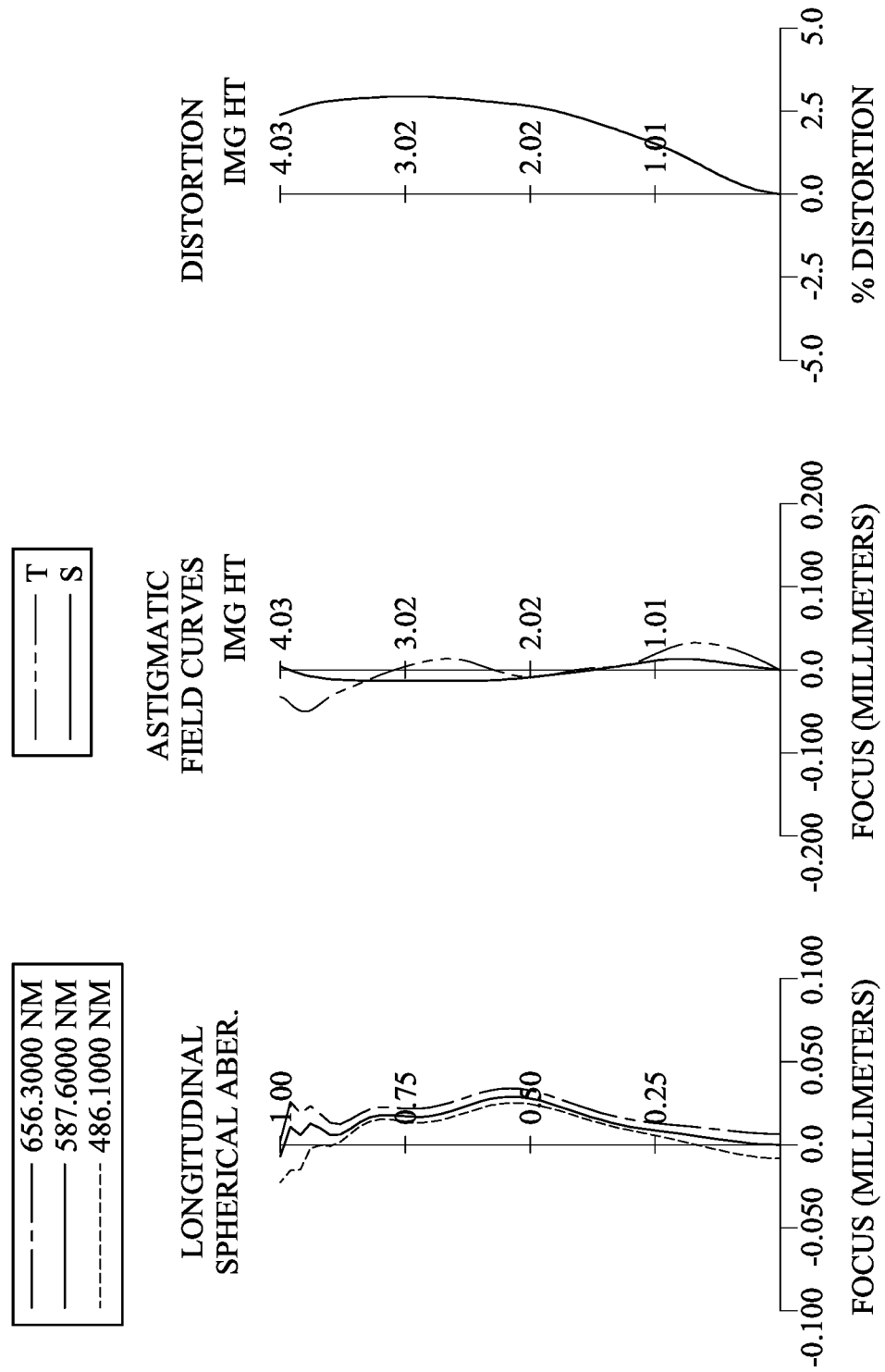
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical photographing lens assembly (its reference numeral is omitted) of the present disclosure and an image sensor 699. The optical photographing lens assembly includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, an eighth lens element 680, a ninth lens element 690, a filter 693 and an image surface 696. The optical photographing lens assembly includes nine lens elements (610, 620, 630, 640, 650, 660, 670, 680 and 690) with no additional lens element disposed between each of the adjacent nine lens elements.

The first lens element 610 with positive refractive power has an object-side surface 611 being convex in a paraxial region thereof and an image-side surface 612 being concave in a paraxial region thereof. The first lens element 610 is made of glass material and has the object-side surface 611 and the image-side surface 612 being both aspheric. The object-side surface 611 of the first lens element 610 has one inflection point. The image-side surface 612 of the first lens element 610 has four inflection points.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has four inflection points. The image-side surface 622 of the second lens element 620 has three inflection points.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has one inflection point. The image-side surface 642 of the fourth lens element 640 has two inflection points. The object-side surface 641 of the fourth lens element 640 has one critical point in an off-axis region thereof. The image-side surface 642 of the fourth lens element 640 has two critical points in an off-axis region thereof.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has two inflection points. The image-side surface 652 of the fifth lens element 650 has one inflection point. The object-side surface 651 of the fifth lens element 650 has two critical points in an off-axis region thereof. The image-side surface 652 of the fifth lens element 650 has one critical point in an off-axis region thereof.

The sixth lens element 660 with negative refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has two inflection points. The image-side surface 662 of the sixth lens element 660 has two inflection points. The object-side surface 661 of the sixth lens element 660 has one critical point in an off-axis region thereof. The image-side surface 662 of the sixth lens element 660 has one critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has three inflection points. The image-side surface 672 of the seventh lens element 670 has two inflection points. The object-side surface 671 of the seventh lens element 670 has one critical point in an off-axis region thereof. The image-side surface 672 of the seventh lens element 670 has one critical point in an off-axis region thereof.

The eighth lens element 680 with positive refractive power has an object-side surface 681 being convex in a paraxial region thereof and an image-side surface 682 being convex in a paraxial region thereof. The eighth lens element 680 is made of plastic material and has the object-side surface 681 and the image-side surface 682 being both aspheric. The object-side surface 681 of the eighth lens element 680 has three inflection points. The image-side surface 682 of the eighth lens element 680 has four inflection points. The object-side surface 681 of the eighth lens element 680 has two critical points in an off-axis region thereof. The image-side surface 682 of the eighth lens element 680 has two critical points in an off-axis region thereof.

The ninth lens element 690 with negative refractive power has an object-side surface 691 being concave in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has four inflection points. The image-side surface 692 of the ninth lens element 690 has two inflection points. The image-side surface 692 of the ninth lens element 690 has two critical points in an off-axis region thereof.

The filter 693 is made of glass material and located between the ninth lens element 690 and the image surface 696, and will not affect the focal length of the optical photographing lens assembly. The image sensor 699 is disposed on or near the image surface 696 of the optical photographing lens assembly.

The detailed optical data of the 6th embodiment are shown in Table 11 and the aspheric surface data are shown in Table 12 below.

TABLE 11

6th Embodiment
f = 5.07 mm, Fno = 1.40, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.762 | | | | |
| 2 | Lens 1 | 2.450 (ASP) | 0.837 | Glass | 1.522 | 62.2 | 6.89 |
| 3 | | 6.778 (ASP) | 0.020 | | | | |
| 4 | Lens 2 | 6.703 (ASP) | 0.294 | Plastic | 1.515 | 59.5 | 33.76 |
| 5 | | 10.746 (ASP) | 0.023 | | | | |
| 6 | Lens 3 | 3.214 (ASP) | 0.244 | Plastic | 1.622 | 21.4 | −20.86 |
| 7 | | 2.501 (ASP) | 0.392 | | | | |
| 8 | Stop | Plano | 0.198 | | | | |
| 9 | Lens 4 | 8.192 (ASP) | 0.293 | Plastic | 1.654 | 18.9 | −19.64 |
| 10 | | 4.931 (ASP) | 0.103 | | | | |
| 11 | Lens 5 | 16.176 (ASP) | 0.812 | Plastic | 1.515 | 59.5 | 8.74 |
| 12 | | −6.134 (ASP) | 0.149 | | | | |
| 13 | Lens 6 | −2.546 (ASP) | 0.432 | Plastic | 1.622 | 21.4 | −20.99 |
| 14 | | −3.369 (ASP) | 0.020 | | | | |
| 15 | Lens 7 | 2.046 (ASP) | 0.442 | Plastic | 1.515 | 59.5 | 7.87 |
| 16 | | 3.830 (ASP) | 0.646 | | | | |
| 17 | Lens 8 | 3.565 (ASP) | 0.240 | Plastic | 1.515 | 59.5 | 6.47 |
| 18 | | −49.996 (ASP) | 0.095 | | | | |
| 19 | Lens 9 | −85.984 (ASP) | 0.240 | Plastic | 1.510 | 60.1 | −3.13 |
| 20 | | 1.630 (ASP) | 0.450 | | | | |
| 21 | Filter | Plano | 0.210 | Glass | 1.517 | 64.2 | — |
| 22 | | Plano | 0.536 | | | | |
| 23 | Image | Plano | — | | | | |

Note:
Reference wavelength is 587.6 nm (d-line).
An effective radius of the stop 601 (Surface 8) is 1.395 mm.

TABLE 12

Aspheric Coefficients

| Surface # | 2 | 3 | 4 | 5 | 6 |
|---|---|---|---|---|---|
| k= | −6.5423E−01 | 0.0000E+00 | 0.0000E+00 | −6.4988E+01 | −1.0985E+00 |
| A4= | 8.9931E−03 | 4.0696E−02 | 4.3530E−02 | −6.9395E−02 | −1.1405E−01 |
| A6= | −8.2710E−03 | −1.7413E−01 | −1.8455E−01 | 1.4595E−01 | 1.9906E−01 |
| A8= | 1.1567E−02 | 2.9918E−01 | 3.1236E−01 | −1.5856E−01 | −2.2734E−01 |
| A10= | −7.5038E−03 | −2.4924E−01 | −2.5710E−01 | 1.0426E−01 | 1.6300E−01 |
| A12= | 2.5618E−03 | 1.0810E−01 | 1.0984E−01 | −4.2462E−02 | −7.0898E−02 |
| A14= | −4.2258E−04 | −2.3555E−02 | −2.3482E−02 | 9.7884E−03 | 1.7023E−02 |
| A16= | 2.2742E−05 | 2.0362E−03 | 1.9895E−03 | −9.5747E−04 | −1.6867E−03 |

| Surface # | 7 | 9 | 10 | 11 | 12 |
|---|---|---|---|---|---|
| k= | 1.2253E+00 | −3.8739E+01 | −4.8334E−01 | 4.4960E+01 | −1.9364E+01 |
| A4= | −6.6835E−02 | −5.0578E−02 | −8.4764E−02 | −7.0571E−02 | −9.3728E−02 |
| A6= | 5.8429E−02 | 7.0676E−03 | 4.7691E−02 | 3.9554E−02 | 1.8156E−02 |
| A8= | −6.6740E−02 | −1.8120E−03 | −2.5149E−02 | −2.2296E−02 | 2.5546E−03 |
| A10= | 4.5656E−02 | −8.9759E−03 | 4.3089E−03 | 1.3039E−02 | −1.2290E−03 |
| A12= | −1.8192E−02 | 1.9450E−03 | 6.8646E−04 | −4.0502E−03 | 8.3741E−04 |
| A14= | 3.0165E−03 | 4.8596E−04 | −1.4936E−04 | 4.6639E−04 | −3.5826E−04 |
| A16= | — | — | — | — | 4.7729E−05 |

| Surface # | 13 | 14 | 15 | 16 | 17 |
|---|---|---|---|---|---|
| k= | −7.1986E+00 | −1.2237E+01 | −3.2538E+00 | −6.9901E−01 | −1.4350E+01 |
| A4= | −5.3502E−02 | −7.2216E−02 | 2.9612E−02 | 9.8229E−02 | −1.2361E−01 |
| A6= | −5.2915E−04 | 1.5247E−03 | −5.1635E−02 | −9.4999E−02 | 4.2007E−02 |
| A8= | 2.2493E−02 | 3.0110E−02 | 2.6834E−02 | 4.1174E−02 | −9.5903E−03 |
| A10= | −1.1266E−02 | −2.1385E−02 | −1.0724E−02 | −1.2045E−02 | 1.8537E−03 |
| A12= | 2.6917E−03 | 7.4043E−03 | 3.1078E−03 | 2.4318E−03 | −2.7761E−04 |
| A14= | −3.2562E−04 | −1.3689E−03 | −6.1867E−04 | −3.3227E−04 | 2.8676E−05 |
| A16= | 1.5601E−05 | 1.2870E−04 | 7.7758E−05 | 2.9518E−05 | −1.8867E−06 |
| A18= | — | −4.8506E−06 | −5.3413E−06 | −1.5503E−06 | 7.1179E−08 |
| A20= | — | — | 1.4809E−07 | 3.6590E−08 | −1.1764E−09 |

| Surface # | 18 | 19 | 20 |
|---|---|---|---|
| k= | 4.2714E+01 | −7.7581E+01 | −4.3283E+00 |
| A4= | 4.3768E−03 | 9.9509E−03 | −7.7494E−02 |
| A6= | −4.9382E−03 | −7.9502E−03 | 3.0603E−02 |

TABLE 12-continued

| Aspheric Coefficients | | | |
|---|---|---|---|
| A8= | 2.2363E−03 | 2.3658E−03 | −9.4435E−03 |
| A10= | −4.2749E−04 | −2.5513E−04 | 2.0442E−03 |
| A12= | 3.0442E−05 | −1.7430E−05 | −2.9818E−04 |
| A14= | 1.2917E−06 | 7.5886E−06 | 2.8640E−05 |
| A16= | −3.6492E−07 | −8.3716E−07 | −1.7270E−06 |
| A18= | 2.3331E−08 | 4.2673E−08 | 5.9031E−08 |
| A20= | −5.2964E−10 | −8.6287E−10 | −8.7079E−10 |

In the 6th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.07 | YI213/Y21 | 0.94 |
| Fno | 1.40 | YI214/Y21 | 0.97 |
| HFOV [deg.] | 37.7 | YI221/Y22 | 0.67 |
| Npmax | 1.654 | YI222/Y22 | 0.77 |
| V1/N1 | 40.86 | YI223/Y22 | 0.96 |
| V2/N2 | 39.27 | YI411/Y41 | 0.30 |
| V3/N3 | 13.19 | YI421/Y42 | 0.33 |
| V4/N4 | 11.46 | YI422/Y42 | 0.87 |
| V5/N5 | 39.27 | YI511/Y51 | 0.16 |
| V6/N6 | 13.19 | YI512/Y51 | 0.63 |
| V7/N7 | 39.27 | YI521/Y52 | 0.72 |
| V8/N8 | 39.27 | YI611/Y61 | 0.54 |
| V9/N9 | 39.80 | YI612/Y61 | 0.95 |
| Vpmin | 18.9 | YI621/Y62 | 0.61 |
| ΣAT/ΣCT | 0.43 | YI622/Y62 | 0.93 |
| ATmax/CTmin | 2.69 | YI711/Y71 | 0.36 |
| CT1/T12 | 41.85 | YI712/Y71 | 0.87 |
| SD/TD | 0.86 | YI713/Y71 | 0.99 |
| TD/BL | 4.58 | YI721/Y72 | 0.37 |
| TL [mm] | 6.68 | YI722/Y72 | 0.99 |
| TL/EPD | 1.84 | YI811/Y81 | 0.13 |
| TL/f | 1.32 | YI812/Y81 | 0.53 |
| TL/ImgH | 1.66 | YI813/Y81 | 0.97 |
| |R18/f| | 0.32 | YI821/Y82 | 0.40 |
| Σ|f/fi| | 5.26 | YI822/Y82 | 0.62 |
| f/EPD | 1.40 | YI823/Y82 | 0.90 |
| f/f1 | 0.74 | YI824/Y82 | 0.91 |
| f/f2 | 0.15 | YI911/Y91 | 0.10 |
| f/f3 | −0.24 | YI912/Y91 | 0.22 |
| f/f4 | −0.26 | YI913/Y91 | 0.50 |
| f/f5 | 0.58 | YI914/Y91 | 0.64 |
| f/f6 | −0.24 | YI921/Y92 | 0.20 |
| f/f7 | 0.64 | YI922/Y92 | 0.76 |
| f/f8 | 0.78 | YC411/Y41 | 0.53 |
| f/f9 | −1.62 | YC421/Y42 | 0.61 |
| f12/f | 1.14 | YC422/Y42 | 0.98 |
| CRA [deg.] | 34.56 | YC511/Y51 | 0.30 |
| ImgH/BL | 3.37 | YC512/Y51 | 0.85 |
| ImgH/Y11 | 2.23 | YC521/Y52 | 0.99 |
| LNP | 8 | YC611/Y61 | 0.84 |
| Y92/Y11 | 1.94 | YC621/Y62 | 0.84 |
| Ymax/Ymin | 2.51 | YC711/Y71 | 0.61 |
| YI111/Y11 | 0.93 | YC721/Y72 | 0.61 |
| YI121/Y12 | 0.69 | YC811/Y81 | 0.24 |
| YI122/Y12 | 0.73 | YC812/Y81 | 0.82 |
| YI123/Y12 | 0.86 | YC821/Y82 | 0.56 |
| YI124/Y12 | 0.98 | YC822/Y82 | 0.67 |
| YI211/Y21 | 0.67 | YC921/Y92 | 0.48 |
| YI212/Y21 | 0.75 | YC922/Y92 | 0.97 |

7th Embodiment

Figure 13:
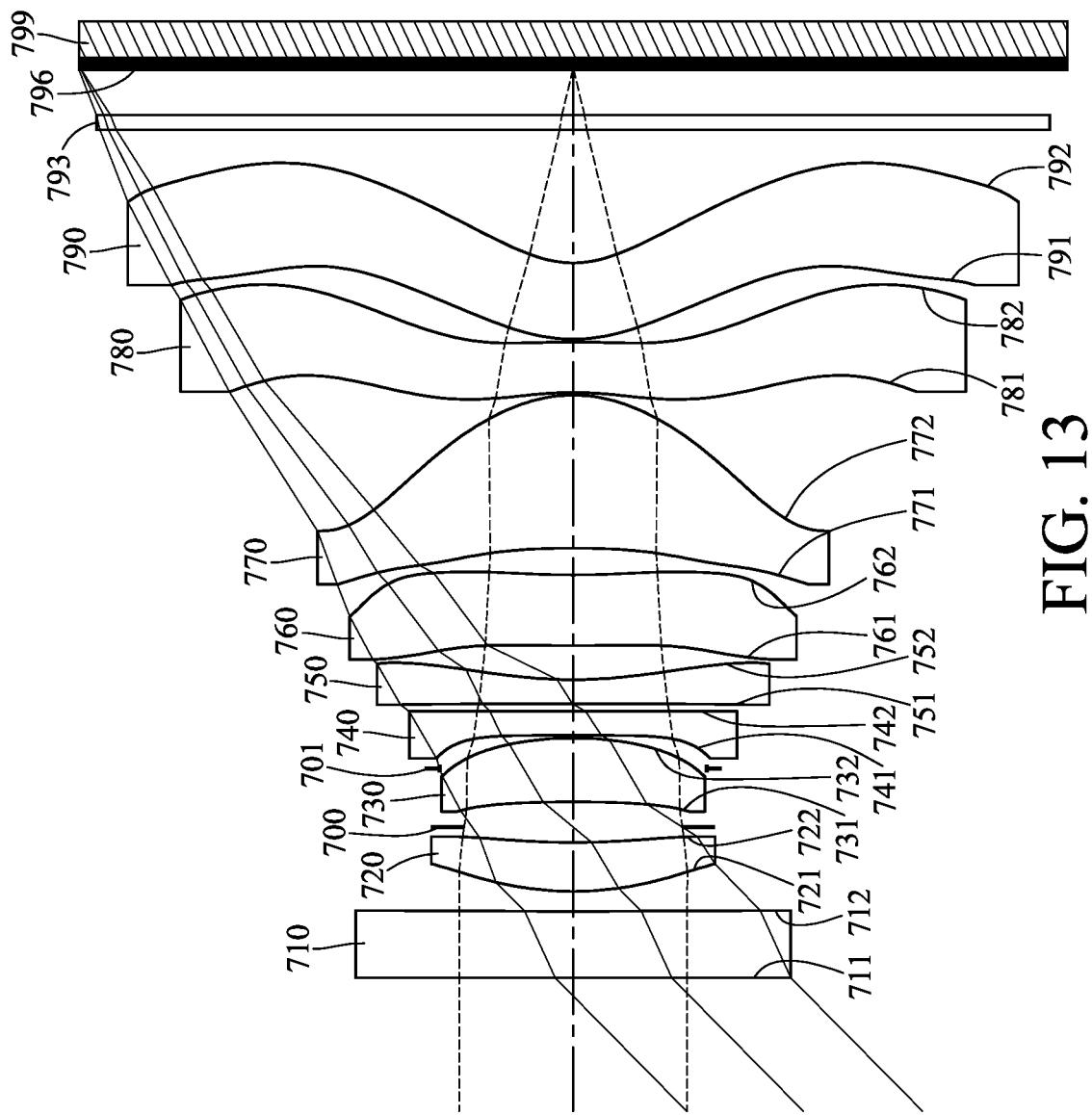
FIG. 13 is a schematic view of an image capturing unit according to the 7th embodiment of the present disclosure.
Figure 14:
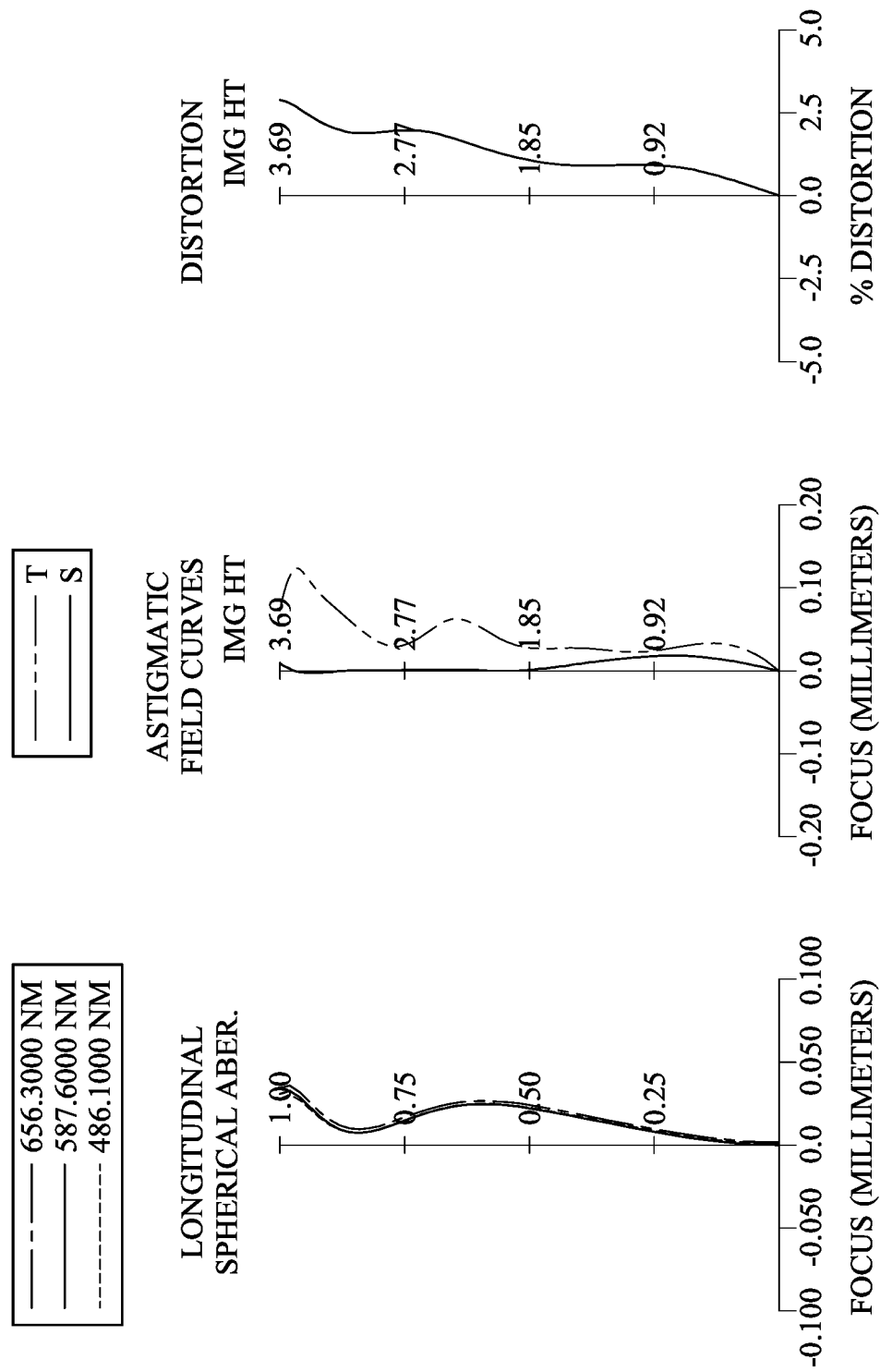
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical photographing lens assembly (its reference numeral is omitted) of the present disclosure and an image sensor 799. The optical photographing lens assembly includes, in order from an object side to an image side, a first lens element 710, a second lens element 720, an aperture stop 700, a third lens element 730, a stop 701, a fourth lens element 740, a fifth lens element 750, a sixth lens element 760, a seventh lens element 770, an eighth lens element 780, a ninth lens element 790, a filter 793 and an image surface 796. The optical photographing lens assembly includes nine lens elements (710, 720, 730, 740, 750, 760, 770, 780 and 790) with no additional lens element disposed between each of the adjacent nine lens elements.

The first lens element 710 with negative refractive power has an object-side surface 711 being planar in a paraxial region thereof and an image-side surface 712 being concave in a paraxial region thereof. The first lens element 710 is made of glass material and has the object-side surface 711 and the image-side surface 712 being both spherical.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point. The image-side surface 722 of the second lens element 720 has one inflection point. The image-side surface 722 of the second lens element 720 has one critical point in an off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 has an object-side surface 741 being planar in a paraxial region thereof and an image-side surface 742 being planar in a paraxial region thereof. The fourth lens element 740 is made of plastic material and has the object-side surface 741 being aspheric and the image-side surface 742 being spherical.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 being spherical and the image-side surface 752 being aspheric. The image-side surface 752 of the fifth lens element 750 has one inflection point. The image-side surface 752 of the fifth lens element 750 has one critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has three inflection points. The image-side surface 762 of the sixth lens element 760 has two inflection points. The object-side surface 761 of the sixth lens element 760 has one critical point in an off-axis region thereof. The image-side surface 762 of the sixth lens element 760 has one critical point in an off-axis region thereof.

The seventh lens element 770 with positive refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric. The object-side surface 771 of the seventh lens element 770 has two inflection points. The image-side surface 772 of the seventh lens element 770 has one inflection point. The image-side surface 772 of the seventh lens element 770 has one critical point in an off-axis region thereof.

The eighth lens element 780 with negative refractive power has an object-side surface 781 being concave in a paraxial region thereof and an image-side surface 782 being convex in a paraxial region thereof. The eighth lens element 780 is made of plastic material and has the object-side surface 781 and the image-side surface 782 being both aspheric. The object-side surface 781 of the eighth lens element 780 has two inflection points. The image-side surface 782 of the eighth lens element 780 has two inflection points. The object-side surface 781 of the eighth lens element 780 has two critical points in an off-axis region thereof. The image-side surface 782 of the eighth lens element 780 has two critical points in an off-axis region thereof.

The ninth lens element 790 with negative refractive power has an object-side surface 791 being convex in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has three inflection points. The image-side surface 792 of the ninth lens element 790 has one inflection point. The object-side surface 791 of the ninth lens element 790 has one critical point in an off-axis region thereof. The image-side surface 792 of the ninth lens element 790 has one critical point in an off-axis region thereof.

The filter 793 is made of glass material and located between the ninth lens element 790 and the image surface 796, and will not affect the focal length of the optical photographing lens assembly. The image sensor 799 is disposed on or near the image surface 796 of the optical photographing lens assembly.

The detailed optical data of the 7th embodiment are shown in Table 13 and the aspheric surface data are shown in Table 14 below.

TABLE 13

7th Embodiment
f = 3.63 mm, Fno = 2.12, HFOV = 44.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | ∞ | (SPH) | 0.500 | Glass | 1.699 | 30.1 | −246.51 |
| 2 | | 172.298 | (SPH) | 0.150 | | | | |
| 3 | Lens 2 | 2.458 | (ASP) | 0.367 | Plastic | 1.544 | 56.0 | 7.63 |
| 4 | | 5.712 | (ASP) | 0.116 | | | | |
| 5 | Ape. Stop | Plano | | 0.188 | | | | |
| 6 | Lens 3 | −12.329 | (ASP) | 0.480 | Plastic | 1.544 | 56.0 | 5.67 |
| 7 | | −2.503 | (ASP) | −0.230 | | | | |
| 8 | Stop | Plano | | 0.250 | | | | |
| 9 | Lens 4 | ∞ | (ASP) | 0.180 | Plastic | 1.584 | 28.2 | ∞ |
| 10 | | ∞ | (SPH) | 0.058 | | | | |
| 11 | Lens 5 | −107.296 | (SPH) | 0.180 | Plastic | 1.614 | 26.0 | −5.33 |
| 12 | | 3.376 | (ASP) | 0.255 | | | | |
| 13 | Lens 6 | 11.300 | (ASP) | 0.532 | Plastic | 1.562 | 44.6 | −26.08 |
| 14 | | 6.272 | (ASP) | 0.200 | | | | |
| 15 | Lens 7 | −6.744 | (ASP) | 1.149 | Plastic | 1.544 | 56.0 | 2.19 |
| 16 | | −1.073 | (ASP) | 0.020 | | | | |
| 17 | Lens 8 | −2.382 | (ASP) | 0.380 | Plastic | 1.614 | 26.0 | −8.05 |
| 18 | | −4.880 | (ASP) | 0.020 | | | | |
| 19 | Lens 9 | 1.203 | (ASP) | 0.572 | Plastic | 1.544 | 56.0 | −6.63 |
| 20 | | 0.751 | (ASP) | 1.000 | | | | |
| 21 | Filter | Plano | | 0.110 | Glass | 1.517 | 64.2 | — |
| 22 | | Plano | | 0.339 | | | | |
| 23 | Image | Plano | | — | | | | |

Note:
Reference wavelength is 587.6 nm (d-line).
An effective radius of the stop 701 (Surface 8) is 1.000 mm.

TABLE 14

Aspheric Coefficients

| Surface # | 3 | 4 | 6 | 7 | 9 |
|---|---|---|---|---|---|
| k= | −1.5169E+00 | 6.9776E−01 | −9.9000E+01 | −2.5149E+00 | 0.0000E+00 |
| A4= | 1.4317E−02 | −2.4445E−02 | −6.8460E−02 | −8.8427E−03 | −2.2314E−02 |
| A6= | −4.8592E−02 | −2.1760E−02 | 1.2020E−01 | −1.0881E−01 | −1.4063E−01 |
| A8= | 1.2030E−01 | 4.5086E−02 | −5.9721E−01 | −1.6000E−01 | 8.6526E−02 |
| A10= | −1.8245E−01 | −1.6151E−01 | 1.3030E+00 | 5.4695E−01 | −1.6682E−01 |
| A12= | 1.0994E−01 | 1.7441E−01 | −1.4545E+00 | −5.9767E−01 | 3.0815E−01 |
| A14= | −2.3775E−02 | −5.8670E−02 | 6.2114E−01 | 2.1319E−01 | −3.2533E−01 |
| A16= | — | — | — | — | 1.1326E−01 |

| Surface # | 12 | 13 | 14 | 15 | 16 |
|---|---|---|---|---|---|
| k= | −1.0417E+01 | −9.9000E+01 | 1.6826E+00 | 2.7441E+00 | −1.9399E+00 |
| A4= | −3.8242E−02 | −1.1180E−01 | −8.8479E−02 | −5.6314E−02 | −3.5810E−02 |
| A6= | 5.5993E−02 | 8.0073E−02 | 2.7382E−02 | −8.5948E−03 | 1.8882E−03 |
| A8= | −8.7474E−02 | −1.2074E−01 | −1.5447E−02 | 6.4271E−03 | −4.2197E−03 |
| A10= | 7.2604E−02 | 1.2850E−01 | 3.3274E−02 | 1.2315E−01 | 6.4877E−03 |
| A12= | −3.4761E−02 | −6.5999E−02 | −2.9442E−02 | −1.5814E−01 | −2.5966E−03 |
| A14= | 9.2241E−03 | 1.6411E−02 | 9.4311E−03 | 8.5085E−02 | 1.0659E−03 |
| A16= | −1.0763E−03 | −1.6260E−03 | −9.9749E−04 | −2.3693E−02 | −3.8959E−04 |
| A18= | — | — | — | 3.3780E−03 | 7.3572E−05 |
| A20= | — | — | — | −1.9597E−04 | −5.2421E−06 |

| Surface # | 17 | 18 | 19 | 20 |
|---|---|---|---|---|
| k= | −1.7662E+01 | −9.9000E+01 | −9.9367E−01 | −2.7467E+00 |
| A4= | 1.5380E−01 | 2.1338E−01 | −1.7310E−01 | −7.4830E−02 |
| A6= | −6.3781E−02 | −1.2149E−01 | 6.7972E−02 | 3.6053E−02 |
| A8= | 1.0943E−02 | 4.0013E−02 | −1.9650E−02 | −1.2248E−02 |
| A10= | 5.4766E−04 | −8.8451E−03 | 2.8715E−03 | 2.5715E−03 |
| A12= | −7.3603E−04 | 1.3149E−03 | −6.0979E−05 | −3.3847E−04 |
| A14= | 1.6708E−04 | −1.2824E−04 | −4.1429E−05 | 2.7728E−05 |
| A16= | −1.8578E−05 | 7.8244E−06 | 6.1340E−06 | −1.3311E−06 |
| A18= | 1.0452E−06 | −2.7013E−07 | −3.6743E−07 | 3.2169E−08 |
| A20= | −2.3816E−08 | 4.0255E−09 | 8.4108E−09 | −2.5628E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.63 | CRA [deg.] | 26.76 |
| Fno | 2.12 | ImgH/BL | 2.55 |
| HFOV [deg.] | 44.6 | ImgH/Y11 | 2.26 |
| Npmax | 1.614 | LNP | 8 |
| V1/N1 | 17.69 | Y92/Y11 | 2.05 |
| V2/N2 | 36.26 | Ymax/Ymin | 3.83 |
| V3/N3 | 36.26 | YI211/Y21 | 0.81 |
| V4/N4 | 17.80 | YI221/Y22 | 0.62 |
| V5/N5 | 16.09 | YI521/Y52 | 0.52 |
| V6/N6 | 28.57 | YI611/Y61 | 0.17 |
| V7/N7 | 36.26 | YI612/Y61 | 0.72 |
| V8/N8 | 16.09 | YI613/Y61 | 0.98 |
| V9/N9 | 36.26 | YI621/Y62 | 0.25 |
| Vpmin | 26.0 | YI622/Y62 | 0.95 |
| ΣAT/ΣCT | 0.24 | YI711/Y71 | 0.49 |
| ATmax/CTmin | 1.69 | YI712/Y71 | 0.68 |
| CT1/T12 | 3.33 | YI721/Y72 | 0.66 |
| SD/TD | 0.79 | YI811/Y81 | 0.15 |
| TD/BL | 3.70 | YI812/Y81 | 0.56 |
| TL [mm] | 6.82 | YI821/Y82 | 0.08 |
| TL/EPD | 3.99 | YI822/Y82 | 0.48 |
| TL/f | 1.88 | YI911/Y91 | 0.30 |

-continued

| 7th Embodiment | | | |
|---|---|---|---|
| TL/ImgH | 1.85 | YI912/Y91 | 0.78 |
| |R18/f| | 0.21 | YI913/Y91 | 0.91 |
| Σ|f/fi| | 4.60 | YI921/Y92 | 0.23 |
| f/EPD | 2.12 | YC221/Y22 | 0.99 |
| f/f1 | −0.01 | YC521/Y52 | 0.91 |
| f/f2 | 0.48 | YC611/Y61 | 0.31 |
| f/f3 | 0.64 | YC621/Y62 | 0.47 |
| f/f4 | 0.00 | YC721/Y72 | 0.999 |
| f/f5 | −0.68 | YC811/Y81 | 0.30 |
| f/f6 | −0.14 | YC812/Y81 | 0.78 |
| f/f7 | 1.66 | YC821/Y82 | 0.16 |
| f/f8 | −0.45 | YC822/Y82 | 0.79 |
| f/f9 | −0.55 | YC911/Y91 | 0.64 |
| f12/f | 2.17 | YC921/Y92 | 0.66 |

8th Embodiment

Figure 15:
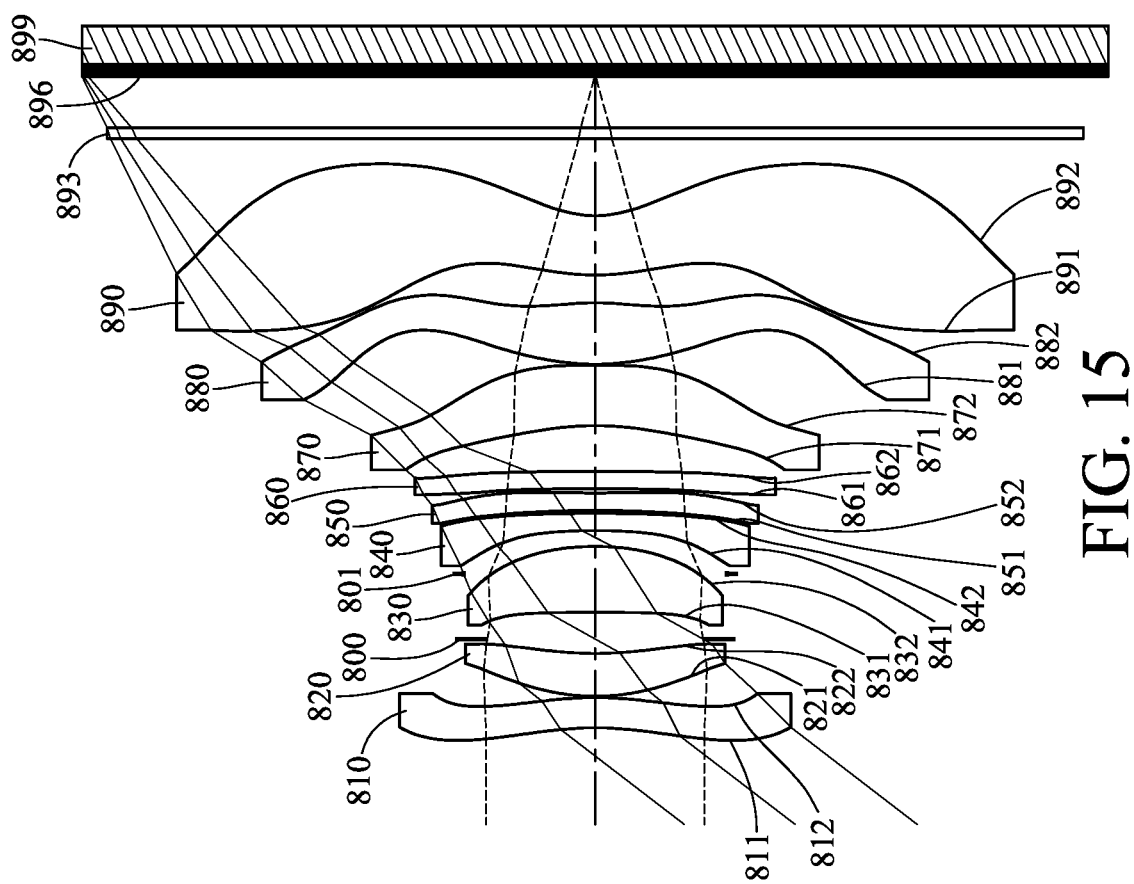
FIG. 15 is a schematic view of an image capturing unit according to the 8th embodiment of the present disclosure.
Figure 16:
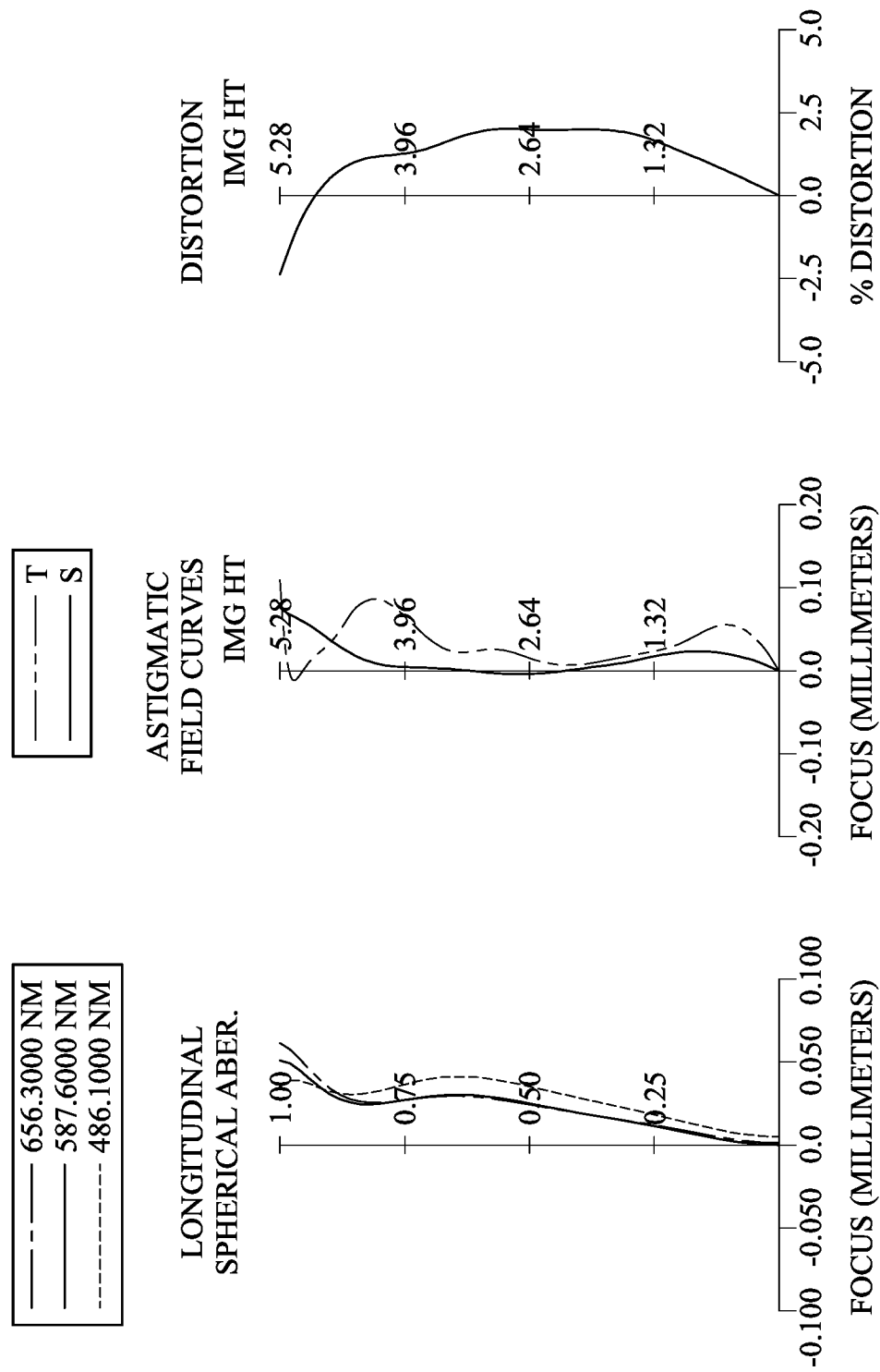
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical photographing lens assembly (its reference numeral is omitted) of the present disclosure and an image sensor 899. The optical photographing lens assembly includes, in order from an object side to an image side, a first lens element 810, a second lens element 820, an aperture stop 800, a third lens element 830, a stop 801, a fourth lens element 840, a fifth lens element 850, a sixth lens element 860, a seventh lens element 870, an eighth lens element 880, a ninth lens element 890, a filter 893 and an image surface 896. The optical photographing lens assembly includes nine lens elements (810, 820, 830, 840, 850, 860, 870, 880 and 890) with no additional lens element disposed between each of the adjacent nine lens elements.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point. The object-side surface 811 of the first lens element 810 has one critical point in an off-axis region thereof. The image-side surface 812 of the first lens element 810 has one critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point. The image-side surface 822 of the second lens element 820 has one inflection point. The image-side surface 822 of the second lens element 820 has one critical point in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has one inflection point.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has two inflection points. The image-side surface 852 of the fifth lens element 850 has two inflection points. The image-side surface 852 of the fifth lens element 850 has one critical point in an off-axis region thereof.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points. The image-side surface 862 of the sixth lens element 860 has one inflection point. The image-side surface 862 of the sixth lens element 860 has one critical point in an off-axis region thereof.

The seventh lens element 870 with negative refractive power has an object-side surface 871 being concave in a paraxial region thereof and an image-side surface 872 being convex in a paraxial region thereof. The seventh lens element 870 is made of plastic material and has the object-side surface 871 and the image-side surface 872 being both aspheric. The image-side surface 872 of the seventh lens element 870 has two inflection points.

The eighth lens element 880 with positive refractive power has an object-side surface 881 being convex in a paraxial region thereof and an image-side surface 882 being convex in a paraxial region thereof. The eighth lens element 880 is made of plastic material and has the object-side surface 881 and the image-side surface 882 being both aspheric. The object-side surface 881 of the eighth lens element 880 has two inflection points. The image-side surface 882 of the eighth lens element 880 has four inflection points. The object-side surface 881 of the eighth lens element 880 has one critical point in an off-axis region thereof. The image-side surface 882 of the eighth lens element 880 has two critical points in an off-axis region thereof.

The ninth lens element 890 with negative refractive power has an object-side surface 891 being convex in a paraxial region thereof and an image-side surface 892 being concave in a paraxial region thereof. The ninth lens element 890 is made of plastic material and has the object-side surface 891 and the image-side surface 892 being both aspheric. The object-side surface 891 of the ninth lens element 890 has three inflection points. The image-side surface 892 of the ninth lens element 890 has two inflection points. The object-side surface 891 of the ninth lens element 890 has two critical points in an off-axis region thereof. The image-side surface 892 of the ninth lens element 890 has one critical point in an off-axis region thereof.

The filter 893 is made of glass material and located between the ninth lens element 890 and the image surface 896, and will not affect the focal length of the optical photographing lens assembly. The image sensor 899 is disposed on or near the image surface 896 of the optical photographing lens assembly.

The detailed optical data of the 8th embodiment are shown in Table 15 and the aspheric surface data are shown in Table 16 below.

TABLE 15

8th Embodiment
f = 4.14 mm, Fno = 1.84, HFOV = 52.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.157 (ASP) | 0.312 | Plastic | 1.537 | 55.5 | −134.82 |
| 2 | | −3.415 (ASP) | 0.014 | | | | |
| 3 | Lens 2 | 2.176 (ASP) | 0.443 | Plastic | 1.544 | 56.0 | 8.57 |
| 4 | | 3.787 (ASP) | 0.149 | | | | |

TABLE 15-continued

8th Embodiment
f = 4.14 mm, Fno = 1.84, HFOV = 52.4 deg.

| Surface # | | Curvature Radius | Thickness | Material | Index | Abbe # | Focal Length |
|---|---|---|---|---|---|---|---|
| 5 | Ape. Stop | Plano | 0.276 | | | | |
| 6 | Lens 3 | −37.821 (ASP) | 0.681 | Plastic | 1.537 | 55.5 | 5.33 |
| 7 | | −2.678 (ASP) | −0.281 | | | | |
| 8 | Stop | Plano | 0.444 | | | | |
| 9 | Lens 4 | −7.966 (ASP) | 0.180 | Plastic | 1.660 | 20.4 | −22.32 |
| 10 | | −17.506 (ASP) | 0.030 | | | | |
| 11 | Lens 5 | −11.216 (ASP) | 0.180 | Plastic | 1.689 | 17.3 | −10.47 |
| 12 | | 20.325 (ASP) | 0.044 | | | | |
| 13 | Lens 6 | −24.328 (ASP) | 0.180 | Plastic | 1.532 | 57.1 | 662.23 |
| 14 | | −22.815 (ASP) | 0.472 | | | | |
| 15 | Lens 7 | −2.993 (ASP) | 0.625 | Plastic | 1.566 | 37.4 | −6.36 |
| 16 | | −19.010 (ASP) | 0.010 | | | | |
| 17 | Lens 8 | 2.491 (ASP) | 0.634 | Plastic | 1.537 | 55.5 | 2.62 |
| 18 | | −2.939 (ASP) | 0.289 | | | | |
| 19 | Lens 9 | 2.519 (ASP) | 0.612 | Plastic | 1.544 | 56.0 | −4.04 |
| 20 | | 1.073 (ASP) | 0.800 | | | | |
| 21 | Filter | Plano | 0.110 | Glass | 1.517 | 64.2 | — |
| 22 | | Plano | 0.529 | | | | |
| 23 | Image | Plano | — | | | | |

Note:
Reference wavelength is 587.6 nm (d-line).
An effective radius of the stop 801 (Surface 8) is 1.360 mm.

TABLE 16

Aspheric Coefficients

| Surface # | 1 | 2 | 3 | 4 | 6 |
|---|---|---|---|---|---|
| k= | −2.0499E+01 | −2.8509E+01 | −1.1930E+00 | 1.6832E+00 | 9.9000E+01 |
| A4= | 1.9487E−02 | 1.9645E−02 | −1.1491E−02 | −6.1493E−02 | −2.5858E−02 |
| A6= | −5.8484E−03 | −5.9809E−03 | −1.4028E−02 | 2.6446E−02 | −1.5817E−02 |
| A8= | 3.2223E−03 | 7.7861E−03 | 1.8567E−02 | −1.9324E−02 | 7.1211E−03 |
| A10= | −6.4460E−04 | −2.7532E−03 | −7.6355E−03 | 3.8211E−03 | −1.5630E−02 |
| A12= | 5.1696E−05 | 4.7769E−04 | — | — | 4.3061E−03 |

| Surface # | 7 | 9 | 10 | 11 | 12 |
|---|---|---|---|---|---|
| k= | −5.2427E−03 | 6.4951E+00 | 9.8912E+01 | 0.0000E+00 | 0.0000E+00 |
| A4= | −4.8194E−02 | −9.1494E−02 | 7.0026E−03 | 1.5252E−02 | −2.0018E−02 |
| A6= | 1.2386E−02 | 1.6496E−02 | −4.0577E−02 | −5.1854E−02 | −2.9583E−02 |
| A8= | −1.1588E−02 | −1.0201E−03 | 5.5546E−02 | 6.9114E−02 | 1.3815E−02 |
| A10= | 4.7365E−04 | −7.8888E−03 | −3.4773E−02 | −4.3983E−02 | 3.6300E−03 |
| A12= | 3.9157E−04 | 6.5928E−03 | 1.0099E−02 | 1.2951E−02 | −3.5258E−03 |
| A14= | — | −1.2917E−03 | −1.1184E−03 | −1.4268E−03 | 6.1758E−04 |

| Surface # | 13 | 14 | 15 | 16 | 17 |
|---|---|---|---|---|---|
| k= | 6.7098E+01 | 9.8931E+01 | −1.0314E+01 | 4.5598E+01 | −1.5709E+01 |
| A4= | 3.7531E−02 | 3.4611E−02 | 1.3163E−02 | −1.8940E−01 | 3.6131E−02 |
| A6= | −6.7420E−02 | −5.5327E−02 | −4.8748E−03 | 1.2216E−01 | 4.8581E−03 |
| A8= | 2.7880E−02 | 4.6374E−02 | 3.7309E−03 | −5.5865E−02 | −1.7916E−02 |
| A10= | 7.7351E−03 | −2.3442E−02 | −6.4182E−03 | 1.6090E−02 | 8.0368E−03 |
| A12= | −8.5949E−03 | 6.8651E−03 | 5.0680E−03 | −2.1961E−03 | −1.8651E−03 |
| A14= | 2.2732E−03 | −1.0602E−03 | −1.9492E−03 | 2.5336E−05 | 2.5480E−04 |
| A16= | −2.0642E−04 | 6.7960E−05 | 3.5565E−04 | 2.3583E−05 | −2.0465E−05 |
| A18= | — | — | −2.4784E−05 | −1.6968E−06 | 8.9322E−07 |
| A20= | — | — | — | — | −1.6368E−08 |

| Surface # | 18 | 19 | 20 |
|---|---|---|---|
| k= | −1.0000E+00 | −1.0206E+00 | −3.3790E+00 |
| A4= | 2.5753E−01 | −8.3318E−02 | −4.6484E−02 |
| A6= | −1.3019E−01 | −3.2337E−03 | 7.7058E−03 |
| A8= | 3.5802E−02 | 4.8881E−03 | −6.5505E−04 |
| A10= | −6.4497E−03 | −9.2407E−04 | 3.8006E−05 |
| A12= | 7.9002E−04 | 8.7529E−05 | −4.8001E−06 |
| A14= | −6.4314E−05 | −4.7112E−06 | 6.2193E−07 |
| A16= | 3.2832E−06 | 1.4026E−07 | −4.2392E−08 |
| A18= | −9.3915E−08 | −1.9326E−09 | 1.4077E−09 |
| A20= | 1.1328E−09 | 5.5035E−12 | −1.8304E−11 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.14 | LNP | 9 |
| Fno | 1.84 | Y92/Y11 | 2.14 |
| HFOV [deg.] | 52.4 | Ymax/Ymin | 3.70 |
| Npmax | 1.689 | YI111/Y11 | 0.37 |
| V1/N1 | 36.11 | YI121/Y12 | 0.40 |
| V2/N2 | 36.26 | YI211/Y21 | 0.82 |
| V3/N3 | 36.11 | YI221/Y22 | 0.61 |
| V4/N4 | 12.29 | YI411/Y41 | 0.95 |
| V5/N5 | 10.24 | YI511/Y51 | 0.94 |
| V6/N6 | 37.27 | YI512/Y51 | 0.99 |
| V7/N7 | 23.91 | YI521/Y52 | 0.22 |
| V8/N8 | 36.11 | YI522/Y52 | 0.90 |
| V9/N9 | 36.26 | YI611/Y61 | 0.64 |
| Vpmin | 17.3 | YI612/Y61 | 0.89 |
| ΣAT/ΣCT | 0.38 | YI621/Y62 | 0.83 |
| ATmax/CTmin | 2.62 | YI721/Y72 | 0.65 |
| CT1/T12 | 22.29 | YI722/Y72 | 0.92 |
| SD/TD | 0.83 | YI811/Y81 | 0.38 |
| TD/BL | 3.68 | YI812/Y81 | 0.86 |
| TL [mm] | 6.73 | YI821/Y82 | 0.10 |
| TL/EPD | 2.99 | YI822/Y82 | 0.36 |
| TL/f | 1.62 | YI823/Y82 | 0.74 |
| TL/ImgH | 1.28 | YI824/Y82 | 0.87 |
| |R18/f| | 0.26 | YI911/Y91 | 0.16 |
| Σ|f/fi| | 5.14 | YI912/Y91 | 0.52 |
| f/EPD | 1.84 | YI913/Y91 | 0.99 |
| f/f1 | −0.03 | YI921/Y92 | 0.18 |
| f/f2 | 0.48 | YI922/Y92 | 0.94 |
| f/f3 | 0.78 | YC111/Y11 | 0.71 |
| f/f4 | −0.19 | YC121/Y12 | 0.71 |
| f/f5 | −0.40 | YC221/Y22 | 0.97 |
| f/f6 | 0.01 | YC521/Y52 | 0.37 |
| f/f7 | −0.65 | YC621/Y62 | 0.97 |
| f/f8 | 1.58 | YC811/Y81 | 0.59 |
| f/f9 | −1.03 | YC821/Y82 | 0.20 |
| f12/f | 2.13 | YC822/Y82 | 0.49 |
| CRA [deg.] | 32.43 | YC911/Y91 | 0.28 |
| ImgH/BL | 3.67 | YC912/Y91 | 0.92 |
| ImgH/Y11 | 2.61 | YC921/Y92 | 0.51 |

9th Embodiment

Figure 17:
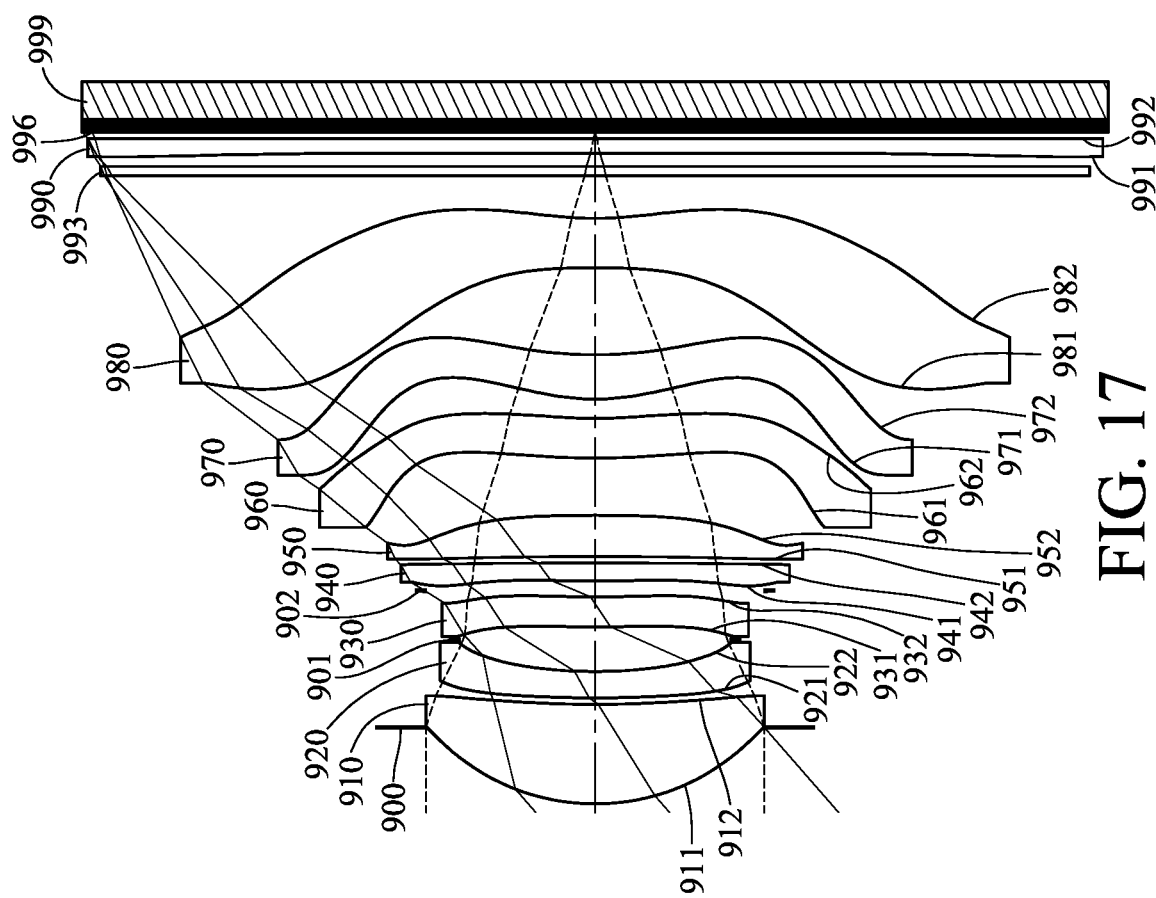
FIG. 17 is a schematic view of an image capturing unit according to the 9th embodiment of the present disclosure.
Figure 18:
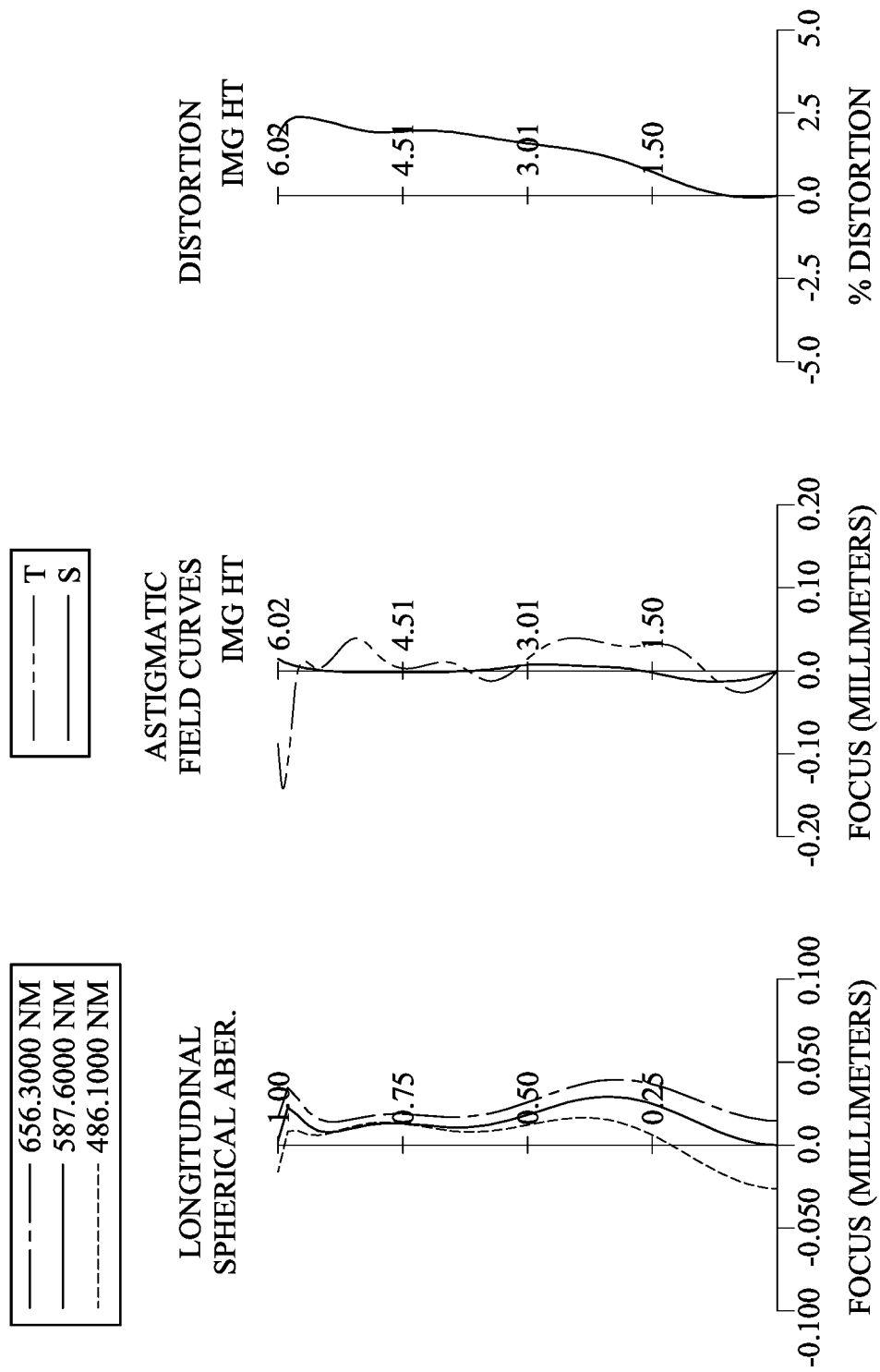
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical photographing lens assembly (its reference numeral is omitted) of the present disclosure and an image sensor 999. The optical photographing lens assembly includes, in order from an object side to an image side, an aperture stop 900, a first lens element 910, a second lens element 920, a stop 901, a third lens element 930, a stop 902, a fourth lens element 940, a fifth lens element 950, a sixth lens element 960, a seventh lens element 970, an eighth lens element 980, a filter 993, a ninth lens element 990 and an image surface 996. The optical photographing lens assembly includes nine lens elements (910, 920, 930, 940, 950, 960, 970, 980 and 990) with no additional lens element disposed between each of the adjacent nine lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has one inflection point.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has two inflection points. The image-side surface 932 of the third lens element 930 has two inflection points. The object-side surface 931 of the third lens element 930 has one critical point in an off-axis region thereof. The image-side surface 932 of the third lens element 930 has two critical points in an off-axis region thereof.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has three inflection points. The image-side surface 942 of the fourth lens element 940 has four inflection points. The object-side surface 941 of the fourth lens element 940 has two critical points in an off-axis region thereof.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has two inflection points. The image-side surface 952 of the fifth lens element 950 has two inflection points. The object-side surface 951 of the fifth lens element 950 has two critical points in an off-axis region thereof. The image-side surface 952 of the fifth lens element 950 has one critical point in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has two inflection points. The image-side surface 962 of the sixth lens element 960 has two inflection points. The object-side surface 961 of the sixth lens element 960 has one critical point in an off-axis region thereof. The image-side surface 962 of the sixth lens element 960 has one critical point in an off-axis region thereof.

The seventh lens element 970 with positive refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has two inflection points. The image-side surface 972 of the seventh lens element 970 has two inflection points. The object-side surface 971 of the seventh lens element 970 has two critical points in an off-axis region thereof. The image-side surface 972 of the seventh lens element 970 has two critical points in an off-axis region thereof.

The eighth lens element 980 with negative refractive power has an object-side surface 981 being concave in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has two inflection points. The image-side surface 982 of the eighth lens element 980 has three inflection points. The object-side surface 981 of the eighth lens element 980 has one critical point in an off-axis region thereof. The image-side surface 982 of the eighth lens element 980 has one critical point in an off-axis region thereof.

The ninth lens element 990 with positive refractive power has an object-side surface 991 being convex in a paraxial region thereof and an image-side surface 992 being planar in a paraxial region thereof. The ninth lens element 990 is made of glass material and has the object-side surface 991 being aspheric and the image-side surface 992 being spherical. The object-side surface 991 of the ninth lens element 990 has two inflection points. The object-side surface 991 of the ninth lens element 990 has two critical points in an off-axis region thereof.

The filter 993 is made of glass material and located between the eighth lens element 980 and the ninth lens element 990, and will not affect the focal length of the optical photographing lens assembly. The image sensor 999 is disposed on or near the image surface 996 of the optical photographing lens assembly.

The detailed optical data of the 9th embodiment are shown in Table 17 and the aspheric surface data are shown in Table 18 below.

TABLE 17

9th Embodiment
f = 6.75 mm, Fno = 1.70, HFOV = 41.1 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.900 |  |  |  |  |
| 2 | Lens 1 | 2.615 (ASP) | 1.169 | Plastic | 1.545 | 56.1 | 6.22 |
| 3 |  | 9.626 (ASP) | 0.077 |  |  |  |  |
| 4 | Lens 2 | 10.718 (ASP) | 0.311 | Plastic | 1.669 | 19.5 | −17.91 |
| 5 |  | 5.592 (ASP) | 0.372 |  |  |  |  |
| 6 | Stop | Plano | 0.154 |  |  |  |  |
| 7 | Lens 3 | 22.045 (ASP) | 0.353 | Plastic | 1.669 | 19.5 | −60.03 |
| 8 |  | 14.142 (ASP) | 0.072 |  |  |  |  |
| 9 | Stop | Plano | 0.116 |  |  |  |  |
| 10 | Lens 4 | 23.629 (ASP) | 0.210 | Plastic | 1.549 | 50.0 | 37.77 |
| 11 |  | −169.014 (ASP) | 0.075 |  |  |  |  |
| 12 | Lens 5 | −86.118 (ASP) | 0.487 | Plastic | 1.544 | 56.0 | 66.40 |
| 13 |  | −25.501 (ASP) | 0.672 |  |  |  |  |
| 14 | Lens 6 | 7.666 (ASP) | 0.468 | Plastic | 1.566 | 37.4 | −27.59 |
| 15 |  | 5.028 (ASP) | 0.227 |  |  |  |  |
| 16 | Lens 7 | 2.632 (ASP) | 0.522 | Plastic | 1.549 | 50.0 | 8.82 |
| 17 |  | 5.358 (ASP) | 1.022 |  |  |  |  |
| 18 | Lens 8 | −13.723 (ASP) | 0.583 | Plastic | 1.544 | 56.0 | −5.60 |
| 19 |  | 3.978 (ASP) | 0.500 |  |  |  |  |
| 20 | Filter | Plano | 0.110 | Glass | 1.517 | 64.2 | — |
| 21 |  | Plano | 0.150 |  |  |  |  |
| 22 | Lens 9 | 441.253 (ASP) | 0.179 | Glass | 1.517 | 64.2 | 853.82 |
| 23 |  | ∞ (SPH) | 0.075 |  |  |  |  |
| 24 | Image | Plano | — |  |  |  |  |

Note:
Reference wavelength is 587.6 nm (d-line).
An effective radius of the stop 901 (Surface 6) is 1.605 mm.
An effective radius of the stop 902 (Surface 9) is 2.005 mm.

TABLE 18

| Aspheric Coefficients | | | | | |
|---|---|---|---|---|---|
| Surface # | 2 | 3 | 4 | 5 | 7 |
| k= | −6.5144E−01 | −9.8350E+01 | 2.4254E+01 | 8.4120E+00 | −4.5599E+01 |
| A4= | 4.7285E−03 | −1.4109E−02 | −3.4494E−02 | −1.2180E−02 | −2.3466E−02 |
| A6= | 9.7051E−04 | 1.0885E−02 | 3.0332E−02 | 1.6572E−02 | 2.0771E−03 |
| A8= | −3.9354E−04 | −2.1998E−03 | −1.4956E−02 | −1.0156E−02 | −2.5297E−03 |
| A10= | 3.3482E−04 | −5.6756E−04 | 5.5460E−03 | 4.6055E−03 | 1.5890E−03 |
| A12= | −1.3832E−04 | 2.9740E−04 | −1.6548E−03 | −1.4373E−03 | −1.1735E−03 |
| A14= | 3.1889E−05 | −3.5103E−05 | 3.4169E−04 | 2.2769E−04 | 4.4611E−04 |
| A16= | −3.4532E−06 | — | −3.0665E−05 | — | −5.3747E−05 |
| Surface # | 8 | 10 | 11 | 12 | 13 |
| k= | 2.9202E+01 | 2.7535E+01 | 8.8867E+01 | 9.5109E+01 | −7.3071E+01 |
| A4= | −2.9473E−02 | −3.0471E−02 | −1.5773E−02 | 1.3542E−02 | −2.0448E−02 |
| A6= | 9.7164E−03 | 3.8390E−02 | 2.3921E−03 | −1.0155E−02 | 5.2193E−03 |
| A8= | −1.8696E−02 | −5.4341E−02 | 1.7770E−04 | 1.5201E−02 | −4.2760E−03 |
| A10= | 2.0257E−02 | 4.4904E−02 | −2.4523E−03 | −1.1224E−02 | 2.1832E−03 |
| A12= | −1.2943E−02 | −2.3437E−02 | 1.8267E−03 | 4.7277E−03 | −5.8233E−04 |
| A14= | 4.7275E−03 | 7.8537E−03 | −6.0088E−04 | −1.1861E−03 | 4.9141E−05 |
| A16= | −8.8260E−04 | −1.6066E−03 | 9.8895E−05 | 1.7515E−04 | 1.0858E−05 |
| A18= | 6.5284E−05 | 1.8092E−04 | −7.5303E−06 | −1.4008E−05 | −2.5011E−06 |
| A20= | — | −8.5675E−06 | 1.8088E−07 | 4.6556E−07 | 1.3777E−07 |
| Surface # | 14 | 15 | 16 | 17 | 18 |
| k= | 1.3760E+00 | −7.5822E+01 | −1.4538E+00 | −1.9355E+01 | 5.0941E+00 |
| A4= | −3.1756E−02 | −2.3053E−02 | −4.8997E−02 | 2.7373E−02 | −5.0422E−02 |
| A6= | 2.6970E−02 | 9.4632E−03 | 1.8410E−02 | −1.7784E−02 | 1.2803E−02 |
| A8= | −2.1423E−02 | −3.6110E−03 | −1.0221E−02 | 4.3470E−03 | −2.4377E−03 |
| A10= | 1.0698E−02 | 1.0033E−03 | 3.5291E−03 | −6.6641E−04 | 3.4064E−04 |
| A12= | −3.5528E−03 | −2.4227E−04 | −7.5307E−04 | 6.0922E−05 | −3.0872E−05 |
| A14= | 7.5615E−04 | 4.1262E−05 | 9.6909E−05 | −3.1396E−06 | 1.7516E−06 |
| A16= | −9.8416E−05 | −4.1284E−06 | −7.2330E−06 | 8.4949E−08 | −6.0230E−08 |
| A18= | 7.0757E−06 | 2.1508E−07 | 2.8786E−07 | −9.6360E−10 | 1.1504E−09 |
| A20= | −2.1325E−07 | −4.5030E−09 | −4.7293E−09 | — | −9.3840E−12 |

| Surface # | 19 | 22 |
|---|---|---|
| k= | −5.5502E−01 | 9.9000E+01 |
| A4= | −5.6753E−02 | −7.4002E−05 |
| A6= | 1.3910E−02 | −3.3442E−06 |
| A8= | −2.7763E−03 | 1.0685E−07 |
| A10= | 3.6982E−04 | — |
| A12= | −3.1216E−05 | — |
| A14= | 1.6390E−06 | — |
| A16= | −5.1745E−08 | — |
| A18= | 8.9874E−10 | — |
| A20= | −6.6050E−12 | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.75 | YI321/Y32 | 0.27 |
| Fno | 1.70 | YI322/Y32 | 0.83 |
| HFOV [deg.] | 41.1 | YI411/Y41 | 0.20 |
| Npmax | 1.669 | YI412/Y41 | 0.69 |
| V1/N1 | 36.30 | YI413/Y41 | 0.97 |
| V2/N2 | 11.65 | YI421/Y42 | 0.64 |
| V3/N3 | 11.65 | YI422/Y42 | 0.74 |
| V4/N4 | 32.28 | YI423/Y42 | 0.85 |
| V5/N5 | 36.26 | YI424/Y42 | 0.93 |
| V6/N6 | 23.91 | YI511/Y51 | 0.68 |
| V7/N7 | 32.28 | YI512/Y51 | 0.94 |
| V8/N8 | 36.26 | YI521/Y52 | 0.77 |
| V9/N9 | 42.32 | YI522/Y52 | 0.98 |
| Vpmin | 19.5 | YI611/Y61 | 0.34 |
| ΣAT/ΣCT | 0.83 | YI612/Y61 | 0.94 |
| ATmax/CTmin | 5.71 | YI621/Y62 | 0.18 |
| CT1/T12 | 15.18 | YI622/Y62 | 0.98 |
| SD/TD | 0.89 | YI711/Y71 | 0.28 |
| TD/BL | 104.47 | YI712/Y71 | 0.78 |
| TL [mm] | 7.90 | YI721/Y72 | 0.30 |
| TL/EPD | 1.99 | YI722/Y72 | 0.82 |
| TL/f | 1.17 | YI811/Y81 | 0.52 |
| TL/ImgH | 1.31 | YI812/Y81 | 0.98 |
| |R18/f| | ∞ | YI821/Y82 | 0.15 |
| Σ|f/fi| | 4.08 | YI822/Y82 | 0.81 |
| f/EPD | 1.70 | YI823/Y82 | 0.96 |
| f/f1 | 1.09 | YI911/Y91 | 0.25 |
| f/f2 | −0.38 | YI912/Y91 | 0.81 |
| f/f3 | −0.11 | YC311/Y31 | 0.43 |
| f/f4 | 0.18 | YC321/Y32 | 0.46 |

-continued

| 9th Embodiment | | | |
|---|---|---|---|
| f/f5 | 0.10 | YC322/Y32 | 0.99 |
| f/f6 | −0.24 | YC411/Y41 | 0.36 |
| f/f7 | 0.77 | YC412/Y41 | 0.83 |
| f/f8 | −1.21 | YC511/Y51 | 0.91 |
| f/f9 | 0.01 | YC512/Y51 | 0.96 |
| f12/f | 1.26 | YC521/Y52 | 0.92 |
| CRA [deg.] | 32.58 | YC611/Y61 | 0.55 |
| ImgH/BL | 80.28 | YC621/Y62 | 0.40 |
| ImgH/Y11 | 3.03 | YC711/Y71 | 0.48 |
| LNP | 8 | YC712/Y71 | 0.99 |
| Y92/Y11 | 3.00 | YC721/Y72 | 0.49 |
| Ymax/Ymin | 3.71 | YC722/Y72 | 0.997 |
| YI111/Y11 | 0.97 | YC811/Y81 | 0.85 |
| YI121/Y12 | 0.81 | YC821/Y82 | 0.30 |
| YI311/Y31 | 0.25 | YC911/Y91 | 0.41 |
| YI312/Y31 | 0.98 | YC912/Y91 | 0.96 |

10th Embodiment

Figure 19:
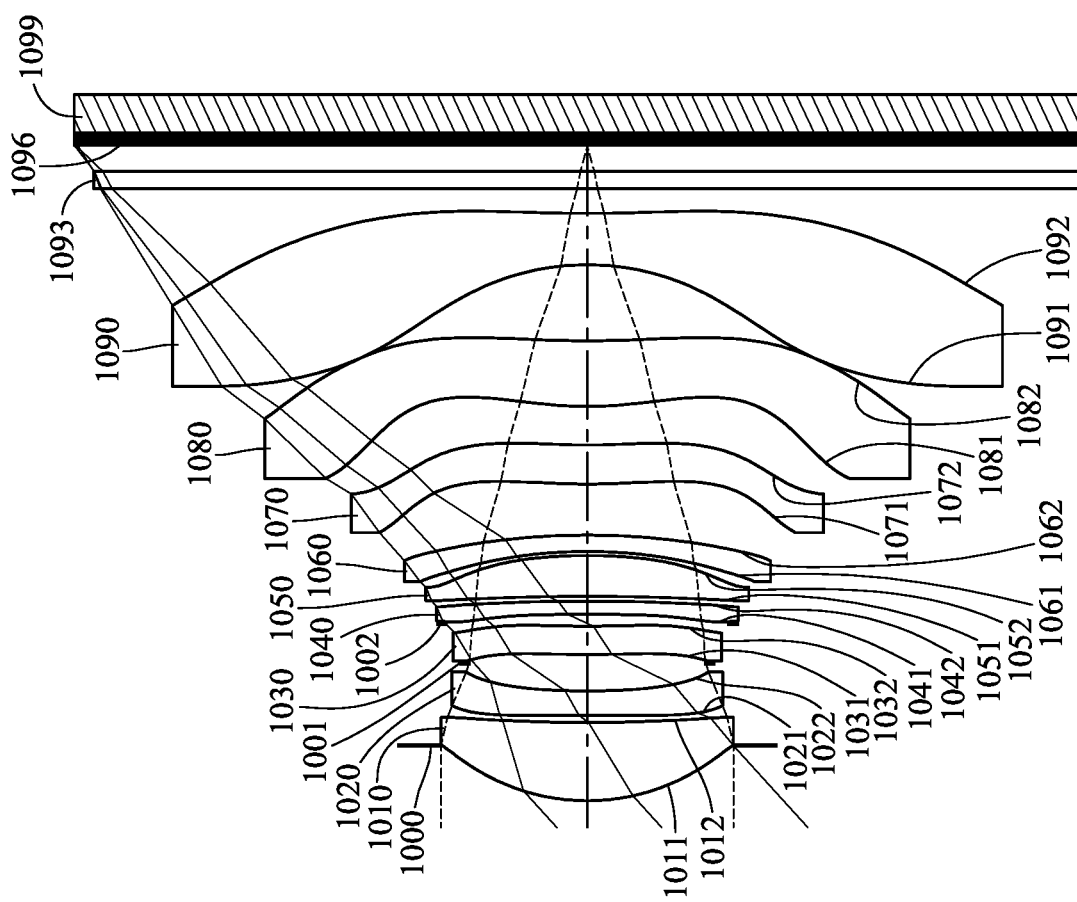
FIG. 19 is a schematic view of an image capturing unit according to the 10th embodiment of the present disclosure.
Figure 20:
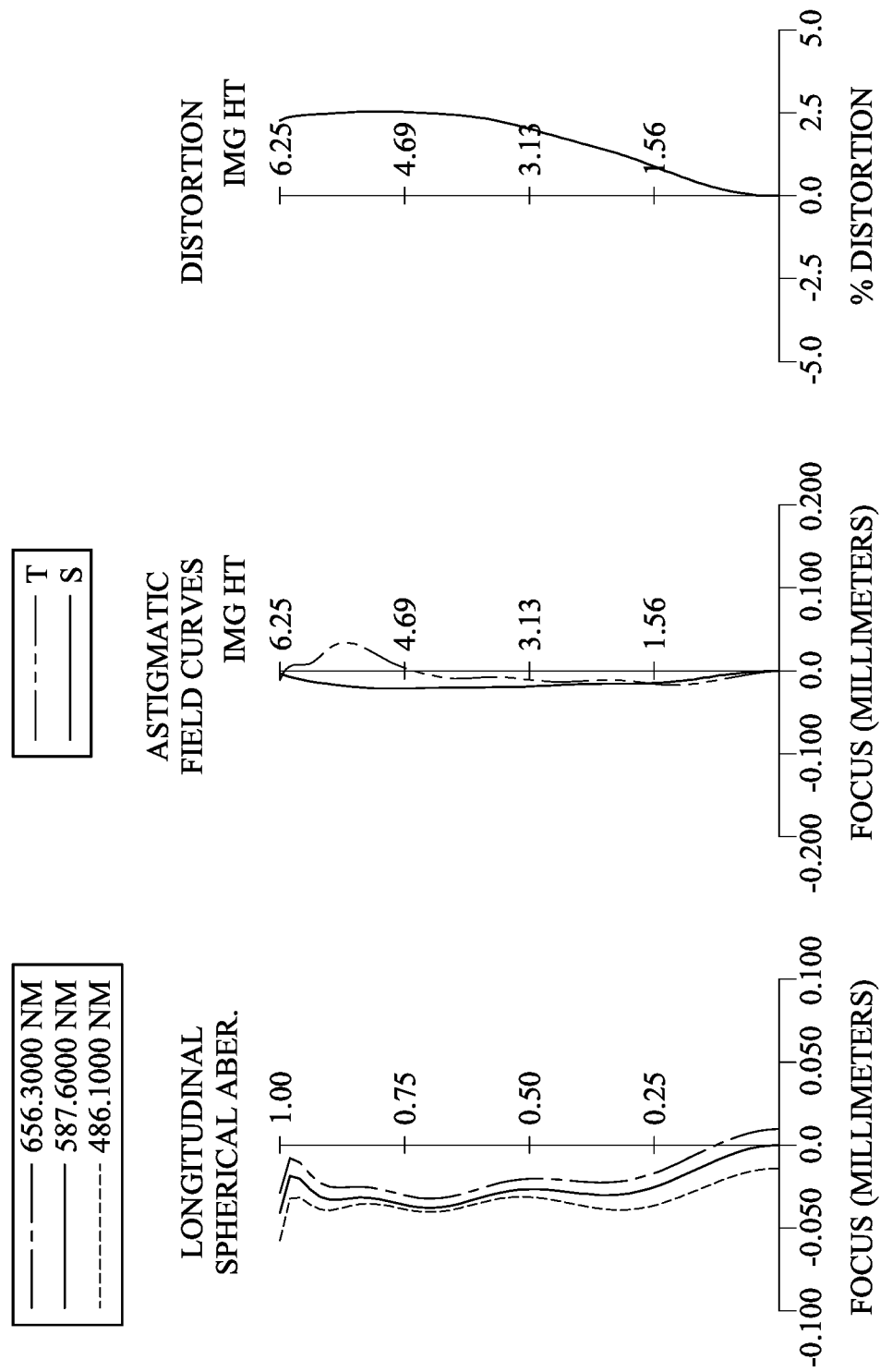
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical photographing lens assembly (its reference numeral is omitted) of the present disclosure and an image sensor 1099. The optical photographing lens assembly includes, in order from an object side to an image side, an aperture stop 1000, a first lens element 1010, a second lens element 1020, a stop 1001, a third lens element 1030, a stop 1002, a fourth lens element 1040, a fifth lens element 1050, a sixth lens element 1060, a seventh lens element 1070, an eighth lens element 1080, a ninth lens element 1090, a filter 1093 and an image surface 1096. The optical photographing lens assembly includes nine lens elements (1010, 1020, 1030, 1040, 1050, 1060, 1070, 1080 and 1090) with no additional lens element disposed between each of the adjacent nine lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point. The image-side surface 1012 of the first lens element 1010 has one critical point in an off-axis region thereof.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has one inflection point. The object-side surface 1021 of the second lens element 1020 has one critical point in an off-axis region thereof.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has three inflection points. The object-side surface 1031 of the third lens element 1030 has one critical point in an off-axis region thereof. The image-side surface 1032 of the third lens element 1030 has one critical point in an off-axis region thereof.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has one inflection point. The image-side surface 1042 of the fourth lens element 1040 has one inflection point. The object-side surface 1041 of the fourth lens element 1040 has one critical point in an off-axis region thereof. The image-side surface 1042 of the fourth lens element 1040 has one critical point in an off-axis region thereof.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has three inflection points. The image-side surface 1052 of the fifth lens element 1050 has one inflection point. The object-side surface 1051 of the fifth lens element 1050 has one critical point in an off-axis region thereof. The image-side surface 1052 of the fifth lens element 1050 has one critical point in an off-axis region thereof.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has two inflection points. The image-side surface 1072 of the seventh lens element 1070 has two inflection points. The object-side surface 1071 of the seventh lens element 1070 has one critical point in an off-axis region thereof. The image-side surface 1072 of the seventh lens element 1070 has one critical point in an off-axis region thereof.

The eighth lens element 1080 with positive refractive power has an object-side surface 1081 being convex in a paraxial region thereof and an image-side surface 1082 being concave in a paraxial region thereof. The eighth lens element 1080 is made of plastic material and has the object-side surface 1081 and the image-side surface 1082 being both aspheric. The object-side surface 1081 of the eighth lens element 1080 has two inflection points. The image-side surface 1082 of the eighth lens element 1080 has two inflection points. The object-side surface 1081 of the eighth lens element 1080 has one critical point in an off-axis region thereof. The image-side surface 1082 of the eighth lens element 1080 has one critical point in an off-axis region thereof.

The ninth lens element 1090 with negative refractive power has an object-side surface 1091 being concave in a paraxial region thereof and an image-side surface 1092 being concave in a paraxial region thereof. The ninth lens element 1090 is made of plastic material and has the object-side surface 1091 and the image-side surface 1092 being both aspheric. The object-side surface 1091 of the ninth lens element 1090 has one inflection point. The image-side surface 1092 of the ninth lens element 1090 has three inflection points. The image-side surface 1092 of the ninth lens element 1090 has one critical point in an off-axis region thereof.

The filter 1093 is made of glass material and located between the ninth lens element 1090 and the image surface 1096, and will not affect the focal length of the optical photographing lens assembly. The image sensor 1099 is disposed on or near the image surface 1096 of the optical photographing lens assembly.

The detailed optical data of the 10th embodiment are shown in Table 19 and the aspheric surface data are shown in Table 20 below.

TABLE 19

10th Embodiment
f = 6.77 mm, Fno = 1.90, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.671 | | | | |
| 2 | Lens 1 | 2.606 | (ASP) | 0.953 | Plastic | 1.544 | 56.0 | 5.65 |
| 3 | | 14.896 | (ASP) | 0.090 | | | | |
| 4 | Lens 2 | −191.205 | (ASP) | 0.295 | Plastic | 1.639 | 23.5 | −12.99 |
| 5 | | 8.680 | (ASP) | 0.336 | | | | |
| 6 | Stop | Plano | | 0.109 | 6 | | | |
| 7 | Lens 3 | 14.122 | (ASP) | 0.346 | Plastic | 1.660 | 20.4 | −405.37 |
| 8 | | 13.283 | (ASP) | 0.030 | | | | |
| 9 | Stop | Plano | | 0.112 | | | | |
| 10 | Lens 4 | −113.524 | (ASP) | 0.162 | Plastic | 1.562 | 44.6 | 65.22 |
| 11 | | −27.714 | (ASP) | 0.059 | | | | |
| 12 | Lens 5 | −27.742 | (ASP) | 0.497 | Plastic | 1.544 | 56.0 | 17.08 |
| 13 | | −7.004 | (ASP) | 0.050 | | | | |
| 14 | Lens 6 | −5.954 | (ASP) | 0.200 | Plastic | 1.656 | 21.3 | −29.45 |
| 15 | | −8.719 | (ASP) | 0.623 | | | | |
| 16 | Lens 7 | 8.171 | (ASP) | 0.475 | Plastic | 1.566 | 37.4 | −142.17 |
| 17 | | 7.262 | (ASP) | 0.470 | | | | |
| 18 | Lens 8 | 4.133 | (ASP) | 0.802 | Plastic | 1.544 | 56.0 | 10.79 |
| 19 | | 13.005 | (ASP) | 0.927 | | | | |
| 20 | Lens 9 | −3.098 | (ASP) | 0.627 | Plastic | 1.534 | 55.9 | −4.95 |
| 21 | | 19.115 | (ASP) | 0.300 | | | | |
| 22 | Filter | Plano | | 0.210 | Glass | 1.517 | 64.2 | — |
| 23 | | Plano | | 0.322 | | | | |
| 24 | Image | Plano | | — | | | | |

Note:
Reference wavelength is 587.6 nm (d-line).
An effective radius of the stop 1001 (Surface 6) is 1.450 mm.
An effective radius of the stop 1002 (Surface 9) is 1.730 mm.

TABLE 20

Aspheric Coefficients

| Surface # | 2 | 3 | 4 | 5 | 7 |
|---|---|---|---|---|---|
| k= | −5.8335E+00 | −1.8009E+00 | −9.9000E+01 | 0.0000E+00 | −2.2237E+01 |
| A4= | 4.1957E−02 | −2.0892E−02 | −1.5358E−02 | 6.3280E−04 | −3.2919E−02 |
| A6= | −1.1156E−02 | 1.9478E−02 | 3.2786E−02 | 2.3567E−02 | 5.1051E−03 |
| A8= | 4.2807E−03 | −1.0322E−02 | −1.9684E−02 | −1.5879E−02 | −7.1398E−03 |
| A10= | −9.9664E−04 | 3.2815E−03 | 7.0917E−03 | 5.6862E−03 | 5.6939E−03 |
| A12= | 5.9102E−07 | −5.1617E−04 | −1.2287E−03 | −1.6412E−05 | −3.5659E−03 |
| A14= | 5.6124E−05 | 1.7842E−05 | 8.6352E−05 | −5.5335E−04 | 1.3419E−03 |
| A16= | −1.0931E−05 | — | — | 1.3584E−04 | −1.9579E−04 |

| Surface # | 8 | 10 | 11 | 12 | 13 |
|---|---|---|---|---|---|
| k= | 0.0000E+00 | −9.9000E+01 | 9.9000E+01 | −9.9000E+01 | 0.0000E+00 |
| A4= | −3.9698E−02 | −2.2088E−02 | 6.0287E−03 | 8.6006E−03 | −6.4391E−02 |
| A6= | 1.2582E−02 | −1.2024E−02 | −3.1346E−02 | −2.2396E−02 | −3.0388E−02 |
| A8= | −1.6036E−02 | 3.2056E−02 | 4.7082E−02 | 2.2738E−02 | 4.2846E−02 |
| A10= | 1.2009E−02 | −3.5733E−02 | −3.3122E−02 | −8.8755E−03 | −3.4605E−02 |
| A12= | −5.5780E−03 | 2.1839E−02 | 1.1843E−02 | −6.5449E−04 | 1.6448E−02 |
| A14= | 1.8760E−03 | −7.1755E−03 | −1.8877E−03 | 1.5665E−03 | −4.4944E−03 |

TABLE 20-continued

| Aspheric Coefficients | | | | |
|---|---|---|---|---|
| A16= | −3.4817E−04 | 1.2106E−03 | 2.4637E−05 | −4.4202E−04 | 6.5750E−04 |
| A18= | 2.1563E−05 | −8.2977E−05 | 1.8118E−05 | 4.0421E−05 | −3.9662E−05 |

| Surface # | 14 | 15 | 16 | 17 | 18 |
|---|---|---|---|---|---|
| k= | 1.5174E−01 | 9.1099E−01 | 8.7611E+00 | 0.0000E+00 | −6.1777E−02 |
| A4= | 1.1971E−02 | 3.2101E−03 | −4.3386E−02 | −6.8002E−02 | −4.6375E−02 |
| A6= | −3.8362E−02 | −8.9383E−03 | 1.9658E−02 | 3.4873E−02 | 1.1617E−02 |
| A8= | 5.6821E−02 | 1.4315E−02 | −1.4126E−02 | −1.9515E−02 | −4.4328E−03 |
| A10= | −4.6242E−02 | −1.1243E−02 | 7.3480E−03 | 8.0036E−03 | 1.3032E−03 |
| A12= | 2.1304E−02 | 4.7056E−03 | −2.7294E−03 | −2.2629E−03 | −2.7821E−04 |
| A14= | −5.5382E−03 | −1.0868E−03 | 6.6098E−04 | 4.1280E−04 | 3.7916E−05 |
| A16= | 7.5952E−04 | 1.3158E−04 | −9.8746E−05 | −4.5262E−05 | −3.0011E−06 |
| A18= | −4.2842E−05 | −6.5615E−06 | 8.3248E−06 | 2.6948E−06 | 1.2518E−07 |
| A20= | — | — | −3.0312E−07 | −6.6880E−08 | −2.1310E−09 |

| Surface # | 19 | 20 | 21 |
|---|---|---|---|
| k= | 0.0000E+00 | −9.3505E−01 | 0.0000E+00 |
| A4= | −8.1075E−03 | −4.8401E−04 | −4.8266E−03 |
| A6= | −1.5923E−03 | −4.4198E−03 | −1.4963E−03 |
| A8= | 6.2010E−04 | 1.7313E−03 | 4.8858E−04 |
| A10= | −1.1210E−04 | −2.5916E−04 | −7.0133E−05 |
| A12= | 1.0426E−05 | 2.1345E−05 | 5.8384E−06 |
| A14= | −3.5675E−07 | −1.0613E−06 | −2.9670E−07 |
| A16= | −1.3050E−08 | 3.1967E−08 | 9.0583E−09 |
| A18= | 1.3303E−09 | −5.4062E−10 | −1.5242E−10 |
| A20= | −2.7877E−11 | 3.9607E−12 | 1.0849E−12 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 6.77 | Y92/Y11 | 2.84 |
| Fno | 1.90 | Ymax/Ymin | 3.44 |
| HFOV [deg.] | 42.2 | YI111/Y11 | 0.94 |
| Npmax | 1.660 | YI121/Y12 | 0.85 |
| V1/N1 | 36.26 | YI211/Y21 | 0.32 |
| V2/N2 | 14.34 | YI311/Y31 | 0.29 |
| V3/N3 | 12.29 | YI321/Y32 | 0.25 |
| V4/N4 | 28.57 | YI322/Y32 | 0.86 |
| V5/N5 | 36.26 | YI323/Y32 | 0.96 |
| V6/N6 | 12.84 | YI411/Y41 | 0.74 |
| V7/N7 | 23.91 | YI421/Y42 | 0.94 |
| V8/N8 | 36.26 | YI511/Y51 | 0.79 |
| V9/N9 | 36.46 | YI512/Y51 | 0.86 |
| Vpmin | 20.4 | YI513/Y51 | 0.94 |
| ΣAT/ΣCT | 0.64 | YI521/Y52 | 0.82 |
| ATmax/CTmin | 5.72 | YI711/Y71 | 0.23 |
| CT1/T12 | 10.59 | YI712/Y71 | 0.89 |
| SD/TD | 0.91 | YI721/Y72 | 0.16 |
| TD/BL | 8.61 | YI722/Y72 | 0.77 |
| TL [mm] | 7.99 | YI811/Y81 | 0.25 |
| TL/EPD | 2.24 | YI812/Y81 | 0.84 |
| TL/f | 1.18 | YI821/Y82 | 0.21 |
| TL/ImgH | 1.28 | YI822/Y82 | 0.94 |
| |R18/f| | 2.82 | YI911/Y91 | 0.46 |
| Σ|f/fi| | 4.51 | YI921/Y92 | 0.16 |
| f/EPD | 1.90 | YI922/Y92 | 0.92 |
| f/f1 | 1.20 | YI923/Y92 | 0.97 |
| f/f2 | −0.52 | YC121/Y12 | 0.99 |
| f/f3 | −0.02 | YC211/Y21 | 0.45 |
| f/f4 | 0.10 | YC311/Y31 | 0.50 |

| 10th Embodiment | | | |
|---|---|---|---|
| f/f5 | 0.40 | YC321/Y32 | 0.45 |
| f/f6 | −0.23 | YC411/Y41 | 0.92 |
| f/f7 | −0.05 | YC421/Y42 | 0.99 |
| f/f8 | 0.63 | YC511/Y51 | 0.99 |
| f/f9 | −1.37 | YC521/Y52 | 0.98 |
| f12/f | 1.30 | YC711/Y71 | 0.42 |
| CRA [deg.] | 37.39 | YC721/Y72 | 0.31 |
| ImgH/BL | 7.52 | YC811/Y81 | 0.46 |
| ImgH/Y11 | 3.51 | YC821/Y82 | 0.36 |
| LNP | 9 | YC921/Y92 | 0.28 |

11th Embodiment

Figure 21:
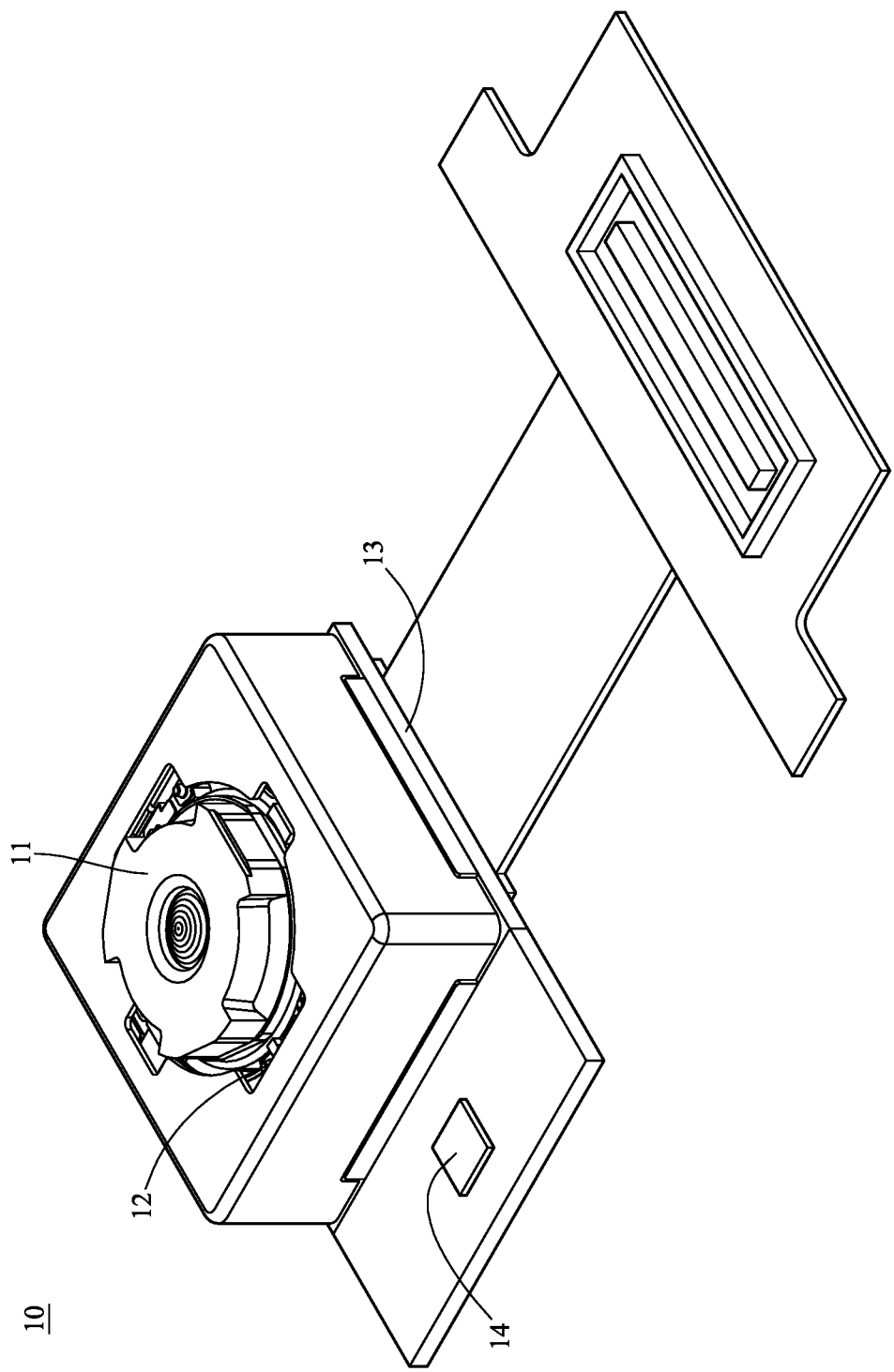
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical photographing lens assembly disclosed in the 1st embodiment, a barrel and a holder member (their reference numerals are omitted) for holding the optical photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances.

The image sensor 13 (for example, CCD or CMOS), which can feature high photosensitivity and low noise, is disposed on the image surface of the optical photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
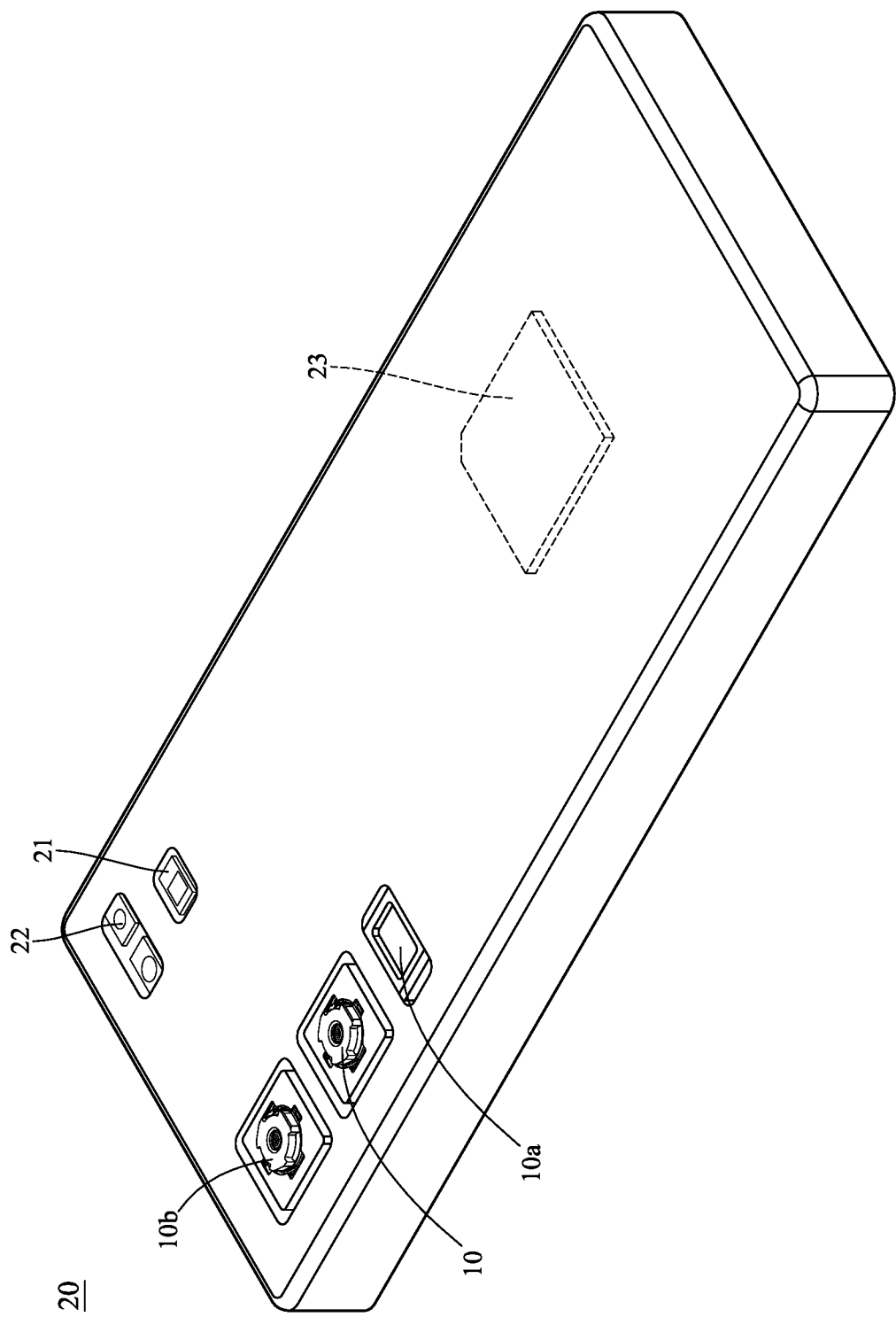
FIG. 22 is one perspective view of an electronic device according to the 12th embodiment of the present disclosure.
Figure 23:
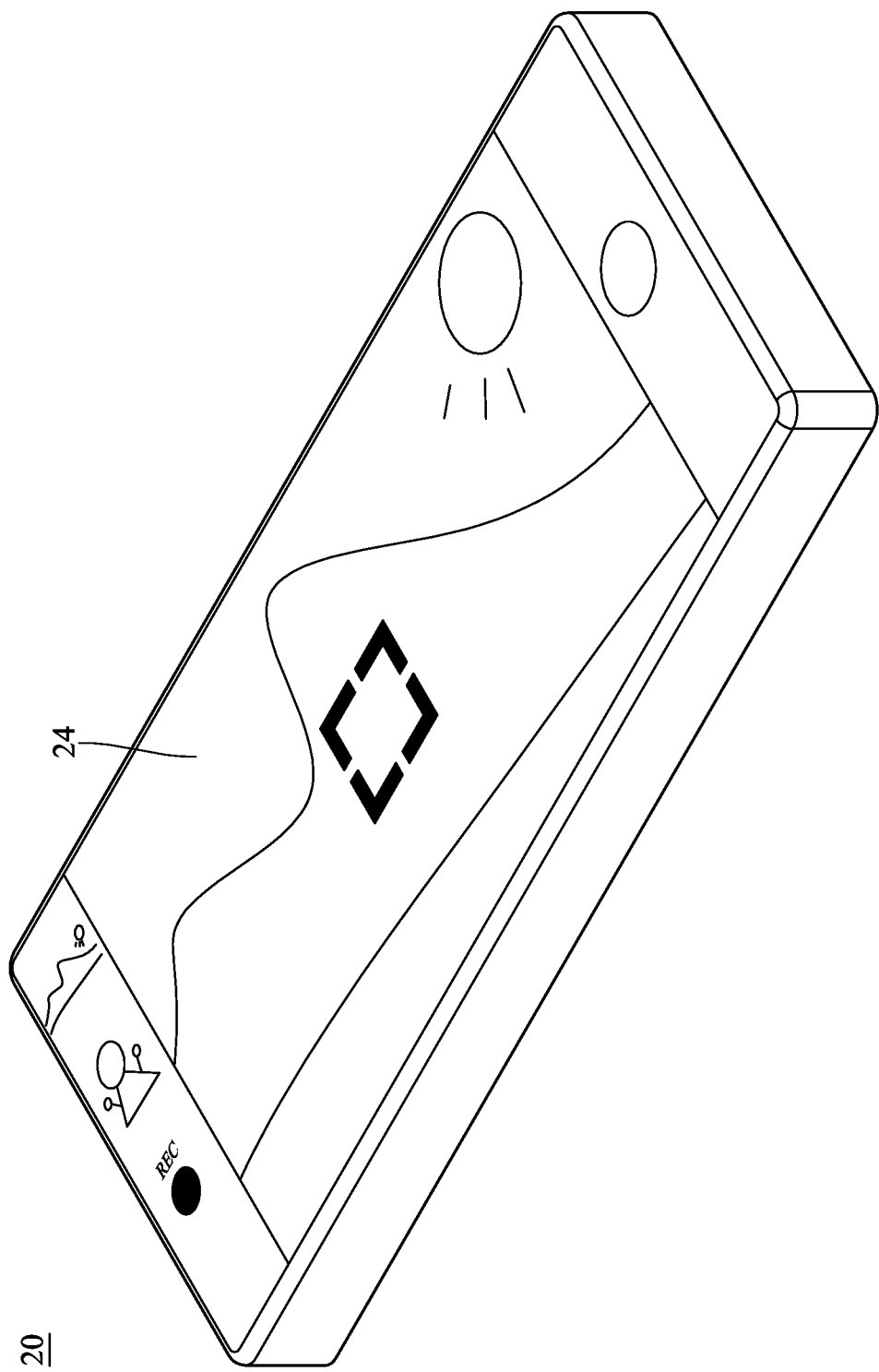
FIG. 23 is another perspective view of the electronic device in FIG. 22.
Figure 24:
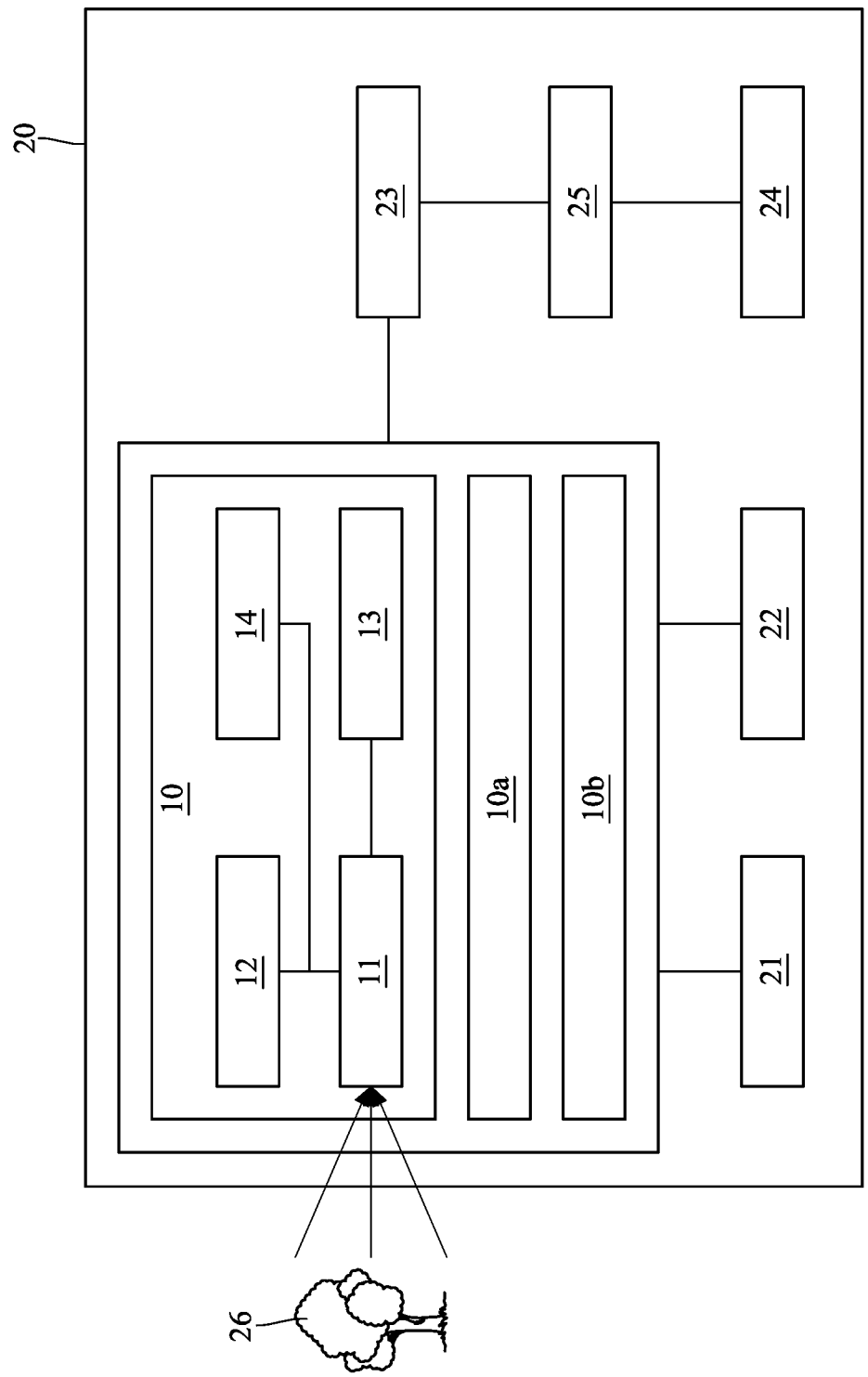
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10 is a wide-angle image capturing unit, the image capturing unit 10a is a telephoto image capturing unit and the image capturing unit 10b is an ultra wide-angle image capturing unit), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising nine lens elements, the nine lens elements being, in order from an object side to an image side, a first lens element, a second lens element, a third lens element, a fourth lens element, a fifth lens element, a sixth lens element, a seventh lens element, an eighth lens element and a ninth lens element; each of the nine lens elements having an object-side surface facing toward the object side and an image-side surface facing toward the image side;

wherein there is an air gap in a paraxial region between the eighth lens element and the ninth lens element, the ninth lens element has negative refractive power, and each of at least three lens elements of the optical photographing lens assembly has at least one aspheric lens surface having at least one inflection point;

wherein the optical photographing lens assembly further comprises an aperture stop, an axial distance between the aperture stop and the image-side surface of the ninth lens element is SD, an axial distance between the object-side surface of the first lens element and the image-side surface of the ninth lens element is TD, a focal length of the optical photographing lens assembly is f, an entrance pupil diameter of the optical photographing lens assembly is EPD, a maximum value among axial distances between each of all adjacent lens elements of the optical photographing lens assembly is ATmax, a minimum value among central thicknesses of all lens elements of the optical photographing lens assembly is CTmin, an axial distance between the object-side surface of the first lens element and an image surface is TL, and the following conditions are satisfied:

$0.50 < SD/TD < 1.20;$ $0.50 < f/EPD < 5.00;$ $3.19 \leq ATmax/CTmin < 15.0;$ and $0.50 < TL/EPD < 7.00;$ wherein an Abbe number of the i-th lens element is Vi, and at least two lens elements of the optical photographing lens assembly satisfy the following condition:

$Vi < 28.0$, wherein $i=1,2,3,4,5,6,7,8$ or 9.

2. The optical photographing lens assembly of claim 1, wherein the axial distance between the aperture stop and the image-side surface of the ninth lens element is SD, the axial distance between the object-side surface of the first lens element and the image-side surface of the ninth lens element is TD, the axial distance between the object-side surface of the first lens element and the image surface is TL, a maximum image height of the optical photographing lens assembly is ImgH, and the following conditions are satisfied:

$0.65 < SD/TD < 1.15$; and $0.50 < TL/ImgH < 4.00$.

3. The optical photographing lens assembly of claim 1, wherein the maximum value among axial distances between each of all adjacent lens elements of the optical photographing lens assembly is ATmax, the minimum value among central thicknesses of all lens elements of the optical photographing lens assembly is CTmin, and the following condition is satisfied:

$3.46 \leq ATmax/CTmin < 10.0$.

4. The optical photographing lens assembly of claim 3, wherein the maximum value among axial distances between each of all adjacent lens elements of the optical photographing lens assembly is ATmax, the minimum value among central thicknesses of all lens elements of the optical photographing lens assembly is CTmin, and the following condition is satisfied:

$5.71 \leq ATmax/CTmin < 10.0$.

5. The optical photographing lens assembly of claim 1, wherein the axial distance between the object-side surface of the first lens element and the image surface is TL, the entrance pupil diameter of the optical photographing lens assembly is EPD, a chief ray angle at the maximum image height of the optical photographing lens assembly is CRA, and the following conditions are satisfied:

$0.80 < TL/EPD < 4.50$; and $30.0[\deg.] < CRA < 70.0[\deg.]$.

6. The optical photographing lens assembly of claim 1, wherein the Abbe number of the i-th lens element is Vi, and at least two lens elements of the optical photographing lens assembly satisfy the following condition:

$Vi \leq 26.0$, wherein $i=1,2,3,4,5,6,7,8$ or 9;

wherein the focal length of the optical photographing lens assembly is f, the entrance pupil diameter of the optical photographing lens assembly is EPD, and the following condition is satisfied:

$0.70 < f/EPD < 2.60$.

7. The optical photographing lens assembly of claim 1, wherein a sum of axial distances between each of all adjacent lens elements of the optical photographing lens assembly is ΣAT, a sum of central thicknesses of all lens elements of the optical photographing lens assembly is ΣCT, and the following condition is satisfied:

$0.61 \leq \Sigma AT/\Sigma CT < 1.00$.

8. The optical photographing lens assembly of claim 1, wherein a central thickness of the first lens element is CT1, an axial distance between the first lens element and the second lens element is T12, and the following condition is satisfied:

$1.0 < CT1/T12 \leq 3.83$.

9. The optical photographing lens assembly of claim 1, wherein the axial distance between the object-side surface of the first lens element and the image-side surface of the ninth lens element is TD, an axial distance between the image-side surface of the ninth lens element and the image surface is BL, and the following condition is satisfied:

$8.61 \leq TD/BL$.

10. The optical photographing lens assembly of claim 1, wherein the focal length of the optical photographing lens assembly is f, a focal length of the i-th lens element is fi, and the following condition is satisfied:

$4.89 \leq \Sigma|f/fi| < 10.0$, wherein $i=1,2,3,4,5,6,7,8$ and 9.

* * * * *